United States Patent
Yokoyama et al.

(10) Patent No.: US 7,759,450 B2
(45) Date of Patent: *Jul. 20, 2010

(54) POLYTRIMETHYLENE TEREPHTHALATE RESIN AND METHOD FOR PRODUCING THE SAME

(75) Inventors: Hiroshi Yokoyama, Okayama (JP); Harumi Watanabe, Kurashiki (JP); Hiroshige Okamoto, Okayama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 620 days.

This patent is subject to a terminal disclaimer.

(21) Appl. No.: 10/539,054

(22) PCT Filed: Jan. 22, 2004

(86) PCT No.: PCT/JP2004/000522

§ 371 (c)(1),
(2), (4) Date: Jun. 15, 2005

(87) PCT Pub. No.: WO2004/065451

PCT Pub. Date: Aug. 5, 2004

(65) Prior Publication Data

US 2006/0128905 A1    Jun. 15, 2006

(30) Foreign Application Priority Data

Jan. 22, 2003    (JP)    ................ 2003-013902

(51) Int. Cl.
   *C08G 63/00*    (2006.01)
   *C08G 63/68*    (2006.01)
   *C08G 79/02*    (2006.01)
(52) U.S. Cl. ..................... 528/283; 525/437
(58) Field of Classification Search .............. 525/437; 528/283
See application file for complete search history.

(56) References Cited

U.S. PATENT DOCUMENTS 5,340,909 A * 8/1994 Doerr et al. ............... 528/276

(Continued)

FOREIGN PATENT DOCUMENTS

EP    1 364 980 A1    11/2003

(Continued)

OTHER PUBLICATIONS

The Encyclopedia of Polymer Science and Technology, copyright 2002, John Wiley and Sons Inc.*

*Primary Examiner*—Mark Eashoo
*Assistant Examiner*—Liam J Heincer
(74) *Attorney, Agent, or Firm*—Staas & Halsey LLP

(57) ABSTRACT

A polytrimethylene terephthalate resin comprising 60 to 100 mole % of (a) trimethylene terephthalate recurring units, and 0 to 40 mole % of (b) at least one monomer unit obtained from a comonomer copolymerizable with at least one of the monomers used for forming the recurring units, the total molar amount of (a) monomer units and (b) monomer units being 100 mole %, and the resin having the following characteristics (A) to (D):

(A) an intrinsic viscosity [η] of from 0.6 to 4 dl/g;
(B) a molecular weight distribution (Mw/Mn) of from 2 to 2.7;
(C) a cyclic dimer content of not greater than 2% by weight; and
(D) a psychometric lightness L-value of from 70 to 100 and a psychometric chroma b*-value of from −5 to 25.

6 Claims, 3 Drawing Sheets

U.S. PATENT DOCUMENTS

| | | | |
|---|---|---|---|
| 5,484,882 A * | 1/1996 | Takada et al. | 528/361 |
| 5,599,900 A * | 2/1997 | Bhatia | 528/491 |
| 6,245,129 B1 * | 6/2001 | Yoshikawa | 95/245 |
| 6,423,814 B1 * | 7/2002 | Kato et al. | 528/272 |
| 6,657,044 B1 * | 12/2003 | Kelsey et al. | 528/485 |
| 2002/0009353 A1 * | 1/2002 | Kelsey et al. | 412/40 |
| 2002/0032302 A1 * | 3/2002 | Scardino et al. | 528/274 |
| 2003/0092874 A1 * | 5/2003 | Okajima et al. | 528/272 |
| 2004/0116573 A1 * | 6/2004 | Tsukamoto | 524/413 |

FOREIGN PATENT DOCUMENTS

| | | | |
|---|---|---|---|
| JP | 53-017569 | | 2/1978 |
| JP | 08-311177 | | 11/1996 |
| JP | 10-218980 | | 8/1998 |
| JP | 2001-278971 | | 10/2001 |
| JP | 2003-012780 | | 1/2003 |
| WO | WO 99/11709 | * | 3/1999 |
| WO | WO0064962 | | 11/2000 |

* cited by examiner

POLYTRIMETHYLENE TEREPHTHALATE RESIN AND METHOD FOR PRODUCING THE SAME

CROSS REFERENCE TO RELATED APPLICATIONS

This application is based on and hereby claims priority to PCT Application No. PCT/JP2004/000522 filed Jan. 22, 2004 and Japanese Application No. 2003-013902 filed Jan. 22, 2003, the contents of which are hereby incorporated by reference.

BACKGROUND OF THE INVENTION

1. Field of the Invention

The present invention relates to a polytrimethylene terephthalate resin. More particularly, the present invention is concerned with a polytrimethylene terephthalate resin comprised mainly of trimethylene terephthalate recurring units, which has the following characteristics: an intrinsic viscosity [η] of from 0.6 to 4 dl/g; a molecular weight distribution (Mw/Mn) of from 2 to 2.7; a cyclic dimer content of not greater than 2% by weight; and a psychometric lightness L-value of from 70 to 100 and a psychometric chroma b*-value of from −5 to 25. By using the polytrimethylene terephthalate resin of the present invention, it becomes possible to produce an excellent shaped article stably on a commercial scale. Specifically, the shaped article produced using the polytrimethylene terephthalate resin of the present invention has high strength and excellent color. Further, the shaped article is free from the bleeding of the cyclic dimer to the surface of the shaped article, so that the shaped article is suitable for coating with a coating composition or adhesive agent and exhibits excellent adhesion property. The present invention is also concerned with a method for stably producing the polytrimethylene terephthalate resin with high productivity on a commercial scale.

2. Prior Art

A polytrimethylene terephthalate (hereinafter, frequently referred to as "PTT") not only has characteristics similar to those of a nylon (e.g., soft feeling, excellent elastic recovery and good dyeability), but also has characteristics similar to those of a polyethylene terephthalate (hereinafter, referred to as "PET") (e.g., wash and wear property, dimensional stability and discoloration resistance). Therefore, PTT has been attracting attention as an epoch-making material for a fiber. Further, due to the characteristics which a nylon does not possess, such as low hygroscopicity and discoloration resistance, and to the characteristics which a polybutylene terephthalate (hereinafter, referred to as "PBT") does not possess, such as moldability, PTT can be used advantageously as an excellent raw material for producing shaped articles.

For further expanding the application fields of PTT, it has been desired to improve the strength and color of the fibers and shaped articles of PTT. For improving the strength of the fibers and shaped articles of a polymer, it is necessary to increase the polymerization degree of the polymer, and to narrow the molecular weight distribution of the polymer so as to reduce the amount of low molecular weight components in the polymer. Further, for improving the color of the fibers and shaped articles of a polymer, it is necessary not only to improve the whiteness of the polymer, but also to improve the heat resistance of the polymer so as to prevent the discoloration of the polymer, which is caused by the thermal history experienced by the polymer during the drying, melting and the like.

As a polymerization method for producing PTT, a melt polymerization process is widely known (see, for example, Unexamined Japanese Patent Application Laid-Open Specification No. Hei 5-262862 (corresponding to U.S. Pat. No. 5,340,909), WO98/23662, WO01/14450 and WO01/14451). In the above-mentioned documents, a method is described in which a melt polymerization is performed using a polymerization vessel equipped with a stirrer. The above-mentioned polymerization vessel has advantages in that it exhibits excellent volume efficiency and has a simple structure. Such a polymerization vessel can be used for efficiently performing a polymerization to produce a polymer having high polymerization degree on a small scale. However, when the above-mentioned polymerization vessel is used for performing a polymerization on a commercial scale, the depth of the liquid reaction mixture in the polymerization vessel becomes inevitably large, leading to a marked occurrence of heat decomposition of the polymer. Thus, a polymer having high polymerization degree cannot be produced on a commercial scale.

Various techniques have been proposed for producing a PTT having high polymerization degree by melt polymerization. Examples of such techniques include a technique in which a lower alcohol diester of terephthalic acid and trimethylene glycol are subjected to a transesterification reaction and a polycondensation reaction in the presence of a titanium compound, wherein the molar ratio of the lower alcohol diester of terephthalic acid to the trimethylene glycol is in the range of from 1/1.2 to 1/1.8 (Unexamined Japanese Patent Application Laid-Open Specification No. Sho 51-140992); a technique in which an organometal catalyst is used as a polycondensation catalyst, and an organic sulfonic acid or an aliphatic carboxylic acid is used as a cocatalyst (U.S. Pat. No. 4,611,049); a technique in which a tin catalyst is used as a polycondensation catalyst (Unexamined Japanese Patent Application Laid-Open Specification No. Hei 5-262862 (corresponding to U.S. Pat. No. 5,340,909)); a technique in which a specific titanium catalyst is used as a polycondensation catalyst (Unexamined Japanese Patent Application Laid-Open Specification Nos. 2000-159875 and 2000-159876); a technique in which an antimony compound is used as a polycondensation catalyst (Chemical Fiber International Vol. 46, pp 263-264, 1996); a technique in which heat decomposition of PTT is suppressed by using a hindered phenol-type stabilizer having a specific structure (Unexamined Japanese Patent Application Laid-Open Specification No. Sho 51-142097); a technique in which the by-production of acrolein (formed by heating of a prepolymer and a polymer in air during the polymerization) is suppressed by blocking the terminals of the prepolymer and the polymer with a phosphorus-containing stabilizer and a hindered phenol-type stabilizer (WO98/23662 and WO99/11709); and a technique in which a specific titanium compound is reacted with a specific phosphorus compound in their respective amounts such that the phosphorus/titanium atomic ratio is in the range of from 1/1 to 3/1, and the resultant product is used as a polycondensation catalyst (Unexamined Japanese Patent Application Laid-Open Specification No. 2001-278971). However, the above-mentioned techniques are disadvantageous in that the molecular weight of the obtained PTT is not satisfactorily high, that a lowering of the molecular weight of the PTT occurs during the molding thereof, and/or that a discoloration of the PTT occurs. Thus, by the above-mentioned techniques, a PTT having satisfactory properties cannot be obtained. For example, when a PTT is produced by the technique described in the above-mentioned Unexamined Japanese Patent Application Laid-Open Specification No. 2001-278971, the produced PTT has improved color; however, the polymerization rate becomes disadvantageously low, so that, especially when a PTT is produced on a commercial scale where the depth of the liquid reaction mixture in the polymerization vessel becomes inevitably large, heat decomposition of the polymer markedly occurs and, hence, it is substantially impossible to produce a PTT having high polymerization degree. Further, the technique described in the above-mentioned Unexamined Japanese Patent Application Laid-Open Specification No. Hei 5-262862 has the following problems. For improving the color of the PTT by this technique, it is necessary not only to control the amount of a tin catalyst so as not to exceed 525 ppm, based on the weight of dimethyl terephthalate, but also to use Hostaperm pigment (trade name), cobalt and the like. In addition, with respect to the improvement of the polymerization degree, a PTT having a high polymerization degree can be produced on a small scale where the amount of the reaction mixture in a polymerization vessel is only about 1 kg so that the depth of the reaction mixture in the polymerization vessel is small; however, it is difficult to produce a PTT having high polymerization degree on a commercial scale where the depth of the reaction mixture becomes inevitably large. Furthermore, as the above-mentioned tin catalyst, this patent document uses an organotin compound having a C—Sn bond, such as butylstannoic acid. Such an organotin compound is poisonous and, hence, is not a preferable catalyst.

A PTT produced by a conventional melt polymerization process has a problem in that the PTT contains a large amount of by-produced oligomers. Specifically, the conventional PTT contains oligomers in an amount of from 2.5 to 3.5% by weight, and about 90% by weight of the oligomers are a cyclic dimer which is a cyclic compound which is formed by a condensation of 2 terephthalic acid molecules. This cyclic dimer is disadvantageous in that it sublimates and is likely to bleed out from the PTT. Therefore, for example, when the conventional PTT is subjected to spinning, the cyclic dimer sublimates and is deposited around the spinning nozzle. The deposited cyclic dimer adheres to the resultant spun polymer (polymer fiber) which passes through the spinning nozzle, thereby causing the breakage or fuzzing of the polymer fiber.

Further, when the conventional PTT is subjected to injection molding, the cyclic dimer deposits on the inner surface of the mold (that is, a mold deposit occurs), so that the appearance and dimensional precision of the shaped article are spoiled. Further, the cyclic dimer bleeds out on the surface of the shaped article, thereby lowering not only the coating performance in the coating process using a coating composition or an adhesive agent, but also the adhesion property. Furthermore, during the production of a PTT by a conventional melt polymerization process, the cyclic dimer volatilizes from the polymer and deposits on the inner wall of the conduit provided in the production system used, thereby causing the clogging of the conduit.

The above-mentioned cyclic dimer is formed by the so-called "ring-linear chain equilibrium reaction" which occurs at the hydroxyl group-containing terminal portions of a PTT. Specifically, in a PTT resin, there is an equilibrium (i.e., a ring-linear chain equilibrium) between a cyclic dimer and a linear dimer unit (i.e., two consecutive trimethylene terephthalate molecules) at the hydroxyl group-containing terminal of a PTT, as shown in the following formula:

wherein M represents a trimethylene terephthalate recurring unit and D represents a cyclic dimer.

Therefore, even when the cyclic dimer is removed from the PTT by volatilization during the polymerization reaction, the cyclic dimer is immediately generated again in the same amount as that of the removed cyclic dimer, thereby causing the loss of the PTT. Thus, it was impossible to produce a PTT containing the unfavorable cyclic dimer in an amount reduced significantly. Thus, the yield of the PTT becomes inevitably low.

It is known that a PET, which has a similar skeleton to that of a PTT, also contains oligomers. However, PET has an oligomer content as low as only about 1% by weight. Further, most of the oligomers in PET are cyclic trimers. The cyclic trimer of a PET is less likely to sublimate and to bleed out, as compared to the cyclic dimer of a PTT. Therefore, in the case of a PTT, the problems caused by the presence of oligomers are more serious than those in the case of a PET.

Further, as a method for producing a high molecular weight PTT which has an excellent heat stability, there is proposed a method for producing a PTT by a solid-phase polymerization process (in which prepolymer pellets are subjected to a polymerization) (see, for example, Unexamined Japanese Patent Application Laid-Open Specification No. Hei 8-311177, Japanese Patent Application prior-to-examination Publication (Tokuhyo) No. 2000-502392 and Korean Patent No. 1998-061618). In a solid-phase polymerization process, the polymerization is performed at low temperatures and, hence, the ring-linear chain equilibrium of the PTT can be displaced in the direction of the formation of the linear dimer unit (derived from the cyclic dimer) at the hydroxyl group-containing terminals of the PTT. For this reason, it has been reported that the solid-phase polymerization process is effective for reducing the cyclic dimer content of PTT.

However, as a result of the studies of the present inventors, it has been found that, even when a PTT having its cyclic dimer content reduced to less than 1% by weight is produced by the solid-phase polymerization process, the cyclic dimer is rapidly produced upon melting thereof during the melt-molding of the PTT, and the reduced cyclic dimer content of the PTT returns to the cyclic dimer content (about 2.5 to 3.5% by weight) of the prepolymer prior to the solid-phase polymerization in which the hydroxyl group-containing terminal portions are at the ring-linear chain equilibrium state. Therefore, when a PTT produced by the solid-phase polymerization process is used for producing a melt-molded product (e.g., a fiber, a film or an injection-molded product), the above-mentioned problems caused by the cyclic dimer cannot be avoided.

Further, the solid-phase polymerization is advanced by removing trimethylene glycol (hereinafter, referred to as "TMG") from the surface of the PTT prepolymer pellets. Therefore, the polymerization degree varies depending on the size and shape of the pellets, and also varies depending on the position in the pellets. Therefore, the PTT obtained by this method is markedly non-uniform with respect to the polymerization degree (i.e., the PTT has a broad molecular weight distribution). Further, in the solid-phase polymerization, the solid prepolymer pellets get rubbed with one another over a long period of time, thereby generating polymer powder which becomes a loss. The presence of the polymer powder in the spinning process causes breakage or fuzzing of polymer fibers. For removing the polymer powder, an additional step therefor becomes necessary. Further, the solid-phase polymerization should be performed after the production of the prepolymer by the melt polymerization and the like, and thus, the entire process for producing a PTT becomes complicated and costly.

For solving the above-mentioned problems accompanying the solid-phase polymerization process, there have been proposed an improved melt polymerization process for producing a PTT having a high polymerization degree, wherein a disc ring or cage type reactor (WO00/64962) or a disc and donut conductor (U.S. Pat. No. 5,599,900) is used for efficiently removing TMG from the polymerization reaction system. However, each of the above-mentioned apparatuses is a vertical agitation-type polymerizer which is equipped with a rotary driving part. Therefore, in the above-mentioned process, when a polymerization is performed under high vacuum for obtaining a polymer having a high polymerization degree, it is impossible to seal the driving part completely. Thus, it is impossible to prevent the entrance of a trace amount of oxygen into the polymer and, hence, a discoloration of the polymer inevitably occurs. Especially, in the case of a PTT, such discoloration markedly occurs. When the driving part is sealed with a sealing liquid, it is likely that the sealing liquid gets mixed with the polymer, thereby lowering the quality of the resultant PTT. Further, even when the driving part of the apparatus is tightly sealed at the start of the operation thereof, the tightness of the sealing is lowered during the operation conducted for a long period of time. Thus, the above-mentioned process also has a serious problem with respect to the maintenance of the apparatuses.

On the other hand, a method for producing a resin (other than a PTT) is known in which the polymerization apparatus used therein does not have a rotary driving part, and a polymerization is performed by allowing a prepolymer to fall from a perforated plate (free-fall polymerization method). For example, a method is disclosed in which a polyester prepolymer is allowed to fall in the form of fibers in vacuo in an attempt to obtain a polyester having a desired molecular weight (U.S. Pat. No. 3,110,547). In this method, a polymerization reaction is performed in a one pass mode without recycling the polymer, because the recycling of a polymer which has already been allowed to fall in the form of fibers causes the lowering of the quality of the final polyester. However, the above-mentioned method has the following disadvantages. The polymer in the form of fibers is easily broken during the polymerization reaction, thereby causing a disadvantageously large fluctuation in quality of the final condensation polymer products. In addition, a low molecular weight condensation polymer is scattered from the polymer fibers during the polymerization reaction to stain the lower surface of the perforated plate. Due to such staining of the lower surface of the perforated plate, it becomes difficult to cause the polymer to fall in the form of fibers, so that the polymer fibers contact with one another to cause breakage of the polymer fibers or the polymer fibers are combined together to form a thick fiber in which the reaction does not proceed efficiently.

In order to solve these problems, various methods have been proposed. Examples of such methods include a method in which a polyester or a polyamide is produced by allowing a prepolymer to fall along and in contact with the surface of a perforated guide or a wire guide, which is vertically arranged in a reaction vessel, so that the polymerization of the prepolymer is effected during the fall thereof (Examined Japanese Patent Application Publication No. Sho 48-8355 and Unexamined Japanese Patent Application Laid-Open Specification No. Sho 53-17569); a method for continuously condensation-polymerizing bis-(β-hydroxyethyl) terephthalate (which is an initial-stage condensation product of polyethylene terephthalate (PET)), in which bis-(β-hydroxyethyl) terephthalate is allowed to fall along and in contact with wire guides in an atmosphere of inert gas, wherein the wire guides are hung vertically from the holes of a perforated plate, so that the polymerization of bis-(β-hydroxyethyl) terephthalate is effected during the fall thereof (Examined Japanese Patent Application Publication No. Hei 4-58806); and a method for producing a melt-polycondensation polymer (such as a polyester, a polyamide or a polycarbonate) in the form of a film, in which a melt-polycondensation prepolymer is caused to absorb an inert gas, and then, polymerized under reduced pressure (WO99/65970 which also discloses an apparatus used in the method).

However, each of the above patent documents only describes a method for producing a polyester (such as a PET) or a nylon, and has no proposal or suggestion about the production of a PTT. As a result of the studies of the present inventors, it has been found that, when any of the above-mentioned methods are simply applied to the production of a PTT (that is, when the production of PTT is conducted by any of the above-mentioned methods, using raw materials and conditions which are conventionally used in the production of a PTT), a foaming of a polymer vigorously occurs, thereby staining the lower surface of the perforated plate or the inner wall of the reaction vessel having the guides provided therein. The PTT is susceptible to heat decomposition, as compared to, for example, the PBT. Therefore, the stain caused by the above-mentioned vigorous foaming of the polymer is easily decomposed. When the resultant decomposition products get mixed with the polymer, disadvantages are caused that the quality of the polymer is lowered, that the desired polymerization degree cannot be obtained, and that the obtained PTT suffers discoloration. Thus, the simple application of the above-mentioned methods to the production of PTT is accompanied by a problem that it is difficult to achieve a satisfactorily high polymerization degree. In addition, the final PTT contains low molecular weight polymers, which result in a broad molecular weight distribution of the final polymer and are likely to lower the mechanical strength of an ultimate shaped article.

In recent years, there has been proposed a technique in which a PTT prepolymer having a specific polymerization degree is caused to flow through the holes of a perforated plate, and then allowed to fall along and in contact with a guide at a specific temperature under reduced pressure to thereby perform a polymerization of the PTT prepolymer during the fall thereof (Japanese Patent Application No. 2002-172735). By this technique, it has, for the first time, become possible to produce a PTT having a high polymerization degree and an excellent color. However, for meeting the recent demand for high quality fibers and shaped articles, it has been desired to further improve the color and mechanical properties of the polymer. Further, a PTT produced by the conventional melt polymerization process had a disadvantageously high cyclic dimer content and, hence, it has been desired to reduce the cyclic dimer content. Furthermore, it has been desired to solve a problem which arises when the continuous production of PTT is conducted by any of the conventional techniques, that is, a problem that the cyclic dimer which volatilizes from the polymer during the polymerization is deposited on the inner wall of the conduit provided in the production system, thereby causing the clogging of the conduits, so that a stable production of PTT becomes difficult.

SUMMARY OF THE INVENTION

In this situation, the present inventors have made extensive and intensive studies with a view toward solving the above-mentioned problems accompanying the prior art, and developing a polytrimethylene terephthalate (PTT) resin which can be used as a raw material for stably producing, on a commercial scale, a shaped article having high quality (i.e., shaped article which has excellent strength and color, and which is free from the bleeding of the cyclic dimer to the surface of the shaped article, so that the shaped article is suitable for coating with a coating composition or adhesive agent and exhibits excellent adhesion property). As a result, it has unexpectedly been found that, when a crude PTT resin (used as a raw material for the PTT resin of a final PTT resin having advantageously low cyclic dimer content) is produced by a specific method (e.g., a method using a specific catalyst), it becomes possible to obtain a crude PTT resin which is capable of suppressing the formation of the cyclic dimer even when the crude PTT resin is melted. Further, by removing the cyclic dimer from the obtained crude resin in a molten form, it becomes possible to obtain a PTT resin having an intrinsic viscosity [η] of from 0.6 to 4 dl/g, a molecular weight distribution (Mw/Mn) of from 2 to 2.7, a cyclic dimer content of not greater than 2% by weight, and a psychometric lightness L-value of from 70 to 100 and a psychometric chroma b*-value of from −5 to 25. By using such a PTT resin, it becomes possible to produce an excellent shaped article stably on a commercial scale. Specifically, the shaped article produced using the polytrimethylene terephthalate resin of the present invention has high strength and excellent color. Further, the shaped article is free from the bleeding of the cyclic dimer to the surface of the shaped article, so that the shaped article is suitable for coating with a coating composition or adhesive agent and exhibits excellent adhesion property. The present invention has been completed, based on these novel findings.

Accordingly, it is an object of the present invention to provide a polytrimethylene terephthalate resin which can be used for stably producing, on a commercial scale, a shaped article which has high strength and excellent color, and which is free from the bleeding of the cyclic dimer to the surface of the shaped article, so that the shaped article is suitable for coating with a coating composition or adhesive agent and exhibits excellent adhesion property.

It is another object of the present invention to provide a method for stably producing the above-mentioned PTT resin on a commercial scale.

The foregoing and other objects, features and advantages of the present invention will be apparent from the following description and appended claims taken in connection with the accompanying drawings.

DESCRIPTION OF REFERENCE CHARACTERS AND NUMERALS

Figure 1:
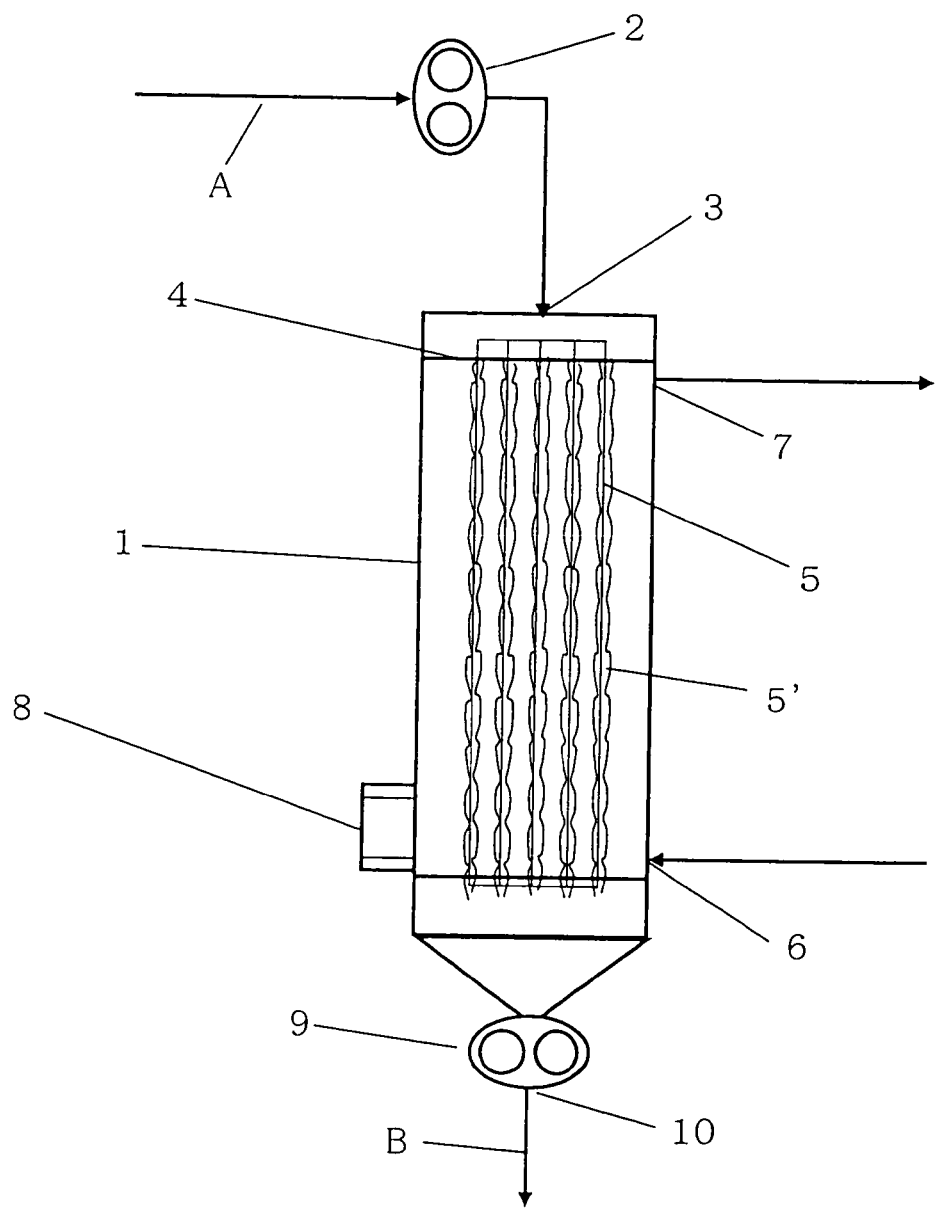
FIG. 1 shows an explanatory diagrammatic view of an example of a polymerizer which can be used in the present invention.

A: Crude polytrimethylene terephthalate resin
B: Polytrimethylene terephthalate resin
C: Mixture of raw materials (including a starting-monomer, a reactant monomer, a catalyst, an additive and the like)
1: Polymerizer
2, 14, 18, 22 and 24: Transferring pump
3 and 25: Inlet for crude polytrimethylene terephthalate resin
4: Perforated plate
5: Guide
5': Polymer falling along and in contact with the guide
6 and 32: Inlet for inert gas
7, 13, 17, 21 and 33: Vent
8: Observing window
9: Withdrawal pump
10 and 29: Outlet
11: Transesterification reaction vessel
12, 16 and 20: Agitation blade
15: First agitation type polymerizer
19: Second agitation type polymerizer
23: Thin film evaporator
26: Revolution shaft
27: Blade which is spirally attached to the revolution shaft
28: Thin film of molten resin
30: Withdrawal port
31: Motor

DETAILED DESCRIPTION OF THE INVENTION

In one aspect of the present invention, there is provided a polytrimethylene terephthalate resin comprising:

60 to 100 mole % of (a) trimethylene terephthalate recurring units, and 0 to 40 mole % of (b) at least one monomer unit selected from the group consisting of monomer units obtained from comonomers which are other than the monomers used for forming the trimethylene terephthalate recurring units and which are copolymerizable with at least one of the monomers used for forming the trimethylene terephthalate recurring units, the total molar amount of (a) monomer units and (b) monomer units being 100 mole %, the polytrimethylene terephthalate resin having the following characteristics (A) to (D):

(A) an intrinsic viscosity [η] of from 0.6 to 4 dl/g;

(B) a molecular weight distribution of from 2 to 2.7 in terms of the Mw/Mn ratio, wherein Mw represents the weight average molecular weight of the polytrimethylene terephthalate resin and Mn represents the number average molecular weight of the polytrimethylene terephthalate resin;

(C) a cyclic dimer content of not greater than 2% by weight, the cyclic dimer being represented by the following formula (1):

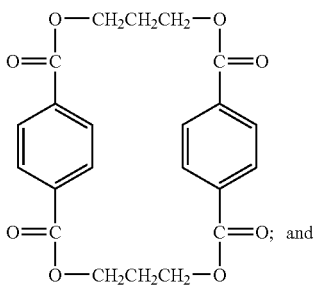

(D) a psychometric lightness L-value of from 70 to 100 and a psychometric chroma b*-value of from −5 to 25.

For easy understanding of the present invention, the essential features and various preferred embodiments of the present invention are enumerated below.

1. A polytrimethylene terephthalate resin comprising:
60 to 100 mole % of (a) trimethylene terephthalate recurring units, and
0 to 40 mole % of (b) at least one monomer unit selected from the group consisting of monomer units obtained from comonomers which are other than the monomers used for forming the trimethylene terephthalate recurring units and which are copolymerizable with at least one of the monomers used for forming the trimethylene terephthalate recurring units,
the total molar amount of (a) monomer units and (b) monomer units being 100 mole %,
the polytrimethylene terephthalate resin having the following characteristics (A) to (D):

(A) an intrinsic viscosity [η] of from 0.6 to 4 dl/g;
(B) a molecular weight distribution of from 2 to 2.7 in terms of the Mw/Mn ratio, wherein Mw represents the weight average molecular weight of the polytrimethylene terephthalate resin and Mn represents the number average molecular weight of the polytrimethylene terephthalate resin;
(C) a cyclic dimer content of not greater than 2% by weight, the cyclic dimer being represented by the following formula (1):

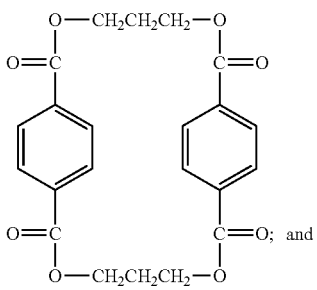

(D) a psychometric lightness L-value of from 70 to 100 and a psychometric chroma b*-value of from −5 to 25.

2. The polytrimethylene terephthalate resin according to item 1 above, which is in the form of pellets,
the pellets having a crystallinity ($X_c$) of 40% or less, wherein the crystallinity ($X_c$) is defined by the following formula (2):

$$X_c(\%)=(\{\rho_c \times (\rho_s-\rho_a)\}/\{\rho_s \times (\rho_c-\rho_a)\}) \times 100 \qquad (2)$$

wherein $\rho_a$ is 1.300 g/cm³ which is an amorphous density of trimethylene terephthalate homopolymer, $\rho_c$ is 1.431 g/cm³ which is a crystal density of trimethylene terephthalate homopolymer, and $\rho_s$ represents a density (g/cm³) of the pellets.

3. A method for producing the polytrimethylene terephthalate resin of item 1 or 2 above, which comprises:

(1) providing a crude trimethylene terephthalate resin in a molten form, the crude trimethylene terephthalate resin comprising:
60 to 100 mole % of (a) trimethylene terephthalate recurring units, and
0 to 40 mole % of (b) at least one monomer unit selected from the group consisting of monomer units obtained from comonomers which are other than the monomers used for forming the trimethylene terephthalate recurring units and which are copolymerizable with at least one of the monomers used for forming the trimethylene terephthalate recurring units,
the total molar amount of (a) monomer units and (b) monomer units being 100 mole %,
the crude trimethylene terephthalate resin further comprising a cyclic dimer represented by the following formula (1):

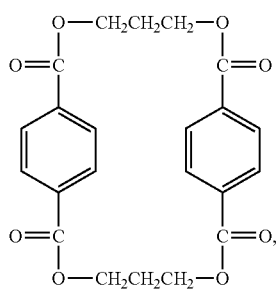

the crude trimethylene terephthalate resin having an intrinsic viscosity [η] of from 0.2 to 4 dl/g and a cyclic dimer formation index (E) of less than 0.066, the cyclic dimer formation index (E) being defined by the following formula (3):

$$E = W/M \qquad (3)$$

wherein M represents the terminal hydroxyl group content of the crude trimethylene terephthalate resin in terms of mole % based on the total molar amount of the trimethylene terephthalate units, and W represents the re-formation rate of the cyclic dimer in terms of an increase (as expressed by absolute percentage value) in the cyclic dimer content (% by weight), per minute, of the crude trimethylene terephthalate resin as measured at 260° C. in nitrogen gas atmosphere with respect to a sample of the crude polytrimethylene terephthalate resin in a molten form, wherein the molten sample is obtained by melting a cyclic dimer-reduced sample of the crude polytrimethylene terephthalate resin which cyclic dimer-reduced sample has a cyclic dimer content reduced to 0.1% by weight or less; and (2) removing, from the crude polytrimethylene terephthalate resin in a molten form, 0.5% by weight or more, based on the weight of the crude polytrimethylene terephthalate resin, of the cyclic dimer, by volatilization under reduced pressure.

4. The method according to item 3 above, wherein the crude polytrimethylene terephthalate resin has a cyclic dimer formation index (E) of less than 0.033.

5. The method according to item 3 or 4 above, wherein the crude trimethylene terephthalate resin in a molten form provided in the step (1) has an intrinsic viscosity [η] of from 0.2 to 2 dl/g, and the removal of the cyclic dimer in the step (2) is performed by a method comprising continuously feeding the crude trimethylene terephthalate resin in a molten form to a guide-wetting fall polymerizer having a perforated plate and at least one guide provided in association with the perforated plate, wherein the crude trimethylene terephthalate resin is allowed to fall along and in contact with the surface of the at least one guide provided in the polymerizer at a temperature which is equal to or higher than the crystalline melting point of the crude trimethylene terephthalate resin and is not higher than 290° C. under reduced pressure, so that polymerization of the crude trimethylene terephthalate resin and volatilization of the cyclic dimer are effected during the fall of the crude trimethylene terephthalate resin, while continuously withdrawing the resultant trimethylene terephthalate resin from the polymerizer.

6. The method according to item 3 or 4 above, wherein the crude trimethylene terephthalate resin in a molten form provided in the step (1) has an intrinsic viscosity [η] of from 0.6 to 4 dl/g, and the removal of the cyclic dimer in the step (2) is performed by means of a thin film evaporator under conditions wherein:

(a) the pressure in the thin film evaporator is a pressure of 2.6 kPa or less, (b) a thin film of the crude polytrimethylene terephthalate resin in a molten form is formed on the inner wall of the thin film evaporator, while performing the surface renewal of the crude polytrimethylene terephthalate resin, (c) the thin film of the crude polytrimethylene terephthalate resin in a molten form has a resin-gas contact area of 1 $cm^2/g$ or more, in terms of a value calculated by dividing the area of the crude polytrimethylene terephthalate resin which is in contact with the gaseous phase inside the thin film evaporator by the weight of the crude polytrimethylene terephthalate resin present in the thin film evaporator, and (d) the polytrimethylene terephthalate resin occupies not more than 40% of the inner space of the thin film evaporator.

7. The method according to any one of items 3 to 6 above, wherein the crude trimethylene terephthalate resin is produced by a polycondensation reaction performed in the presence of a catalyst comprising at least one titanium compound and at least one phosphorus compound selected from the group consisting of phosphoric acid, a phosphoric ester, phosphorous acid, a phosphorous ester and a phosphorus compound represented by the following formula (4):

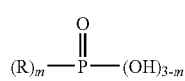

(4)

wherein m is an integer of 1 or 2, and each R independently represents

wherein n is an integer of from 0 to 3, wherein the at least one titanium compound and the at least one phosphorus compound are used in respective amounts such that the phosphorus/titanium atomic ratio is in the range of from 0.01 to 10.

8. The method according to any one of items 3 to 7 above, wherein the crude trimethylene terephthalate resin is produced by a polycondensation reaction performed in the presence of a catalyst comprising at least one tin compound having no carbon-tin bond.

Hereinbelow, the present invention is described in detail.

The polytrimethylene terephthalate (PTT) resin of the present invention comprises:

60 to 100 mole % of trimethylene terephthalate recurring units, and 0 to 40 mole % of at least one monomer unit (comonomer unit) selected from the group consisting of monomer units obtained from comonomers which are other than the monomers used for forming the trimethylene terephthalate recurring units and which are copolymerizable with at least one of the monomers used for forming the trimethylene terephthalate recurring units.

The trimethylene terephthalate recurring units are formed by the reaction of a terephthalic acid material with a trimethylene glycol material. Examples of terephthalic acid materials include terephthalic acid, and diesters of terephthalic acid, such as dimethyl terephthalate. Examples of trimethylene glycol materials include 1,3-propanediol, 1,2-propanediol, 1,1-propanediol, 2,2-propanediol, and a mixture thereof. From the viewpoint of stability, 1,3-propanediol is especially preferred as a trimethylene glycol material.

Examples of the above-mentioned comonomers include ester-forming monomers, such as 5-sulfoisophthalic acid sodium salt, 5-sulfoisophthalic acid potassium salt, 4-sulfo-2,6-naphthalenedicarboxylic acid sodium salt, 3,5-dicarboxylic acid benzenesulfonic acid tetramethylphosphonium salt, 3,5-dicarboxylic acid benzenesulfonic acid tetrabutylphosphonium salt, 3,5-dicarboxylic acid benzenesulfonic acid tributylmethylphosphonium salt, 3,6-dicarboxylic acid naphthalene-4-sulfonic acid tetrabutylphosphonium salt, 3,6-dicarboxylic acid naphthalene-4-sufonic acid tetramethylphosphonium salt, 3,5-dicarboxylic acid benzenesulfonic acid ammonium salt, 2,3-butanediol, 1,3-butanediol, 1,4-butanediol, neopentyl glycol, 1,5-pentamethyleneglycol, 1,6-hexamethylene glycol, heptamethylene glycol, octamethylene glycol, decamethylene glycol, dodecamethylene glycol, 1,4-cyclohexanediol, 1,3-cyclohexanediol, 1,2-cyclohexanediol, 1,4-cyclohexanedimethanol, 1,3-cyclohexanedimethanol, 1,2-cyclohexanedimethanol, oxalic acid, malonic acid, succinic acid, gultaric acid, adipic acid, heptanedioic acid, octanedioic acid, sebacic acid, dodecanedioic acid, 2-methylgultaric acid, 2-methyladipic acid, fumaric acid, maleic acid, itaconic acid, 1,4-cyclohexanedicarboxylic acid, 1,3-cyclohexanedicarboxylic acid, 1,2-cyclohexanedicarboxylic acid, oxyacetic acid, and oxybenzoic acid; and polyols having a molecular weight of from 200 to 100,000, such as a polyethylene glycol and a polytetramethylene glycol. Further, the PTT resin of the present invention may comprise a comonomer unit which is formed during the polymerization reaction for producing the PTT resin. As an example of such comonomer units, there can be mentioned a 1,3-propanediol dimer unit (i.e., bis(3-hydroxypropyl)ether unit). Specifically, for example, a bis(3-hydroxypropyl)ether unit is incorporated into the PTT resin as follows. Two molecules of 1,3-propanediol are reacted with each other to form bis(3-hydroxypropyl)ether, and incorporated into the polymer chain of the PTT resin as the bis(3-hydroxypropyl)ether unit. Alternatively, a molecule of 1,3-propanediol is reacted with a terminal 3-hydroxylpropyl group of the polymer being formed, so that a bis(3-hydroxypropyl)ether unit is incorporated into the polymer chain of the PTT resin. When the PTT resin of the present invention contains bis(3-hydroxypropyl) ether unit, the amount of bis(3-hydroxypropyl)ether unit is generally from 0.01 to 5% by weight, preferably from 0.04 to 2% by weight, based on the weight of the PTT resin.

The polytrimethylene terephthalate resin of the present invention may further comprise, as an additional component(s): cyclic or chain oligomers other than polytrimethylene terephthalate resin; monomers, such as dimethyl terephthalate (hereinafter, referred to as "DMT"), terephthalic acid (hereinafter, referred to as "TPA") and trimethylene glycol (hereinafter, referred to as "TMG"); and/or any of various additives, such as a delustering agent, a thermal stabilizer and a flame retardant. The amount of the above-mentioned additional component(s) is generally from 0.001 to 5% by weight, preferably from 0.005 to 2.5% by weight, based on the weight of the PTT resin.

For obtaining a fiber or a shaped article, which has excellent strength and color, and which is aimed at in the present invention, it is necessary not only to improve the polymerization degree of the PTT resin while narrowing the distribution of polymerization degree, but also to improve the whiteness of the resin while improving the resistance of the resin against the discoloration at high temperatures.

As a yardstick of the polymerization degree, the intrinsic viscosity [η] can be used. For obtaining the above-mentioned excellent fiber or shaped article, which has excellent strength, it is necessary that the resin (used for producing the fiber or shaped article) have an intrinsic viscosity of [η] 0.6 dl/g or more. On the other hand, from the viewpoint of improving the moldability of the resin and the ease in measuring the amount of the resin in a gear pump used for charging the resin (in a molten form) into a molding machine, the intrinsic viscosity should not be too high. For this reason, it is necessary that the intrinsic viscosity [η] be 4 dl/g or less. The intrinsic viscosity [η] is preferably in the range of from 0.7 to 3 dl/g, more preferably from 0.8 to 2.5 dl/g, still more preferably from 1.0 to 2.0 dl/g.

Further, for improving the strength of the above-mentioned fiber or shaped article, not only should the average polymerization degree be high, but also the amount of a low molecular weight polymer should be low, namely, the molecular weight distribution should be narrow. In the present invention, the molecular weight distribution is expressed in terms of a value (Mw/Mn) which is calculated by dividing the weight average molecular weight (Mw) by the number average molecular weight (Mn), wherein each of Mw and Mn is measured by gel permeation chromatography. In the present invention, it is necessary that the Mw/Mn value be 2.7 or less. The Mw/Mn value is preferably 2.6 or less, more preferably 2.5 or less, still more preferably 2.4 or less. In general, the lower limit of the molecular weight distribution of a condensation polymer is 2.

For producing a PTT resin which has excellent moldability, and which can be used for producing a shaped article which not only is suitable for coating with a coating composition or adhesive agent and exhibits excellent adhesion property, but also has excellent mechanical properties and excellent color, it is necessary that the cyclic dimer content of the PTT resin be not greater than 2% by weight. The cyclic dimer content of the PTT resin is measured as follows. A PTT resin is dissolved in a deuterated hexafluoroisopropanol solvent, and the resultant solution is analyzed by high-resolution Fourier-Transform Nuclear Magnetic Resonance (FT-NMR) spectroscopy, to thereby determine the cyclic dimer content (% by weight) of the PTT resin.

For improving the above-mentioned properties of the PTT resin and the shaped article obtained therefrom, it is preferred that the cyclic dimer content is as small as possible. Specifically, it is preferred that the cyclic dimer content is not greater than 1.7% by weight, more advantageously not greater than 1.5% by weight, still more advantageously not greater than 1.0% by weight, most advantageously not greater than 0.8% by weight.

With respect to the color of the PTT resin, for suppressing the darkening of the ultimate shaped article and for easily imparting a desired color to the resin by the use of a dye or a pigment, it is necessary that the PTT resin have a psychometric lightness L-value of 70 or more and a psychometric chroma b*-value of −5 or more. On the other hand, for suppressing the discoloration (i.e., yellowing) of the shaped article, it is necessary that the b*-value be 25 or less. There is no particular limit with respect to the upper limitation of the L-value, but in general, it is 100. The L-value is preferably 75 or more, more preferably 80 or more. The b*-value is preferably from −3 to 15, more preferably from −2 to 10.

Further, from the studies of the present inventors, it has been found that for improving the whiteness of the ultimate shaped article, a PTT resin used for producing a shaped article should exhibit not only excellent whiteness, but also excellent resistance to discoloration during the heating of the resin (e.g., during the high temperature drying, melt molding or the like of the resin). The reason for this is not clear, but it is presumed that the discoloration of the resin is caused by not only the thermal decomposition of the resin per se, but also certain substances or functional groups which are inevitably contained in the PTT resin. It is considered that the above-mentioned substances or functional groups are formed by heat decomposition of a prepolymer (used in the production of the PTT resin) and/or the PTT resin. However, especially when the below-mentioned guide-wetting fall process is employed, it is possible to obtain a PTT resin which has excellent resistance to the discoloration during the heating. The reason for this is considered as follows. The guide-wetting fall process is advantageous not only in that the leakage of oxygen into the polymerization reaction system can be suppressed, thereby preventing the formation of the above-mentioned substances and functional groups, but also in that the surface area of the prepolymer being polymerized in the polymerizer employed in this process is extremely large as compared to the case of polymerizers which are conventionally employed for the production of a PTT resin, and the surface of the prepolymer is efficiently renewed, so that the above-mentioned substances or functional groups, if any, can be easily withdrawn from the reaction system.

As a yardstick of the susceptibility to discoloration by heat, the color of a PTT resin after heating at 180° C. for 24 hours in air can be used. In the present invention, it is preferred that the PTT resin heated under the above-mentioned conditions have a psychometric lightness L-value (L-2) of 70 or more, and a psychometric chroma b*-value (b*-2) of from −5 to 25. The psychometric lightness L-value (L-2) is more preferably 75 or more, still more preferably 80 or more. The psychometric chroma b*-value (b*-2) is more preferably from −4 to 21, still more preferably from −3 to 18, most preferably from −2 to 16.

The PTT resin of the present invention can be used, for example, for producing an extrusion-molded article, such as a film or a sheet. In the production of such an extrusion-molded article, it is desired that the PTT resin simultaneously satisfies all of the following requirements: a very high molecular weight, a very narrow molecular weight distribution and a very low cyclic dimer content. Therefore, it is preferred that the PTT resin for use in the production of an extrusion-molded article has an intrinsic viscosity [η] of from 1.25 to 2.5 dl/g, an Mw/Mn ratio of 2.5 or less and a cyclic dimer content of not greater than 1.8% by weight; it is more preferred that the resin has an intrinsic viscosity [η] of from 1.28 to 2.2 dl/g, an Mw/Mn ratio of 2.4 or less and a cyclic dimer content of not greater than 1.7% by weight; and it is still more preferred that the resin has an intrinsic viscosity [η] of from 1.30 to 2.0 dl/g, an Mw/Mn ratio of 2.35 or less and a cyclic dimer content of not greater than 1.5% by weight. When the production of the PTT resin is conducted by the guide-wetting fall process (explained below), the polymerization rate is high and the surface area of the prepolymer being polymerized is large. Therefore, not only can the polymerization degree be improved to a level which has never been achieved by a conventional melt polymerization process, but also the cyclic dimer content can be lowered. Further, in the guide-wetting fall process, the polymerization degree can be improved while maintaining a high piston flowability (the "high piston flowability" means a property that the flowing resin in the polymerizer has no local variation of the flow rate, i.e., the flowing resin as a whole has a uniform flow rate). Thus, by the guide-wetting fall process, it is possible to obtain a PTT resin having a narrow molecular weight distribution, i.e., a resin which does not contain polymers having largely different molecular weights. When a PTT resin is produced by the solid-phase polymerization, the resin produced exhibits a high polymerization degree. However, in the solid-phase polymerization, the polymerization degree varies depending on the reaction site in the pellets (i.e., whether the reaction site is at an inner portion or outer portion of the pellets), and also varies depending on the size and shape of the pellets, so that it is very difficult to obtain a polymer having a narrow molecular weight distribution. By the method of the present invention (described below), it has, for the first time, become possible to produce a PTT resin which can be suitably used for the commercial scale production of the above-mentioned extrusion-molded article.

The PTT resin of the present invention immediately after the production thereof, which is in a molten form, can be spun or shaped. Alternatively, the resin can be formed into pellets, and then re-melted at the time of spinning or shaping of the resin.

When the resin is used in the form of pellets, it is desired that the loss is small, and that the pellets can be extruded uniformly by means of an extruder or any other types of molding machines. Therefore, it is preferred that each pellet has an appropriate size, and that the amount of polymer powder adhering to the surface of the pellets is small. It is preferred that the average weight of pellets is from 1 to 1,000 mg per pellet. The pellets having such an average weight are advantageous in that uniform extrusion of the pellets by means of an extrusion molding machine becomes easy, that the pellets can be handled with ease at the time of transportation, drying, spinning and shaping thereof, and that the drying rate of the pellets becomes high. The average weight of the pellets is more advantageously from 5 to 500 mg per pellet, still more advantageously from 10 to 200 mg per pellet. With respect to the shape of the pellet, there is no particular limitation, and the shape of the pellet may be any of a sphere, a rectangle, a cylinder and a cone. However, from the viewpoint of ease in handling of the pellets, it is preferred that the length of the largest portion of each pellet is 15 mm or less, more advantageously 10 mm or less, still more advantageously 5 mm or less.

With respect to the polymer powder adhering to the surface of the pellets, it is preferred that the amount of the polymer powder is in the range of from 0 to 0.5% by weight, based on the total weight of the pellets, which powder passes through a 30-mesh filter and does not pass through a 300-mesh filter. When the amount of the polymer powder is 0.5% by weight or less, not only is the loss decreased, but also it becomes possible to prevent the clogging of a pneumatic line (i.e., pipe line in which pellets are transferred by gas) or a filter of an air-exhaust ventilator attached to a dryer, and to suppress the pressure fluctuation in an extruder during the spinning, shaping or compounding, so that ultimate products having a uniform quality can be easily obtained. It is preferred that the amount of the polymer powder is as small as possible. From a practical point of view, the amount of the polymer powder is in the range of from 0 to 0.2% by weight, more preferably from 0 to 0.1% by weight, still more preferably from 0 to 0.05% by weight, based on the total weight of the pellets.

Further, it is preferred that the pellets have a crystallinity ($X_c$) of 0 to 40%, wherein the crystallinity is defined by the following formula:

$$X_c(\%) = \{\rho_c \times (\rho_s - \rho_a)\} / \{\rho_s \times (\rho_c - \rho_a)\} \times 100$$

wherein $\rho_a$ is 1.300 g/cm³ which is an amorphous density of trimethylene terephthalate homopolymer, $\rho_c$ is 1.431 g/cm³ which is a crystal density of trimethylene terephthalate homopolymer, and $\rho_s$ represents a density (g/cm³) of the pellets.

The above-mentioned crystal density of trimethylene terephthalate homopolymer (1.431 g/cm³) is a theoretical value which is calculated from the number of crystal lattices of trimethylene terephthalate homopolymer. The above crystal density value (1.431 g/cm³) is described in "Poritorimechirenterefutareto no Kesshoudanseiritsu (Crystal elasticity of polytrimethylene terephthalate)" ("Zairyou (Material)", written by Katsuhiko Nakamae, Vol. 35, No. 396, p. 1067, 2000). Further, the amorphous density of trimethylene terephthalate homopolymer (1.300 g/cm³) is obtained by measuring the density of a sample amorphous polymer obtained by quenching a trimethylene terephthalate homopolymer in a molten form. (With respect to the sample polymer, it can be confirmed that the sample polymer is amorphous, when no crystal peak is observed in the analysis of the sample polymer by X-ray diffractometry.)

When the pellets have the above-mentioned crystallinity, it becomes possible to prevent a problem which is unique to a PTT and is unlikely to arise in the case of other polyesters, such as a PET and a PBT (polybutylene terephthalate), i.e., a problem that pellets become brittle and generate a large amount of polymer powder during the transportation of the pellets by means of a pneumatic conveyor or a feeder. It is preferred that the crystallinity is from 0 to 35%, more advantageously from 0 to 30%.

In the present invention, the crystallinity of a pellet means an average value of crystallinity values as measured at different portions of the pellet. Specifically, for example, it is preferred that, when a surface portion of the pellet is cut away from a central portion of the pellet and crystallinities are measured at 3 or more different portions with respect to each of the surface and central portions of the pellet, all of the measured crystallinity values are in the above-mentioned crystallinity range. Further, it is preferred that the difference in crystallinity between the surface portion and the central portion is 40% or less, more advantageously 30% or less, still more advantageously 20% or less.

For obtaining pellets having the above-mentioned crystallinity, it is preferred that a PTT resin in a molten form, which is obtained by polymerization, is extruded into a strand or a sheet, and, subsequently, the obtained strand or sheet is immersed in a coolant, such as water, to cool the strand or sheet, followed by cutting of the strand or sheet to obtain pellets. It is preferred that the temperature of the coolant is 20° C. or less, more advantageously 15° C. or less, still more advantageously 10° C. or less. From the viewpoint of economy and ease in handling of the pellets, it is preferred to use water as a coolant. Naturally, the temperature of water as a coolant is 0° C. or more. It is preferred that the cutting to obtain pellets is performed with respect to the strand or sheet solidified by cooling the extruded strand or sheet to 55° C. or lower within 120 seconds after the extrusion.

Next, an explanation is made below with respect to the method for producing the polytrimethylene terephthalate (PTT) resin of the present invention.

As mentioned above, in the polymerization reaction system for producing a PTT resin, there is a ring-linear chain equilibrium between the cyclic dimer and the linear dimer unit at the hydroxyl group-containing terminal of a PTT resin. Therefore, when a PTT resin is produced by a conventional melt polymerization process, a part of the cyclic dimer contained in the PTT resin is volatilized during the polymerization; however, the cyclic dimer is immediately generated again in the same amount as that of the volatilized cyclic dimer, thereby causing the loss of the PTT. Thus, by the conventional melt polymerization process, it is impossible to produce a PTT containing the unfavorable cyclic dimer in a significantly reduced amount. Thus, the yield of the desired PTT becomes inevitably low. Further, as mentioned above, as a result of the studies of the present inventors, it has been found that, even when a PTT having its cyclic dimer content reduced to less than 1% by weight is produced by the solid-phase polymerization process, the cyclic dimer is rapidly produced upon melting thereof during the melt-molding of the PTT, and the reduced cyclic dimer content of the PTT returns to the cyclic dimer content (about 2.5 to 3.5% by weight) of the prepolymer prior to the solid-phase polymerization in which the hydroxyl group-containing terminal portions are at the ring-linear chain equilibrium state.

In this situation, the present inventors have made detailed analysis with respect to the properties and formation mechanism of the cyclic dimer. As a result, it has been found that the cyclic dimer is mainly formed by the so-called "back-biting reaction" which occurs at the hydroxyl group-containing terminal portions of the PTT resin, and that the formation rate of the cyclic dimer is influenced by the terminal hydroxyl group content of the PTT resin and the type of polymerization catalyst which is used in the production of the PTT. The "back-biting reaction" is an intramolecular reaction represented by the following formula:

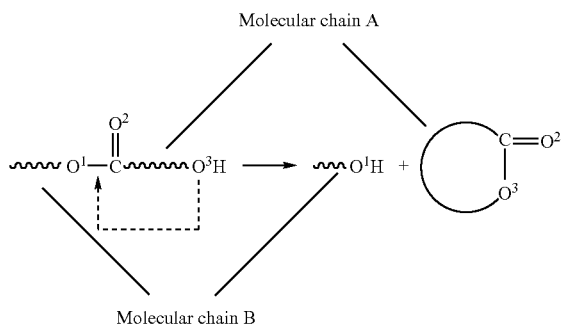

wherein $O^1$, $O^2$ and $O^3$ represents three different oxygen (O) atoms, respectively.

In the back-biting reaction, a hydroxyl group (positioned at the terminal of a PTT resin) and an ester group, which groups belong to the same polymer chain, react with each other, thereby causing the formation of a cyclic dimer and the subsequent re-formation of the terminal hydroxyl group. As apparent from the above formula, the back-biting reaction occurs at the hydroxyl group-containing terminal portions and, hence, the reaction rate of the back-biting reaction is proportional to the terminal hydroxyl group content of the PTT resin.

When a PTT produced by a conventional technique is maintained in a molten form at 260° C., the PTT always shows substantially the same cyclic dimer content, namely, about 2.6% by weight due to the above-mentioned ring-linear chain equilibrium. Further, even when a PTT having a cyclic dimer content of about 1.0% by weight is produced by the solid-phase polymerization process, the cyclic dimer is rapidly produced when the PTT resin is melted and maintained at 260° C., and the cyclic dimer content increases to about 2.6% by weight within a period of from several minutes to several tens of minutes after the start of the melting of the resin and, then, the cyclic dimer content is maintained at about 2.6% by weight.

The present inventors have found that, when a PTT resin has a high content of terminal hydroxyl group (which causes the back-biting reaction) (e.g., when the PTT resin has a low polymerization degree), the cyclic dimer formation rate of the PTT resin becomes high, whereas, when a PTT resin has a low content of terminal hydroxyl group (e.g., when the PTT resin has a high polymerization degree or when the terminal hydroxyl groups of the PTT resin are blocked), the cyclic dimer formation rate of the PTT becomes low.

Further, the present inventors have also found that the cyclic dimer formation rate of a PTT resin is also greatly influenced by factors other than the terminal hydroxyl group content, for example, the type of polycondensation catalyst used in the production of the PTT resin, and that the cyclic dimer formation rate can be greatly suppressed by the use of a specific polycondensation catalyst and/or by highly purifying the PTT resin by a specific method.

Furthermore, in order to develop a technique for efficiently removing the cyclic dimer from a PTT resin by volatilization, the present inventors have isolated and purified the cyclic dimer, and evaluated the vapor pressure of the purified cyclic dimer at high temperatures under reduced pressure. As a result, the present inventors have succeeded in developing a method for stably producing, on a commercial scale, a PTT resin which has a low cyclic dimer content and is capable of suppressing the formation of the cyclic dimer even during the melt molding and, hence, can be advantageously used as a raw material for producing a high quality shaped article which is suitable for coating with a coating composition or adhesive agent and exhibits excellent adhesion property. Conventionally, it has been considered that a PTT resin having a low cyclic dimer content cannot be obtained by only the melt polymerization process due to the above-mentioned ring-linear chain equilibrium. However, by the above-mentioned method developed by the present inventors, it has become possible to produce the above-mentioned excellent PTT resin (which has a low cyclic dimer content and is capable of suppressing the formation of the cyclic dimer during the melt molding) even when the polymerization for producing a PTT resin is performed by only the melt polymerization process (without using the solid-phase polymerization process).

Accordingly, in another aspect of the present invention, there is provided a method for producing a polytrimethylene terephthalate (PTT) resin, which comprises:

(1) providing a crude trimethylene terephthalate resin in a molten form, the crude trimethylene terephthalate resin comprising:

60 to 100 mole % of (a) trimethylene terephthalate recurring units, and 0 to 40 mole % of (b) at least one monomer unit selected from the group consisting of monomer units obtained from comonomers which are other than the monomers used for forming the trimethylene terephthalate recurring units and which are copolymerizable with at least one of the monomers used for forming the trimethylene terephthalate recurring units, the total molar amount of (a) monomer units and (b) monomer units being 100 mole %, the crude trimethylene terephthalate resin further comprising a cyclic dimer represented by the following formula (1):

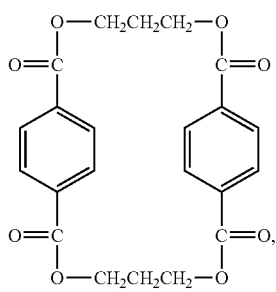

the crude trimethylene terephthalate resin having an intrinsic viscosity [η] of from 0.2 to 4 dl/g and a cyclic dimer formation index (E) of less than 0.066, the cyclic dimer formation index (E) being defined by the following formula (3):

$$E=W/M \qquad (3)$$

wherein M represents the terminal hydroxyl group content of the crude trimethylene terephthalate resin in terms of mole % based on the total molar amount of the trimethylene terephthalate units, and W represents the re-formation rate of the cyclic dimer in terms of an increase (as expressed by absolute percentage value) in the cyclic dimer content (% by weight), per minute, of the crude trimethylene terephthalate resin as measured at 260° C. in nitrogen gas atmosphere with respect to a sample of the crude polytrimethylene terephthalate resin in a molten form, wherein the molten sample is obtained by melting a cyclic dimer-reduced sample of the crude polytrimethylene terephthalate resin which cyclic dimer-reduced sample has a cyclic dimer content reduced to 0.1% by weight or less; and (2) removing, from the crude polytrimethylene terephthalate resin in a molten form, 0.5% by weight or more, based on the weight of the crude polytrimethylene terephthalate resin, of the cyclic dimer, by volatilization under reduced pressure.

The terminal hydroxyl group content (M) of a crude PTT resin is a percentage of the molar amount of terminal hydroxyl group of the polymer, based on the total molar amount of the trimethylene terephthalate units, wherein the molar amount of terminal hydroxyl group is determined by a method in which a crude resin is dissolved in a deuterated hexafluoroisopropanol solvent, and the resultant solution is subjected to high-resolution Fourier-Transform Nuclear Magnetic Resonance (FT-NMR) spectroscopy.

The cyclic dimer re-formation rate (W) is a yardstick of the rate of formation of the cyclic dimer in the crude PTT resin. The cyclic dimer re-formation rate (W) is determined as follows. A sample of the crude PTT resin is subjected to an extraction, for example, by means of a Soxhlet's extractor or the like, to thereby reduce the cyclic dimer content of the crude resin sample to 0.1% by weight or less. Then, the resultant cyclic dimer-reduced sample is placed in a container, such as a glass ampule, and the container is purged with nitrogen. Then, the cyclic dimer-reduced sample in the container is heated at 260° C. so as to maintain the sample in a molten form for a predetermined period of time, and the amount (% by weight, based on the weight of the sample) of the cyclic dimer re-formed during the melting of the sample is measured, and the obtained % by weight value is divided by the time (minutes) for which the sample has been maintained in a molten form, to thereby obtain the cyclic dimer re-formation rate (W). The time for maintaining the crude resin sample in a molten form is adjusted depending on the re-formation rate of the cyclic dimer, so that the cyclic dimer content of the crude resin sample after the heating for maintaining the crude resin sample in a molten form does not exceed 2% by weight. The reason for this is as follows. When the cyclic dimer content of the crude resin sample is not greater than 2% by weight, the amount of the cyclic dimer reformed is proportional to the time for which the crude resin sample has been maintained in a molten form. That is, the cyclic dimer re-formation rate (W) is constant until the amount of the cyclic dimer content reaches 2% by weight. However, when the cyclic dimer content of the crude resin exceeds 2% by weight, the cyclic dimer re-formation rate (W) is gradually lowered in accordance with the increase in the cyclic dimer content.

The cyclic dimer content of a crude PTT resin is generally from 0.5 to 3.6% by weight, preferably from 1.0 to 2.8% by weight, more preferably from 2.3 to 2.7% by weight.

As mentioned above, as a result of the studies of the present inventors, it has been found that the cyclic dimer is formed by the back-biting reaction at the hydroxyl group-containing terminal portions of a PTT resin, and that, when the terminal hydroxyl group content (M) of a PTT resin is high, the cyclic dimer re-formation rate (W) becomes high, and the terminal hydroxyl group content (M) is almost proportional to the cyclic dimer re-formation rate (W).

Further, the present inventors have also found that the cyclic dimer re-formation rate (W) is also greatly influenced by other factors (i.e., factors other than the terminal hydroxyl group content (M)) involved in the production of the PTT resin (e.g., the degree of activity of the polymerization catalyst to catalyze the back-biting reaction as a side reaction), and that the cyclic dimer re-formation rate can be greatly suppressed by a method, such as a method using a specific polycondensation catalyst or a method in which a high purity PTT resin is produced by a specific method.

In the present invention, the cyclic dimer formation index (E) (=W/M) is used to evaluate the ability of the crude PTT resin to form the cyclic dimer in terms of a relationship between the cyclic dimer re-formation rate (W) and the terminal hydroxyl group content (M), wherein the cyclic dimer re-formation rate (W), as mentioned above, is influenced not only by the terminal hydroxyl group content, but also by other factors involved in the production of the PTT resin, such as the type of polymerization catalyst which is used in the production of the PTT resin, and the purity of the crude PTT resin. The present inventors have found that a crude PTT resin having a cyclic dimer formation index (E) of less than 0.066 can be obtained by the improvement of a polymerization catalyst or by highly purifying the crude resin, and that, by removing 0.5% by weight or more (based on the weight of the crude resin) of the cyclic dimer from the crude resin in a molten form by volatilization under reduced pressure, the following advantages (1) to (3) can be achieved.

(1) Despite the use of the melt polymerization process for producing the PTT resin, the cyclic dimer content of the PTT resin can be significantly reduced.

(2) The amount of cyclic dimer volatilized during the production of the crude PTT resin can be greatly suppressed, thereby preventing the clogging of the conduit provided in the PTT resin production system, which clogging is caused by the deposition of the volatilized cyclic dimer on the inner wall of the conduit; and (3) The PTT resin (having a low cyclic dimer content) produced by this method is capable of suppressing the formation of the cyclic dimer even when the resin is melted for the purpose of melt molding, so that the cyclic dimer content of the resin is unlikely to return to a value (approximately 2.5 to 3.5% by weight) measured with respect to a PTT resin in which the hydroxyl group-containing terminal portions are at the ring-linear chain equilibrium. As a result, it has become possible to provide a PTT resin which not only has excellent moldability, but also can be used for producing a shaped article which is suitable for coating with a coating composition or adhesive agent and exhibits excellent adhesion property. Such excellent effects cannot be obtained by a PTT resin which has its cyclic dimer content temporarily reduced by using the solid-phase polymerization process.

With respect to the method for adjusting the cyclic dimer formation index (E) to a value less than 0.066, there is no particular limitation. However, as examples of the method for adjusting the cyclic dimer formation index (E), there can be mentioned the following methods (i) to (iii).

(i) Method in which the crude PTT resin is produced so as to have a high purity: in this method, for example, a low molecular weight glycol ester, such as bis-hydroxypropyl terephthalate (BHPT), is produced by reacting a high purity terephthalic acid with trimethylene glycol in the absence of a catalyst. The obtained low molecular weight glycol ester is further polymerized in vacuo at 230 to 270° C. for 2 to 30 hours, to thereby obtain a crude PTT resin having a cyclic dimer formation index (E) within the range defined in the present invention.

(ii) Method using a specific polymerization catalyst: in this method, as described below in detail, a crude PTT resin having a cyclic dimer formation index (E) within the range defined in the present invention is obtained by using a specific polymerization catalyst.

(iii) Method in which the polymerization is deactivated: in this method, a crude PTT resin having a high polymerization degree is produced and, then, a deactivating agent (described below) for deactivating the residual polymerization catalyst is added to the crude PTT resin, to thereby obtain a crude PTT resin having a cyclic dimer formation index (E) within the range defined in the present invention.

The above-mentioned methods (i) to (iii) may be employed individually or in combination. Further, it is possible to suppress the formation of the cyclic dimer by employing any of the above-mentioned methods (i) to (iii) in combination with a method for reducing the terminal hydroxyl group content of a crude PTT resin, i.e., a method in which a monofunctional comonomer (e.g., benzoic acid) is used as a comonomer in the polymerization for producing the crude PTT resin or the crude PTT resin is reacted with an acid anhydride, to thereby reduce the terminal hydroxyl group content of the crude PTT resin.

With respect to the cyclic dimer formation index (E), for obtaining a PTT resin having a satisfactorily low cyclic dimer content, it is necessary that the cyclic dimer formation index (E) be less than 0.066. The cyclic dimer formation index (E) is preferably 0.050 or less, and, from the viewpoint of reducing the load on the cyclic dimer volatilization equipment, the cyclic dimer formation index (E) is more preferably 0.033 or less. From the viewpoint of enabling the recycling of the PTT resin of the present invention, the cyclic dimer formation index (E) is still more preferably 0.016 or less, most preferably 0.010 or less.

In the method of the present invention, the crude PTT resin has an intrinsic viscosity [η] in the range of from 0.2 to 4 dl/g. For effectively removing the cyclic dimer using the below-described apparatus for removing the cyclic dimer by volatilization, it is preferred that the intrinsic viscosity [η] is 0.2 dl/g or more. On the other hand, for improving the moldability of the resin and the ease in measuring the amount of the resin in a gear pump, the intrinsic viscosity should not be too high. For this reason, it is necessary that the intrinsic viscosity [η] be 4 dl/g or less. The intrinsic viscosity [η] can be appropriately selected in accordance with the type of apparatus for removing the cyclic dimer by volatilization. It is preferred that the intrinsic viscosity [η] is in the range of from 0.3 to 3.5 dl/g, more advantageously from 0.4 to 3 dl/g, still more advantageously from 0.6 to 2 dl/g.

As a preferred example of the method for producing the PTT resin of the present invention, there can be mentioned a method (method (I)) in which the crude PTT resin in a molten form (prepolymer) provided in step (1) of the method of the present invention has an intrinsic viscosity [η] of from 0.2 to 2 dl/g, and the removal of the cyclic dimer in step (2) of the method of the present invention is performed by a specific method (guide-wetting fall process) comprising continuously feeding the crude resin in a molten form (prepolymer) to a guide-wetting fall polymerizer having a perforated plate and at least one guide provided in association with the perforated plate, wherein the prepolymer is allowed to fall along and in contact with the surface of the guide(s) provided in the polymerizer at a temperature which is equal to or higher than the crystalline melting point of the prepolymer and is not higher than 290° C. under reduced pressure, so that polymerization of the prepolymer and volatilization of the cyclic dimer are simultaneously effected during the fall of the prepolymer, while continuously withdrawing the resultant trimethylene terephthalate resin from the polymerizer.

As another preferred example of the method for producing the PTT resin of the present invention, there can be mentioned a method (method (II)) in which the crude trimethylene terephthalate resin in a molten form provided in step (1) of the method of the present invention has an intrinsic viscosity [η] of from 0.6 to 4 dl/g, and the removal of the cyclic dimer in step (2) of the method of the present invention is performed by means of a thin film evaporator equipped with a blade or screw under conditions wherein:

(a) the pressure in the thin film evaporator is a pressure of 2.6 kPa or less, (b) a thin film of the crude polytrimethylene terephthalate resin in a molten form is formed on the inner wall of the thin film evaporator by means of the blade or screw, while performing the surface renewal of the crude polytrimethylene terephthalate resin, (c) the thin film of the crude polytrimethylene terephthalate resin in a molten form has a resin-gas contact area of 1 $cm^2/g$ or more, in terms of a value calculated by dividing the area of the crude polytrimethylene terephthalate resin which is in contact with the gaseous phase inside the thin film evaporator by the weight of the crude polytrimethylene terephthalate resin present in the thin film evaporator, and (d) the polytrimethylene terephthalate resin occupies not more than 40% of the inner space of the thin film evaporator.

With respect to the above-mentioned methods (I) and (II), each of these methods may be practiced in any of the following manners:

a manner in which the removal of the dimer is performed only once;

a manner in which a plurality of the apparatuses (i.e., the above-mentioned guide-wetting fall polymerizers or thin film evaporators) for removing the cyclic dimer are connected in series, so as to perform the removal of the cyclic dimer repeatedly; and a manner in which the resin withdrawn from the apparatus for removing the cyclic dimer is recycled to the apparatus so as to perform the removal of cyclic dimer repeatedly.

The methods (I) and (II) may be used individually or in any combination and in any order, wherein each of methods (I) and (II) may independently be practiced in any of the above manners. Further, each of the above-mentioned methods (I) and (II) may be used in combination with, for example, any of conventional processes for producing a polyester (such as a solid-phase polymerization process, a process using a vertical agitation type polymerizer, and a process using a horizontal agitation type polymerizer) and/or any of conventional volatilization treatments under reduced pressure using a vented extruder or a flash tank.

In the present invention, it is necessary to remove the cyclic dimer from the crude PTT resin in an amount of 0.5% by weight or more, based on the weight of the crude PTT resin. It is preferred to remove the cyclic dimer from the crude PTT resin in an amount of 1% by weight or more, more advantageously 1.5% by weight or more, still more advantageously 2% by weight or more, based on the weight of the crude PTT resin.

When the cyclic dimer is removed from the crude PTT resin which has a cyclic dimer formation index (E) adjusted to less than 0.066 by the above-mentioned method (I) and/or method (II), the cyclic dimer formation rate of the crude resin becomes lower than the rate of the removal of the cyclic dimer, so that it becomes possible to reduce the cyclic dimer content of the PTT resin despite that the crude PTT resin is melted in the above-mentioned methods (I) and (II). Further, by the use of the crude PTT resin having a cyclic dimer formation index (E) adjusted to less than 0.066, a PTT resin having a small cyclic dimer content can be obtained by removing only a small amount of cyclic dimer, thereby suppressing the lowering of the yield of the PTT resin.

The cyclic dimer which has been removed from the crude PTT resin for reducing the cyclic dimer content of the final PTT resin to a desired level can be recovered and recycled as a raw material for producing a PTT resin.

Hereinbelow, the above-mentioned method (I) (guide-wetting fall process) and method (II) (removal of cyclic dimer using a thin film evaporator) are described in detail.

(I) Guide-Wetting Fall Process

As mentioned above, a polymerizer which does not have a rotary driving part has conventionally been proposed as a polymerizer for producing resins other than a PTT resin. However, the melt-polycondensation reaction for producing a PTT resin greatly differs from the melt-polycondensation reactions for producing other types of polyesters, such as a PET and a PBT, and for producing polyamides. Therefore, a practical production of a PTT cannot be realized simply by employing the polymerizers which have been used for the production of the other types of polyesters and for the production of polyamides. The important differences between the PTT, and polyamides and the other types of polyesters (such as a PET and a PBT) are explained below.

Firstly, both of the melt-polycondensation reaction for producing polyamides and the melt-polycondensation reaction for producing the other types of polyesters (such as a PET and a PBT) are equilibrium reactions. However, the equilibrium constants of these two types of reactions greatly differ from each other. In general, the equilibrium constants of the melt-polycondensation reactions for producing polyamides are in the order of $10^2$, whereas the equilibrium constants of the melt-polycondensation reactions for producing the other types of polyesters are approximately 1. Thus, despite that both of the reactions for producing polyamides and the reactions for producing the other types of polyesters are polycondensation reactions, the equilibrium constants of the reactions for producing the other types of polyesters are extremely small as compared to those of the reaction for producing the polyamides. When an equilibrium constant of a certain reaction is large, the reaction proceeds even without efficiently withdrawing a by-product from the reaction system. Therefore, it is easy to increase the polymerization degrees of polyamides. With respect to the other types of polyesters (such as a PET and a PBT), although the equilibrium constants of the reactions for producing a PET and a PBT are small, the by-products can be easily withdrawn from the reaction systems, so that it is also easy to increase the polymerization degree of each of a PET and a PBT. The specific reason for this is as follows. In the case of a PET, the PET has a satisfactory heat stability and, hence, a polymerization reaction for producing the PET can be performed at a temperature (generally from 280 to 300° C.) which is much higher than the boiling point (198° C. of ethylene glycol which is a by-product of the polymerization reaction. By performing the polymerization at such a high temperature, the vapor pressure of ethylene glycol can be increased and, hence, the ethylene glycol can be easily withdrawn from the reaction system. Also in the case of a PBT, 1,4-butanediol, which is a by-product of the polymerization reaction for producing a PBT, can be easily withdrawn from the reaction system. The reason for this has not yet been elucidated, but is considered as follows. In the polymerization reaction system for producing a PBT, 1,4-butanediol (which is a by-product having a high boiling point) is converted into low boiling point substances, such as tetrahydrofuran (formed by hydrolysis) and butadiene (formed by heat decomposition), which low boiling point substances can be easily withdrawn from the reaction system.

As in the case of the polymerization reactions for producing the other types of polyesters, the polymerization reaction for producing a PTT has a low equilibrium constant and, hence, the by-produced trimethylene glycol (TMG) needs to be efficiently withdrawn from the reaction system so as to advance the polymerization reaction. The TMG has a boiling point as high as 214° C. On the other hand, the PTT is susceptible to heat decomposition, so that the polymerization reaction for producing the PTT needs to be performed at a low temperature. Therefore, it is difficult to withdraw the TMG from the reaction system. Further, when the polymerization degree of a PTT becomes high, the following disadvantage is caused. The viscosity of the PTT also becomes high and, hence, it becomes difficult to withdraw TMG from the reaction system. Further, in such a case, a heat decomposition of the PTT markedly occurs, so that it becomes difficult to improve the polymerization degree of the PTT even by the conventional polymerization processes for producing the other types of polyesters (e.g., PET) and polyamides (i.e., methods in which a polymerization is performed by allowing a prepolymer to fall in the form of fibers or to fall along and in contact with a guide, such as a wire) and, thus, the polymerization degree of the PTT starts to be lowered. When the polymerization reaction is performed at high temperatures (so as to withdraw TMG from the reaction mixture), the heat decomposition of the PTT markedly occurs, so that it becomes more difficult to improve the polymerization degree of the PTT. Further, in such a case, heat decomposition products of the PTT are likely to stain the inner wall of the polymerizer and, thus, it was impossible to obtain a high quality PTT product (e.g., a PTT product having excellent color).

However, as a result of the studies of the present inventors, it has unexpectedly been found that, when a molten PTT prepolymer (crude PTT resin) having an intrinsic viscosity within a specific range is polymerized by the guide-wetting fall process at an appropriate temperature under reduced pressure, a high quality PTT resin can be produced without causing the problems accompanying the above-mentioned conventional polymerization processes, and the cyclic dimer can be efficiently removed from the prepolymer by volatilization during the polymerization.

With respect to the guide-wetting fall process, reference can be made, for example, to U.S. Pat. Nos. 5,589,564, 5,840,826, 6,265,526 and 6,320,015.

The features of the guide-wetting fall process are described below.

Firstly, for obtaining a PTT resin having a high polymerization degree by only melt polymerization, it is required not only to suppress the heat decomposition of the PTT resin, but also to efficiently remove a TMG (by-product of the reaction for producing the PTT). In the method of the present invention, these requirements are satisfied by performing the polymerization by allowing a prepolymer to fall along and in contact with the guide at an appropriate temperature under reduced pressure to thereby increase the surface area of the prepolymer. Further, by allowing the prepolymer to fall along and in contact with a guide, it becomes possible to prevent the disadvantageous fluctuation of qualities of the products, wherein the fluctuation occurs due to the breakage of the polymer flow in the polymerizer, which breakage occurs especially in the methods in which a polymerization is performed by allowing a prepolymer to fall in the form of fibers.

Secondly, for preventing the discoloration of the polymer which is caused by the entrance of oxygen and a sealing liquid into the polymer, it is required to employ a polymerizer having no rotary driving part. In the guide-wetting fall process, there is no need for the polymerizer to have a rotary driving part, and the polymerizer exhibits an excellent sealability under high vacuum, so that a discoloration caused by leakage of oxygen into the polymerizer can be almost completely prevented. Further, since the polymerizer has no rotary driving part, a mixing of a sealing liquid into a polymer would not occur, and the maintenance of the polymerizer is easy. Thus, a high quality PTT which is free from a disadvantageous discoloration can be obtained.

Thirdly, for stably producing a PTT resin on a commercial scale, it is required to suppress the foaming of the prepolymer introduced into the polymerization reaction zone, so as to prevent the staining of the lower surface of the perforated plate and inner wall of the polymerizer. In the method of the present invention, this requirement is satisfied by polymerizing a prepolymer having a relatively high intrinsic viscosity within a specific range at a specific temperature. By virtue of this feature, it becomes possible to suppress the lowering of the quality of the PTT resin, which is caused by the mixing or entrance of the stain into the PTT resin.

Fourthly, by increasing the surface area of the prepolymer in a molten form, and performing the polymerization of the prepolymer under reduced pressure, it becomes possible to remove the cyclic dimer efficiently from the prepolymer by volatilization. In the method of the present invention, by polymerizing the crude PTT resin (prepolymer) having a specific cyclic dimer formation index (E) (which is obtained by using the specific catalyst or the like) while efficiently removing cyclic dimer from the crude resin, it has, for the first time, become possible to produce a PTT resin having an advantageously low cyclic dimer content despite that the polymerization is performed by a melt polymerization process.

Thus, by the method of the present invention, the problems accompanying the conventional techniques for performing a melt polymerization reaction to produce a PTT resin can be solved, and it has become possible to produce a high quality PTT resin (which has a high polymerization degree and a low cyclic dimer content) stably on a commercial scale. Such effects are unexpected from the conventional techniques for performing polymerization reactions for producing polyamides and the other types of polyesters.

In the above-mentioned method (I), it is necessary to introduce the crude PTT resin (prepolymer) in a molten form through the holes of the perforated into the polymerization reaction zone at a temperature which is equal to or higher than the crystalline melting point of the prepolymer and is not higher than 290° C., wherein the prepolymer has an intrinsic viscosity [η] of from 0.2 to 2 dl/g.

In the present invention, the term "prepolymer" means a polycondensation product which has a molecular weight lower than the final PTT resin obtained there-from.

In the present invention, it is important to suppress the scattering of the prepolymer in the polymerization reaction zone, which is caused by the vigorous foaming of the prepolymer. In the present invention, for suppressing the scattering of the prepolymer, and for effectively removing the by-produced TMG from the reaction system, it is essential to introduce the above-mentioned prepolymer having a specific intrinsic viscosity [η] into the polymerization reaction zone at the above-mentioned specific temperature. When the scattering of the prepolymer is caused by the vigorous foaming of the prepolymer introduced through the holes of the perforated plate into the polymerization reaction zone, the polymer adheres to the lower surface of the perforated plate and the inner wall of the polymerizer, thereby staining them. The prepolymer which adheres to the lower surface of the perforated plate and the inner wall of the polymerizer remains in the polymerizer for a long period of time and, hence, suffers heat decomposition to form a discolored low molecular weight product and/or a discolored modified product. When such a discolored product(s) get(s) mixed with the final PTT resin, the quality of the resin is lowered. For suppressing the scattering of the prepolymer caused by the vigorous foaming thereof, it is necessary that the prepolymer has an intrinsic viscosity [η] of 0.2 or more. Further, for constantly producing a resin having a narrow molecular weight distribution, it is preferred that the prepolymer has a relatively high viscosity. The reason for this is as follows. In the guide-wetting fall process employed in the present invention, when the viscosity of the prepolymer is too low, a fluctuation of polymerization degree of the prepolymer being polymerized may occur due to the fluctuation of the falling rate of the prepolymer and the fluctuation of the level of surface renewal of the prepolymer. When such fluctuation of polymerization degree of the prepolymer occurs, the fluctuation of the falling rate of the prepolymer is further increased, leading to a broad molecular weight distribution of the final resin. For preventing such fluctuation of the falling rate of the prepolymer and fluctuation of the level of surface renewal of the prepolymer, it is preferred that the viscosity of the prepolymer is high.

However, on the other hand, when the prepolymer has too high an intrinsic viscosity, it becomes difficult to withdraw efficiently the by-produced TMG from the reaction system. Further, when the intrinsic viscosity of the prepolymer is too high, the amount of the by-produced TMG becomes extremely small, so that it becomes difficult to cause an appropriately mild foaming of the prepolymer during the fall thereof in the polymerizer, which appropriate foaming of the prepolymer is an important feature of the guide-wetting fall process employed in the present invention. Thus, it becomes difficult to improve the polymerization degree of the PTT resin. Therefore, for preventing these disadvantages, it is necessary that the prepolymer has an intrinsic viscosity [η] of 2 dl/g or less. Further, it is preferred that the prepolymer has an intrinsic viscosity [η] of from 0.3 to 1.8 dl/g, more advantageously from 0.4 to 1.5 dl/g.

In addition, for preventing disadvantages (e.g., vigorous foaming of the prepolymer, and heat decomposition of the prepolymer) which are caused by the low viscosity of the prepolymer and which lead to a lowering of the quality of the PTT resin, it is necessary that the temperature of the prepolymer introduced into the polymerization reaction zone be 290° C. or less. On the other hand, for uniformly introducing the prepolymer into the polymerization reaction zone without solidifying the prepolymer in the holes of the perforated plate, and for causing the prepolymer as a whole to fall uniformly along and in contact with the guide without partially solidifying the prepolymer during the fall thereof, it is necessary that the temperature of the prepolymer introduced into the polymerization reaction zone be equal to or higher than the crystalline melting point of the prepolymer.

In the present invention, the crystalline melting point of the prepolymer means a temperature at which an endothermic peak ascribed to the melting of a crystal is observed in a differential scanning calorimetry (DSC) chart of the prepolymer, wherein the DSC chart is obtained by means of an input compensation-type differential scanning calorimeter (trade name: Pyris 1; manufactured and sold by Perkin Elmer, Inc., U.S.A.) under the following conditions:

Measuring temperature: 0 to 280° C., and
Rate of temperature elevation: 10° C./min.

The temperature of the prepolymer introduced into the polymerization reaction zone is preferably 5° C. or more higher than the crystalline melting point of the prepolymer but not higher than 280° C., more preferably 10° C. or more higher than the crystalline melting point of the prepolymer but not higher than 275° C., still more preferably 15° C. or more higher than the crystalline melting point of the prepolymer but not higher than 265° C.

In the present invention, it is preferred that the temperature of the molten prepolymer during the fall thereof be within the above-mentioned range (i.e., the range of the temperature of the prepolymer introduced into the polymerization reaction zone), and that the difference between the temperature in the polymerization reaction zone (which is within the above-mentioned range) and the temperature of the molten prepolymer introduced into the polymerization reaction zone through the perforated plate is 20° C. or less, more advantageously 10° C. or less, still more advantageously 5° C. or less, and it is most preferred that the temperature in the polymerization reaction zone and the temperature of the molten prepolymer introduced into the polymerization reaction zone are the same. The temperature in the polymerization reaction zone can be adjusted by means of a heater or a jacket which is provided on the inner wall of the polymerizer, or by means of a heater or a heating medium which is provided inside the guide.

In the present invention, the above-mentioned perforated plate is a plate having a plurality of through-holes through which the prepolymer is introduced into the polymerization reaction zone. There is no particular limitation with respect to the thickness of the perforated plate. However, the thickness of the perforated plate is generally in the range of from 0.1 to 300 mm, preferably from 1 to 200 mm, more preferably from 5 to 150 mm. The perforated plate needs to have a strength sufficient to sustain the pressure inside the chamber of the polymerizer, into which the molten prepolymer is fed. Also, when the guide(s) in the polymerization reaction zone of the polymerizer is (are) hung from the perforated plate, it is necessary that the perforated plate can sustain the weight of the guide(s) and the molten prepolymer which is falling along and in contact with the surface of the guide(s). For this reason, it is preferred that the perforated plate is reinforced with a rib or the like.

The shape of the hole of the perforated plate is generally selected from a circle, an ellipse, a triangle, a slit, a polygon, a star and the like. The area at the opening of each hole is generally in the range of from 0.01 to 100 $cm^2$, preferably from 0.05 to 10 cm2, more preferably from 0.1 to 5 $cm^2$. Further, nozzles or the like may be attached to the holes of the perforated plate. The distance between mutually adjacent holes of the perforated plate is generally from 1 to 500 mm, preferably from 25 to 100 mm, as measured between the respective centers of the mutually adjacent holes.

There is no particular limitation with respect to the number of holes of the perforated plate. For example, when it is intended to produce the PTT resin at a rate of 100 kg/hr, it is preferred that the perforated plate has 1 to $10^4$ holes, more advantageously 2 to $10^2$ holes.

As mentioned above, the holes of the perforated plate may be through-holes. Alternatively, the perforated plate may have tubes attached thereto, such that the hollow portions of the tubes serve as the holes of the perforated plate. Further, the hole of the perforated plate may have a tapered configuration. It is preferred that the size and shape of the hole are determined so that the pressure loss which occurs when a prepolymer in a molten form passes through the perforated plate is from 0.01 to 5 MPa, more preferably from 0.1 to 5 MPa. When the pressure loss is in the above-mentioned range, it becomes easy to obtain a resin having a further improved polymerization degree (the reason for this, however, is not clear). In general, it is preferred that the material used for the perforated plate is selected from the group consisting of metallic materials, such as stainless steel, carbon steel, Hastelloy, nickel, titanium, chromium and alloys other than mentioned.

Further, it is preferred that a filter is provided in the flowing path of the prepolymer in the polymerizer at a point which is upstream of the perforated plate. The reason for this is that the filter can be used for removing an impurity, if any, which is contained in the prepolymer, and which may cause the clogging of the holes of the perforated plate. The type of filter is appropriately selected so that the impurity having a size larger than the diameter of the holes of the perforated plate can be removed, and that the filter does not sustain too high a pressure by the passage of the prepolymer therethrough.

Examples of methods for causing the molten prepolymer to pass downwardly through a perforated plate provided in the polymerizer and fall along and in contact with the guide include a method in which the prepolymer is allowed to fall only by liquid head or by gravity, and a method in which the prepolymer on the perforated plate is pressurized by using a screw, a pump or the like to thereby force the molten prepolymer to pass downwardly through a perforated plate. It is preferred that the fluctuation of the amount of falling prepolymer is suppressed by means of a pump which has a measuring ability, such as a gear pump.

In the present invention, the prepolymer which has been introduced through the holes of the perforated plate into the polymerization reaction zone is polymerized by allowing the prepolymer to fall along and in contact with the guide in the polymerization reaction zone under reduced pressure. The guide used in the method of the present invention may be any of a wire, a chain, a wire mesh (each of the chain and the wire mesh is made by combining wires), a jungle gym-like body (having a lattice structure composed of wires), a flat or curved thin plate, a perforated plate, and a filler column (which is formed by regularly or irregularly piling fillers together).

For efficiently withdrawing the TMG and the cyclic dimer from the reaction system, it is preferred not only to increase the surface area of the guide, but also to form concave portion(s) and/or convex portion(s) on the surface of the guide which are arranged along the length thereof, so as to promote the agitation and surface renewal of the prepolymer falling along and in contact with the surface of the guide. Thus, it is preferred that the guide has at least one portion selected from the group consisting of a concave portion, a convex portion and a perforated portion. Specifically, it is preferred to use a wire having concavo-convex portions on the surface thereof along which the prepolymer falls, or a guide having a structure which hampers the fall of the prepolymer. Further, it is preferred to use the above-mentioned guides in combination.

In the present specification, the term "wire" means a body in which the ratio of the length of the body to the average perimeter of the cross-section of the body is very large. There is no particular limitation with respect to the cross-sectional area of the wire. However, in general, the cross-sectional area is in the range of from $10^{-3}$ to $10^2$ cm$^2$, preferably from $10^{-2}$ to 10 cm$^2$, more preferably from $10^{-1}$ to 1 cm$^2$. There is no particular limitation with respect to the shape of the cross-section of the guide, and the shape is generally selected from a circle, an ellipse, a triangle, a quadrangle, a polygon, a star and the like. The shape of the cross-section of the wire may be uniform or may vary along the length of the wire. The wire may be hollow. Further, the wire may be composed of a plurality of strands, wherein, for example, the strands are twisted together. The surface of the wire may be smooth or may have concavo-convex portions as mentioned above, a locally protruding portion or the like. There is no particular limitation with respect to the material used for the wire, but the material is generally selected from the group consisting of, for example, stainless steel, carbon steel, Hastelloy, nickel, titanium, chromium and alloys other than mentioned. If desired, the wire may be subjected to surface treatment. Examples of surface treatments include plating, lining, passivation, and washing with an acid.

The "wire mesh" means a body which is made by combining the above-mentioned wires so as to form a lattice. The wires may be linear or curved, and the angle between the combined wires can be appropriately selected. With respect to the area ratio of the wires of the wire mesh to the open spaces (which ratio is measured with respect to the projected image of the wire mesh), there is no particular limitation, but the area ratio is generally in the range of from 1/0.5 to 1/1,000, preferably from 1/1 to 1/500, more preferably from 1/5 to 1/100. It is preferred that the area ratio of the wire mesh does not vary horizontally relative to the vertical direction of the wire mesh.

Further, it is preferred that the area ratio of the wire mesh along the vertical length of the wire mesh does not vary or varies such that, when the wire mesh is provided as the guide in the polymerizer, the area of each open space at a lower portion of the wire mesh becomes smaller than that at an upper portion of the wire mesh (which means that the area ratio at a lower portion of the wire mesh becomes larger than that at an upper portion of the wire mesh).

In the present invention, the "chain" means a body in which rings formed by the above-mentioned wires are linked together. The shape of rings may be a circle, an ellipse, a rectangle, a square or the like. The rings may be linked in one dimension, two dimensions or three dimensions.

In the present invention, the term "jungle gym-like body" means a material in which the above-mentioned wires are three-dimensionally combined with one another so as to form a lattice. The wires used may be linear or curved, and the angle between the combined wires can be appropriately selected.

Examples of wires having convex portion(s) and/or concave portion(s) on the surface thereof (along and in contact with which the prepolymer is allowed to fall) include a wire to which a rod having a circular or polygonal cross-section is attached such that the rod extends substantially vertically of the wire, and a wire to which a disc-shaped or cylindrical-shaped body is attached such that the wire penetrates around the center of the disc-shaped or cylindrical-shaped body. It is preferred that that the convex portion has a height which is larger than the diameter of the wire. As a specific example of wires having convex portion(s), there can be mentioned a wire to which a plurality of discs are attached at intervals of from 1 to 500 mm, in which the distance from the periphery of each disc to the wire is at least 5 mm larger than the diameter of the wire and not more than 100 mm, and a thickness of each disc is from 1 to 10 mm.

With respect to the chain, jungle gym-like body and wire having concavo-convex portions on the surface thereof, which are used as the guides, there is no particular limitation on the volume ratio of the skeleton of the guide (e.g., wires used to form the guide) to the open spaces in the guide. However, in general, the volume ratio is in the range of from 1/0.5 to 1/10$^7$, preferably from 1/10 to 1/10$^6$, more preferably from 1/10$^2$ to 1/10$^5$. It is preferred that the volume ratio does not vary horizontally of the downwardly extending guide. Further, it is preferred that the volume ratio of the downwardly extending guide along the length of the guide does not vary or varies such that, when the guide is provided in the polymerizer, the volume of each open space at a lower portion of the guide becomes smaller than that at an upper portion of the guide (which means that the volume ratio at a lower portion of the guide becomes larger than that at an upper portion of the guide).

The guide can be used individually or in combination, depending on the configuration of the guide. When the guide is a wire or a linear chain, the number of guide(s) used is generally in the range of from 1 to 100,000, preferably from 3 to 50,000. When the guide is a wire mesh, a chain formed by two-dimensionally combining the wires, a thin plate or a perforated plate, the number of guide(s) used is generally in the range of from 1 to 1,000, preferably from 2 to 100. When the guide is a chain formed by three-dimensionally combining the wires, a jungle gym-like body or a filler column, the number of the guide(s) can be appropriately selected depending on the sizes of the polymerizer and the polymerization reaction zone where the guide(s) is (are) provided. When a plurality of guides are used, it is preferred to arrange the guides so as for the guides not to contact with each other by using a spacer or the like.

In the present invention, in general, the prepolymer is introduced through at least one hole of the perforated plate into the polymerization reaction zone where the prepolymer is allowed to fall along and in contact with the guide. The number of holes of the perforated plate can be appropriately selected depending on the shape of the guide. In the method of the present invention, the prepolymer which has passed through a single hole of the perforated plate may be allowed to fall along and in contact with a plurality of guides. However, for causing the prepolymer to fall uniformly so as to obtain a final resin having a narrow molecular weight distribution constantly, it is preferred that the number of guide(s) along which the prepolymer (which has passed through a single hole of the perforated plate) is allowed to fall is small. For example, when the guide is a wire, it is preferred that the number of guide(s) along which the prepolymer (which has passed through a single hole of the perforated plate) is allowed to fall is 3 or less. There is no particular limitation with respect to the position of the guide(s) in the polymerizer so long as the prepolymer can fall along and in contact with the guide(s), and the guide(s) can be provided such that the guide passes through the hole of the perforated plate or is hung below the hole of the perforated plate.

With respect to the distance over which the prepolymer in a molten form (having passed through the holes of the perforated plate) falls along and in contact with the surface of the guide, the distance is preferably from 0.3 to 50 m, more preferably from 0.5 to 20 m, still more preferably from 1 to 10 m.

In the method of the present invention, it is preferred that the average falling time of the prepolymer is in the range of from 10 seconds to 100 hours, more advantageously from 1 minute to 10 hours, still more advantageously from 5 minutes to 5 hours, most advantageously from 20 minutes to 3 hours.

The flow rate of prepolymer passing through the holes of the perforated plate is preferably in the range of from $10^{-2}$ to $10^2$ liter/hr per hole of the perforated plate, more preferably from 0.1 to 50 liter/hr per hole of the perforated plate. When the flow rate of prepolymer is within the above-mentioned range, it becomes possible to improve the polymerization rate and the productivity of the final resin to a preferred level.

In the guide-wetting fall process employed in the present invention, as mentioned above, it is necessary that the polymerization reaction (performed by allowing the prepolymer to fall along and in contact with the guide) be performed under reduced pressure. By performing the polymerization reaction under reduced pressure, the TMG and cyclic dimer (which are by-produced during the polymerization reaction) are efficiently withdrawn from the reaction system so as to advance the polymerization reaction. The reduced pressure means a pressure which is lower than the atmospheric pressure. Generally, it is preferred that the polymerization is conducted under a pressure of 100,000 Pa or less, more preferably 10,000 Pa or less, still more preferably 1,000 Pa or less, most preferably 100 Pa or less. There is no particular limitation with respect to the lower limit of the pressure under which the polymerization is conducted. However, from the viewpoint of the cost of the equipment for reducing the pressure in the reaction system, it is preferred that the pressure is 0.1 Pa or more.

Further, for improving the efficiency of the withdrawing of the by-produced TMG and cyclic dimer and the polymerization degree of the final resin, an inert gas which does not adversely affect the polymerization reaction may be introduced into the reaction system under reduced pressure, so as to remove the by-produced TMG and cyclic dimer in such a form as entrained by the inert gas.

Conventionally, it has been understood that the introduction of inert gas into a polycondensation reaction system lowers the partial pressure of a by-product formed during the polycondensation reaction, thereby displacing the equilibrium of the reaction in the direction of the desired product formation. However, in the present invention, generally, the inert gas is introduced into the reaction zone only in a very small amount, and hence, the improvement of the polymerization rate by the lowering of partial pressure of a by-product cannot be expected. Thus, from the conventional understanding, the function of the inert gas used in the method of the present invention cannot be explained. From the studies of the present inventors, it has surprisingly been found that the introduction of inert gas into the polymerization reaction zone causes an appropriately mild foaming of the molten prepolymer on the guide, so that not only is the surface area of the molten prepolymer greatly increased, but also the surface renewal of the prepolymer vigorously occurs without staining the inner wall of the polymerizer. It is presumed that a vigorous movement of the prepolymer at various portions (including inner and surface portions) thereof causes the remarkable improvement in the polymerization rate.

Examples of methods for introducing the inert gas into the polymerization reaction zone include a method in which at least a part of the inert gas is introduced to the polymerization reaction zone, in a manner wherein the introduction of the part of the gas is conducted separately from the feeding of the trimethylene terephthalate prepolymer to the polymerization reaction zone, and a method in which at least a part of the inert gas is introduced to the polymerization reaction zone in such a form as absorbed and/or contained in the trimethylene terephthalate prepolymer, and the inert gas is caused to be discharged from the prepolymer under reduced pressure in the polymerization reaction zone. These two methods may be used in combination. Herein, the term "absorbed" means that the inert gas is dissolved in the prepolymer, and is not present in the form of bubbles in the prepolymer. On the other hand, the term "contained" means that the inert gas is present in the form of bubbles in the prepolymer. When the inert gas is present in the form of bubbles in the prepolymer, it is preferred that the size of each bubble is as small as possible. It is preferred that the average diameter of each bubble is 5 mm or less, more advantageously 2 mm or less.

When the inert gas is introduced into the polymerization reaction zone, in a manner wherein the introduction of the part of the gas is conducted separately from the feeding of the prepolymer to the polymerization reaction zone, it is preferred to feed the inert gas to the polymerizer at a position remote from the perforated plate and close to the outlet for withdrawing the final resin. Further, it is preferred to feed the inert gas to the polymerizer at a position remote from the vent to which a vacuum gas discharge line is connected.

On the other hand, examples of methods for causing the inert gas to be absorbed by and/or contained in the prepolymer include a method using any of conventional absorption devices, such as a packed column type absorption device, a tray-containing column type absorption device, a spraying device-containing column type absorption device (in which a liquid is sprayed in a gas to be absorbed in the liquid), a turbulent contact absorption device, a gas-liquid film cross-contacting type absorption device, a high-speed rotary flow type absorption device, and an absorption device utilizing mechanical force, which are described in "Kagaku Souchi Sekkei•Sousa Shiriizu No. 2, Kaitei Gasu Kyushu (Design and Operation of Chemical Devices, No. 2, Gas Absorption (Revised Version))", pp. 49-54 (published on Mar. 15, 1981 by Kagaku Kogyosha, Inc., Japan); and a method in which the inert gas is injected into the prepolymer in a conduit for transferring the prepolymer to the polymerizer. Most preferred is a method using a device in which the prepolymer is allowed to fall along and in contact with the surface of a guide in an atmosphere of inert gas to thereby cause the prepolymer to absorb the inert gas during the fall thereof. In this method, an inert gas having a pressure higher than the pressure inside the polymerizer is introduced into the gas absorption device. The pressure of the inert gas introduced into the gas absorption device is preferably from 0.01 to 1 MPa, more preferably from 0.05 to 0.5 MPa, still more preferably from 0.1 to 0.2 MPa.

As the inert gas introduced into the polymerization reaction zone, it is preferred to use an inert gas which does not cause discoloration, denaturation or decomposition of the polymer. Preferred examples of inert gases include nitrogen gas, argon gas, helium gas, carbon dioxide gas, a lower hydrocarbon gas and a mixture of the above mentioned gases. As the inert gas, nitrogen gas, argon gas, helium gas and carbon dioxide gas are more preferred, and it is most preferred to use nitrogen gas from the viewpoint of availability.

In the present invention, the amount of inert gas introduced into the polymerization reaction zone may be very small. Specifically, it is preferred that the amount of inert gas is in the range of from 0.05 to 100 mg per gram of the final resin withdrawn from the polymerization reaction zone. By using the inert gas in an amount of 0.05 mg or more per gram of the final resin withdrawn from the polymerization reaction zone, it becomes possible to foam the prepolymer satisfactorily so as to increase the polymerization rate, and to improve the efficiency of removal of the cyclic dimer by volatilization. On the other hand, by using the inert gas in an amount of 100 mg or less, it becomes easy to maintain the appropriate reduced pressure in the polymerization reaction zone. The amount of inert gas introduced into the polymerization reaction zone is more preferably in the range of from 0.1 to 50 mg per gram of the final resin withdrawn from the polymerization reaction zone, most preferably from 0.2 to 20 mg.

In the guide-wetting fall process employed in the method of the present invention, it is preferred that at least a part of the prepolymer falling in the polymerization reaction zone is in a foaming state. It is especially preferred that the prepolymer at a lower portion of the polymerization reaction zone is in a foaming state. Needless to say, it is most preferred that the whole of the prepolymer falling in the polymerization reaction zone is in a foaming state. In the present invention, the "foaming state" encompasses both a state in which the formed bubbles are immediately broken and a state in which the formed bubbles are maintained for a relatively long time.

In the present invention, it is possible to obtain a prepolymer (falling in the polymerization reaction zone) in an appropriately foaming state (i.e., the whole of the prepolymer falling in the polymerization reaction zone is in a foaming state) by controlling each of the intrinsic viscosity of the prepolymer (prior to introducing into the reaction zone) and the temperature and pressure in the reaction zone to be within the above-mentioned respective ranges. However, by introducing a very small amount of inert gas into the polymerization reaction zone, it becomes possible to obtain a prepolymer in a more appropriate foaming state. When the prepolymer in the reaction zone is in such an appropriately foaming state, the prepolymer exhibits high fluidity, despite the increase in melt viscosity of the prepolymer due to the increase in the polymerization degree of the prepolymer (which increase in melt viscosity is likely to cause the lowering of the fluidity), and it can be observed that the prepolymer is caused to roll along and in contact with the guide(s) in the form of balls (due to the high fluidity). Therefore, it is presumed that in the guide-wetting fall process employed in the present invention, the surface renewal of the prepolymer is greatly improved.

In the guide-wetting fall process employed in the present invention, the cyclic dimer is withdrawn from the polycondensation reaction system together with the by-produced TMG. The cyclic dimer has a low solubility in the withdrawn TMG, so that the cyclic dimer precipitates in the TMG. The cyclic dimer deposits on the inner wall of the conduit for withdrawing the cyclic dimer, thereby causing problems, such as clogging of the conduit. Furthermore, when the polymerizer or the conduit has a low temperature portion, there is a danger that the cyclic dimer is deposited on such low temperature portion. Therefore, it is preferred that the production system of the PTT resin is provided with an auxiliary conduit in addition to a main conduit, so that, when the main conduit gets clogged with the cyclic dimer, the flow in the main conduit is stopped by closing a valve therefor to remove the cyclic dimer from the main conduit, while the flow in the auxiliary conduit is started by opening a valve therefor. Further, it is preferred that the conduit is heated to 250° C. (i.e., the melting point of the cyclic dimer) or higher to thereby suppress the clogging of the conduit caused by the deposition of the cyclic dimer on the inner wall of the conduit, and that the inner temperature of the polymerizer is appropriately controlled so that substantially no low temperature portion is formed in the polymerizer, which low temperature portion is likely to have the cyclic dimer deposited thereon. Furthermore, it is preferred that the by-products (including the cyclic dimer) withdrawn from the production system are recovered by means of a wet-type scrubber, and that the cyclic dimer (in a solid form) is recovered from the withdrawn by-products by means of a separator (e.g., a centrifugal separator or a sedimental separator).

The cyclic dimer which has been recovered by the above-mentioned method can be directly recycled as a raw material for producing a PTT resin without any purification treatment. Alternatively, the recovered cyclic dimer can be purified, for example, by recrystallization, and then be recycled as a raw material for producing a PTT resin. Specifically, the recovered cyclic dimer may be subjected to a ring-opening polymerization to produce a PTT resin, or be added to a raw material mixture or to a polymerization reaction system at any stage of the production of the PTT resin.

(II) Removal of the Cyclic Dimer by Means of a Thin Film Evaporator

As mentioned in item (I) above (guide-wetting fall process), a PTT resin is susceptible to heat decomposition, as compared to polyamides and the other polyesters (e.g., PET). The heat decomposition of the resin leads to a lowering of the polymerization degree of and a lowering of the quality of the resin. As a result of the studies of the present inventors, it has been found that the excellent PTT resin of the present invention can be efficiently produced by a method in which the production of the PTT resin is performed by means of a thin film evaporator under the above-mentioned conditions (a) to (d).

In method (II) of the present invention, when the crude PTT resin has too low an intrinsic viscosity, the amount of the by-produced TMG becomes high, thereby causing a disadvantageously vigorous foaming which leads to a scattering of the resin. The scattered resin adheres to the inner wall of the thin film evaporator and the equipments provided in the thin film evaporator (e.g., revolution shaft), thereby staining them.

Such scattered resin gets mixed with the final PTT resin, thereby lowering the quality of the resin. Therefore, for preventing such disadvantages, it is necessary that the crude PTT resin have an intrinsic viscosity of 0.6 dl/g or more.

On the other hand, when the crude PTT resin has too high an intrinsic viscosity, the amount of heat generated due to the shearing force of the blades or screw provided in the thin film evaporator becomes disadvantageously large, so that it becomes difficult to control the temperature of the crude PTT resin, thereby leading to a lowering of the molecular weight and quality of the final resin. Therefore, it is necessary that the crude PTT resin have an intrinsic viscosity of 4 dl/g or less. When the amount of heat generated due to the shearing force is within a range such that the temperature of the crude PTT resin can be easily controlled, the heat generated due to the shearing force is advantageous in that the surface temperature of the thin film of molten PTT resin (which is formed on the inner wall of the thin film evaporator) is elevated, so that the cyclic dimer can be efficiently removed from the resin. As an example of preferred methods for taking advantage of the heat generated due to the shearing force as mentioned above, there can be mentioned a method in which a crude PTT resin having a molecular weight higher than the desired molecular weight of the final PTT resin is fed into the thin film evaporator so as to remove the cyclic dimer very efficiently (by utilizing the heat generated due to the shearing force) while lowering the molecular weight of the PTT resin to a desired level. It is preferred that the crude PTT resin which is fed to the thin film evaporator has an intrinsic viscosity of from 0.7 to 3.9 dl/g, more advantageously from 0.8 to 3.8 dl/g, still more advantageously from 0.9 to 3.5 dl/g, most advantageously from 1 to 3 dl/g.

With respect to the type of the thin film evaporator, there is no particular limitation. For example, it is preferred to use a vertical, cylindrical thin film evaporator which has accommodated therein a thin film-forming revolution means (such as a revolution shaft having blades attached thereto or a screw) so that the central axis of the thin film-forming revolution means passes through the center of the cylindrical thin film evaporator and that a predetermined clearance is formed between the revolution means and the inner wall of the thin film evaporator. Further, the thin film evaporator has a liquid-scattering means which is used for scattering the molten crude resin (introduced into the thin film evaporator) onto the inner wall of the evaporator by mechanical force or centrifugal force. The molten crude resin present on the inner wall of the evaporator is formed into a thin film by means of the above-mentioned thin film-forming revolution means, while performing the surface renewal of the thin film. Furthermore, the thin film evaporator has a withdrawal port for the final resin at the bottom portion thereof.

It is most preferred that the above-mentioned thin film evaporator is further provided with a means for feeding the molten crude resin; a means for withdrawing the molten resin which has the cyclic dimer removed therefrom; a means for reducing the internal pressure of the thin film evaporator to thereby remove the cyclic dimer by volatilization; a means for preventing the clogging of a conduit which is connected to the thin film evaporator and for recovering the cyclic dimer; and a means for controlling the temperatures of the thin film evaporator and the molten resin. By employing such a thin film evaporator, it becomes possible to reduce (improve) the cyclic dimer content of a PTT resin greatly within a relatively short period of time, namely from several tens of a second to several tens of a minute, thereby preventing the discoloration of the PTT resin which is caused when the crude resin is heated for a long time.

In method (II) of the present invention, it is possible to use an apparatus other than mentioned above so long as the removal of the cyclic dimer can be performed by the thin film evaporation under the above-mentioned conditions (a) to (d). For example, the removal of the cyclic dimer may be performed by a method using a commercially available kneader having a pressure reduction vent or an extruder having a pressure reduction vent; a method using a thin film evaporator having accommodated therein a disc or a belt conveyer, in which a molten crude resin is placed on a revolving disc or moving belt conveyer and the surface renewal of the molten crude resin is performed by means of a spatula or the like; or a method using a thin film evaporator having accommodated therein one or more rollers, in which a molten crude PTT resin is placed on the roller(s). In each of these methods, when the removal of cyclic dimer requires a long time, it is preferred to seal the apparatus tightly so as to prevent the leakage of oxygen into the apparatus, which causes the discoloration of the final PTT resin.

Hereinbelow, the above-mentioned conditions (a) to (d) are described in detail.

(a) The pressure in the thin film evaporator is 2.6 kPa or less:

In method (II) of the present invention, it is necessary to perform the removal of the cyclic dimer under reduced pressure, namely under a pressure of 2.6 kPa or less. When the removal of the cyclic dimer is performed under a pressure of more than 2.6 kPa, the efficiency of the removal of the cyclic dimer is lowered, so that it becomes necessary to perform the removal of the cyclic dimer for a long time, thereby causing disadvantages, such as the heat decomposition and discoloration of the PTT resin. It is preferred that the removal of the cyclic dimer is performed under a pressure of 2.0 kPa or less, more advantageously 1.0 kPa or less, still more advantageously 0.5 kPa or less, most advantageously 0.2 kPa or less.

Further, when the removal of the cyclic dimer is performed at a temperature which is lower than the melting point of the crude PTT resin, there is a danger that the crude PTT resin is solidified in the thin film evaporator. On the other hand, although it is preferred that the removal of the cyclic dimer is performed at a temperature as high as possible for efficiently removing the cyclic dimer, when the temperature exceeds 350° C., the PTT resin is likely to suffer heat decomposition and discoloration. Therefore, the removal of the cyclic dimer is generally performed at 230 to 350° C., preferably 235 to 330° C., more preferably from 240 to 300° C., still more preferably from 245 to 280° C.

As preferred examples of methods for improving the efficiency of the removal of the cyclic dimer and suppressing the heat decomposition of the crude PTT resin, there can be mentioned a method using a thin film evaporator having its interior divided into a plurality of zones having different temperatures, in which the removal of the cyclic dimer is performed in a high temperature zone, and the resultant PTT resin is moved to a low temperature zone to lower the temperature of the resin quickly so as to suppress the heat decomposition of the resin; and a method in which the surface temperature of the thin film of molten crude PTT resin is elevated by the heat generated due to the shearing force of the above-mentioned revolution means provided in the thin film evaporator, while suppressing the heat decomposition of the resin by controlling the temperature of the inner wall of the thin film evaporator to a relatively low temperature.

With respect to the time for performing the removal of the cyclic dimer, there is no particular limitation. However, from the viewpoint of suppressing the heat decomposition and discoloration of the PTT resin, the removal of the cyclic dimer is generally performed within 2 hours. On the other hand, from the viewpoint of removing 0.5% by weight or more, based on the weight of the crude PTT resin, of the cyclic dimer, the removal of the cyclic dimer is generally performed for 0.5 hour or more. It is preferred that the removal of the cyclic dimer is performed for 1 minute to 1.5 hours, more advantageously 2 minutes to 1 hour, still more advantageously 3 to 30 minutes.

(b) A thin film of the crude polytrimethylene terephthalate (PTT) resin in a molten form is formed on the inner wall of the thin film evaporator, while performing the surface renewal of the crude PTT resin:

As already mentioned above, the thin film evaporator used in method (II) has accommodated therein a thin-film forming revolution means (such as a revolution shaft having blades attached hereto, or a screw). The revolution means provided in the thin film evaporator has the following functions (1) to (4):

(1) By adjusting the clearance between the revolution means and the inner wall of the thin film evaporator and then revolving the revolution means, a thin film of a molten resin can be formed on the inner wall. In general, it is preferred that the thickness of the thin film is uniform. However, for efficiently removing the heat generated due to the shearing force of the revolution means, it is also preferred to employ a method in which the thin film is formed so that the thickness of the thin film gradually decreases from the upper portion to the lower portion of the thin film evaporator, or a method in which the interior of the thin film evaporator is divided into a plurality of zones having different temperatures, and the thickness of the thin film in each zone is appropriately adjusted depending on the temperature of the zone. Alternatively, for suppressing the heat generated due to the shearing force of the revolution means, the thin film may be formed so that the thickness of the thin film gradually increases from the upper portion to lower portion of the thin film evaporator.

(2) By revolving the revolution means, it becomes possible to perform the surface renewal of the thin film of a molten resin (formed on the inner wall of the thin film evaporator), thereby improving the efficiency of the removal of the cyclic dimer. For improving the efficiency of the removal of the cyclic dimer, it is preferred that the revolution rate of the revolution means is 1 rpm or more. On the other hand, for suppressing the heat generated due to the shearing force of the revolution means, which heat causes the lowering of the quality of the final PTT resin, it is preferred that the revolution means is revolved at 5000 rpm or less. The revolution rate of the revolution means is more preferably from 10 to 2000 rpm, still more preferably from 50 to 1000 rpm, most preferably from 100 to 800 rpm.

(3) The revolution means transfers the crude PTT resin in a molten form from the inlet of the thin film evaporator to the outlet of the thin film evaporator. In general, it is preferred that the inlet for a crude PTT resin and the outlet for withdrawing the final PTT resin are provided at an upper portion and a bottom portion of the thin film evaporator, respectively, and that the revolution of the revolution means (e.g., a revolution shaft having blades spirally attached hereto or a screw) causes the molten PTT resin to be transferred in the same direction as that of the gravity. However, for increasing the residence time of the molten PTT resin in the thin film evaporator, for example, it is also possible to employ a method in which the thin film evaporator is tilted, a method in which the outlet (for the final PTT resin) of the thin film evaporator is provided at a position higher than that of the inlet (for the crude PTT resin), a method in which the revolution means has a portion at which the transfer direction of the molten resin in the evaporator is reversed (e.g., a portion of the revolution means (a revolution shaft having blades spirally attached hereto, or a screw) at which the direction of the spiral of the spirally attached blades or the screw is opposite to that of the remainder of the revolution means), or a method in which, during the operation of the thin film evaporator, the direction of revolution of the revolution means is reversed. Further, for locally stagnating the flow of the molten resin in the thin film evaporator, it is also possible to use a thin film evaporator having a portion at which the clearance between the blades or screw of the revolution means and the inner wall of the thin film evaporator is small. Furthermore, for preventing the short pass of the crude PTT resin (i.e., the passage of the molten resin without forming a thin film through the thin film evaporator), it is preferred to use a thin film evaporator which has multi-stage film-formation zones so that the whole of the crude PTT resin is surely formed into a thin film.

(4) The heat is generated due to the shearing force of the revolution means. The heat generated due to the shearing force is advantageous in that it is generated at the surface portion of the thin film of a molten PTT resin, thereby greatly improving the efficiency of the removal of the cyclic dimer. However, for suppressing the heat decomposition of the molten resin, it is preferred to control the amount of the heat generated due to the shearing force so as to control the temperature of the molten resin. Preferred examples of methods for controlling the heat generated due to the shearing force so as to control the temperature of the molten resin include a method in which the revolution rate of the revolution means is adjusted within the range described in item (2) above; and the method described in item (1) above, i.e., the method in which the clearance between the revolution means and the inner wall of the thin film evaporator is adjusted; and the method described in item (3) above, i.e., the method in which the revolution means has a portion at which the transfer direction of the molten resin in the evaporator is reversed; and a method in which a heating medium and a coolant is used to control the surface temperatures of the inner wall of the thin film evaporator and the revolution means. These methods can be employed in combination to thereby greatly improve the efficiency of the removal of the cyclic dimer while suppressing the heat decomposition of the molten resin.

(c) The thin film of the crude polytrimethylene terephthalate (PTT) resin in a molten form has a resin-gas contact area of 1 $cm^2/g$ or more, in terms of a value calculated by dividing the area of the crude PTT resin which is in contact with the gaseous phase inside the thin film evaporator by the weight of the crude PTT resin present in the thin film evaporator:

The total area of the crude PTT resin which is in contact with the gaseous phase inside the thin film evaporator can be geometrically calculated from the thickness of the thin film of the molten PTT resin (which thickness can be adjusted by the clearance between the revolution means and the inner wall of the thin film evaporator) and the size of the thin film evaporator.

When the thin film of a molten PTT resin has a resin-gas contact area of less than 1 $cm^2/g$, the efficiency of the removal of the cyclic dimer is lowered, so that the period of time for performing the removal of the cyclic dimer becomes too long, thereby causing disadvantages, such as the heat decomposition and discoloration of the PTT resin. It is preferred that the thin film has a resin-gas contact area of 1.5 $cm^2/g$ or more, more advantageously 2 $cm^2/g$ or more, still more advantageously 2.5 $cm^2/g$ or more, most advantageously 3 $cm^2/g$ or more.

With respect to the thickness of the thin film of a molten resin (which thin film is formed on the inner wall of the thin film evaporator), from the viewpoint of rendering uniform the temperature of the molten resin so as to produce a final PTT resin having a uniform quality, it is preferred that the thickness of the thin film is uniform. The thickness of the thin film can be adjusted by the clearance between the revolution means provided in the thin film evaporator and the inner wall of the thin film evaporator.

For increasing the resin-gas contact area, and/or removing the heat generated due to the shearing force of the revolution means provided in the thin film evaporator, it is preferred that concave and/or convex portion(s) or perforated portion(s) are/is formed on the surface of the revolution means and/or the inner wall of the thin film evaporator; that a chain, a wire mesh or a jungle gym-like body is attached to the surface of the revolution means and/or the inner wall of the thin film evaporator; or that the thin film evaporator is packed with fillers having a structure, such as a chain, a wire mesh or a jungle gym-like body.

(d) The crude polytrimethylene terephthalate (PTT) resin occupies not more than 40% of the inner space of the thin film evaporator:

The amount of crude PTT resin which occupies the inner space of the thin film evaporator is defined as the percentage of the volume of the crude PTT resin present in the thin film evaporator, based on the internal volume of the thin film evaporator, wherein the volume of the crude PTT resin present in the thin film evaporator is calculated by dividing the weight of the crude PTT resin (in a molten form) fed into the thin film evaporator by the specific gravity of the crude PTT resin i.e., 1.15.

When the crude PTT resin occupies more than 40% of the inner space of the thin film evaporator, foaming of the crude PTT resin occurs to expand the crude resin, so that the crude resin forms large masses. When such large masses of the crude resin are formed, it becomes difficult to form a uniform thin film of the molten crude resin. Further, when the crude PTT resin occupies more than 40% of the inner space of the thin film evaporator, the partial pressure of the cyclic dimer present in the gaseous phase is increased, thereby lowering the efficiency of the removal of the cyclic dimer. As a result, it becomes necessary to perform the removal of the cyclic dimer for a long time, thereby causing disadvantages, such as the heat decomposition and discoloration of the PTT resin. It is preferred that the PTT resin occupies not more than 30% of the inner space of the thin film evaporator, more advantageously not more than 20%, still more advantageously not more than 15%, most advantageously not more than 10%.

In the present invention, there is no particular limitation with respect to the material used for the thin film evaporator; however, the material is generally selected from the group consisting of, for example, stainless steel, carbon steel, Hastelloy, nickel, titanium, chromium and alloys other than mentioned. If desired, the thin film evaporator may be subjected to surface treatment. Examples of surface treatments include plating, lining, passivation, and washing with an acid.

Further, an inert gas which does not adversely affect the polymerization reaction can be introduced into the thin film evaporator, so as to remove the cyclic dimer in such a form as entrained by the inert gas, thereby further improving the efficiency of the removal of the cyclic dimer. When an inert gas is introduced into the thin film evaporator, an appropriately mild foaming of the molten crude PTT resin can be observed. It is presumed that, when such an appropriately mild foaming of the molten crude resin is caused by the introduction of an inert gas, not only is the surface area of the molten resin greatly increased, but also the surface renewal of the molten resin vigorously occurs without staining the inner wall of the thin film evaporator.

Examples of methods for introducing the inert gas into the thin film evaporator include a method in which at least a part of the inert gas is introduced to the thin film evaporator, in a manner wherein the introduction of the part of the gas is conducted separately from the feeding of the molten crude PTT resin to the thin film evaporator, and a method in which at least a part of the inert gas is introduced to the thin film evaporator in such a form as absorbed and/or contained in the molten crude resin, and the inert gas is caused to be discharged from the molten crude resin under reduced pressure in the thin film evaporator. These two methods can be used individually or in combination.

Examples of methods for causing the inert gas to be absorbed by and/or contained in the crude PTT resin in a molten form include a method using any of conventional absorption devices, such as a packed column type absorption device, a tray-containing column type absorption device, a spraying device-containing column type absorption device (in which a liquid is sprayed in a gas to be absorbed in the liquid), a turbulent contact absorption device, a gas-liquid film cross-contacting type absorption device, a high-speed rotary flow type absorption device, an absorption device utilizing mechanical force, which are described in "Kagaku Souchi Sekkei•Sousa Shiriizu No. 2, Kaitei Gasu Kyushu (Design and Operation of Chemical Devices, No. 2, Gas Absorption (Revised Version))", pp. 49-54 (published on Mar. 15, 1981 by Kagaku Kogyosha, Inc., Japan); and a method in which the inert gas is injected into the molten crude resin in a conduit for transferring the molten crude resin to the thin film evaporator. Most preferred is a method using a device in which the molten crude resin is allowed to fall along and in contact with the surface of a guide in an atmosphere of inert gas to thereby cause the molten crude resin to absorb the inert gas during the fall thereof. In this method, inert gas having a pressure higher than the pressure inside the thin film evaporator is introduced into the gas absorption device. The pressure of the inert gas introduced into the gas absorption device is preferably from 0.01 to 1 MPa, more preferably from 0.05 to 0.5 MPa, still more preferably from 0.1 to 0.2 MPa.

As the inert gas introduced into the thin film evaporator, it is preferred to use an inert gas which does not cause discoloration, denaturation or decomposition of the PTT resin. Preferred examples of inert gases include nitrogen gas, argon gas, helium gas, carbon dioxide gas and a lower hydrocarbon gas. A mixture of the above mentioned gases can also be used in the present invention. As the inert gas, it is more preferred to use nitrogen gas, argon gas, helium gas and/or carbon dioxide gas. Among these gases, nitrogen gas is most preferred from the viewpoint of availability.

In the present invention, the amount of inert gas introduced into the thin film evaporator may be very small. Specifically, it is preferred that the amount of inert gas is in the range of from 0.05 to 100 mg per gram of the final resin withdrawn from the thin film evaporator. By using the inert gas in an amount of 0.05 mg or more per gram of the final resin withdrawn from the thin film evaporator, it becomes possible to foam the polymer satisfactorily so as to accelerate the removal of the cyclic dimer. On the other hand, by using the inert gas in an amount of 100 mg or less, it becomes easy to maintain the appropriate reduced pressure in the thin film evaporator. It is preferred that the amount of inert gas introduced into the thin film evaporator is in the range of from 0.1 to 50 mg per gram of the final resin withdrawn from the thin film evaporator, more advantageously from 0.2 to 10 mg.

In the present invention, when the removal of the cyclic dimer is performed by employing a thin film evaporator, the cyclic dimer is withdrawn from the thin film evaporator through a pressure reduction conduit. When the thin film evaporator and/or the conduit have or has a low temperature portion, there is a danger that the cyclic dimer is deposited on the low temperature portion, thereby causing problems, such as clogging of the conduit. Therefore, it is preferred that the thin film evaporator is provided with an auxiliary conduit as well as a main conduit, wherein the main and auxiliary conduits are interchangeable with each other, that the conduit is heated to 250° C. (i.e., the melting point of the cyclic dimer) or more to thereby suppress the clogging of the conduit, and/or that the inner temperature of the thin film evaporator is appropriately controlled so that substantially no low temperature portion is formed in the thin film evaporator, which low temperature portion is likely to have the cyclic dimer deposited thereon.

It is also possible to recover the cyclic dimer withdrawn from the thin film evaporator by means of a wet-type scrubber, using trimethylene glycol (TMG) (which is a raw material for producing a PTT resin) as a solvent for recycling the cyclic dimer. However, the cyclic dimer has a low solubility in TMG, so that the cyclic dimer precipitates in TMG. Therefore, it is preferred to separate and recover the withdrawn cyclic dimer from TMG by means of a separator (e.g., a centrifugal separator or a sedimental separator).

The cyclic dimer which is recovered by the above-mentioned method may be directly recycled as a raw material for producing a PTT resin. Alternatively, the recovered cyclic dimer may be purified, for example, by recrystallization and, then, recycled as a raw material for producing a PTT resin. Specifically, the recovered cyclic dimer may be subjected to a ring-opening polymerization to produce a PTT resin, or may be added to a raw material mixture or a polymerization reaction system at any time during the production of a PTT resin.

Next, the specific method for improving (reducing) the cyclic dimer formation index (E) is described in detail.

As mentioned above, there is no particular limitation with respect to the method for improving the cyclic dimer formation index (E). As examples of the method for improving the cyclic dimer formation index (E), there can be mentioned the above-mentioned method (i) (production of a high purity crude PTT resin), method (ii) (use of a specific polymerization catalyst), and method (iii) (deactivation of a polymerization catalyst). From the viewpoint of stably producing a PTT resin having a high polymerization degree and a low cyclic dimer content on a commercial scale with high productivity, it is preferred to use a specific catalyst (method (ii)). In this method, the specific catalyst not only catalyzes the desired polycondensation reaction but also greatly suppresses the side reaction to form the cyclic dimer. As especially preferred examples of the above-mentioned method (ii), there can be mentioned the following methods (A) and (B):

(A) a method in which a crude trimethylene terephthalate (PTT) resin is produced by a polycondensation reaction performed in the presence of a catalyst comprising at least one titanium compound and at least one phosphorus compound selected from the group consisting of phosphoric acid, a phosphoric ester, phosphorous acid, a phosphorous ester and a phosphorus compound represented by the following formula (4):

wherein m is an integer of 1 or 2, and
each R independently represents

wherein n is an integer of from 0 to 3, wherein the at least one titanium compound and the at least one phosphorus compound are used in respective amounts such that the phosphorus/titanium atomic ratio is in the range of from 0.01 to 10; and (B) a method in which a crude trimethylene terephthalate (PTT) resin is produced by a polycondensation reaction performed in the presence of a catalyst comprising at least one tin compound having no carbon-tin bond.

Hereinbelow, the above-mentioned methods (A) and (B) are described in detail.

(A) The method using a catalyst comprising a titanium compound and a phosphorus compound:

As a result of the studies of the present inventors, it has been found that, when a PTT resin is produced by performing a polycondensation reaction in the presence of a catalyst comprising a titanium compound and a specific phosphorus compound, the catalyst not only catalyzes the desired polycondensation reaction but also greatly suppresses the side reaction to form the cyclic dimer, and thus, the cyclic dimer formation index (E) of the crude PTT resin can be suppressed to less than 0.066.

Examples of the above-mentioned titanium compound include a titanium tetraalkoxide, such as titanium tetrabutoxide, titanium tetraisopropoxide or titanium tetraethoxide; an octaalkyl trititanate; and a hexaalkyl dititanate. Among these, a titanium tetraalkoxide, especially titanium tetrabutoxide, is preferred from the viewpoint of the catalytic activity and the color of the produced resin. These titanium compounds may be used individually or in combination.

The amount of titanium compound used is preferably from 10 to 6000 ppm, based on the weight of dimethyl terephthalate (DMT) which is used as a raw material for producing a PTT resin. However, when terephthalic acid is used as a raw material, and/or when another bifunctional aromatic compound is used as a comonomer, the above ppm value is based on the total weight of DMT, terephthalic acid and another bifunctional aromatic compound, with the proviso that the weight of each of terephthalic acid and another bifunctional aromatic compound is calculated on the assumption that the compound used (terephthalic acid and/or another bifunctional aromatic compound) is an equimolar amount of DMT. The amount of titanium compound is more preferably from 50 to 3000 ppm, still more preferably from 100 to 1000 ppm.

Examples of the above-mentioned phosphorus compounds include phosphoric acid; condensation products of phosphoric acid, such as polyphosphoric acid, tripolyphosphoric acid and pyrophosphoric acid; phosphoric esters, such as trimethyl phosphate, triethyl phosphate, tributyl phosphate, triphenyl phosphate and tris-2-hydroxyethyl phosphate; acidic phosphoric esters, such as methyl phosphate, dimethyl phosphate, ethyl phosphate, diethyl phosphate, butyl phosphate, dibutyl phosphate, phenyl phosphate and diphenyl phosphate; phosphorous acid; phosphorous esters, such as trimethyl phosphite, triethyl phosphate, tributyl phosphite and triphenyl phosphite; and a phosphorus compound represented by formula (4) above. These phosphorus compounds may be used individually or in combination.

Examples of phosphorus compounds represented by formula (4) above include phenylphosphonic acid, methylphosphonic acid, ethylphosphonic acid, propylphosphonic acid, isopropylphosphonic acid, butylphosphonic acid, tolylphosphonic acid, xylylphosphonic acid, biphenylylphosphonic acid, naphthylphosphonic acid, anthrylphosphonic acid, 2-carboxyphenylphosphonic acid, 3-carboxyphenylphosphonic acid, 4-carboxyphenylphosphonic acid, 2,3-dicarboxyphenylphosphonic acid, 2,4-dicarboxyphenylphosphonic acid, 2,5-dicarboxyphenylphosphonic acid, 2,6-dicarboxyphenylphosphonic acid, 3,4-dicarboxyphenylphosphonic acid, 3,5-dicarboxyphenylphosphonic acid, 2,3,4-tricarboxyphenylphosphonic acid, 2,3,5-tricarboxyphenylphosphonic acid, 2,3,6-tricarboxyphenylphosphonic acid, 2,4,5-tricarboxyphenylphosphonic acid, 2,4,6-tricarboxyphenylphosphonic acid, diphenylphosphonic acid, bis(2-carboxyphenyl)phosphonic acid, bis(3-carboxyphenyl)phosphonic acid, bis(4-carboxyphenyl)phosphonic acid, bis(2,3-dicarboxyphenyl)phosphonic acid, bis(2,4-dicarboxyphenyl)phosphonic acid, bis(2,5-dicarboxyphenyl)phosphonic acid, bis(2,6-dicarboxyphenyl)phosphonic acid, bis(3,4-dicarboxyphenyl)phosphonic acid, bis(3,5-dicarboxyphenyl)phosphonic acid, bis(2,3,4-tricarboxyphenyl)phosphonic acid, bis(2,3,5-tricarboxyphenyl)phosphonic acid, bis(2,3,6-tricarboxyphenyl)phosphonic acid, bis(2,4,5-tricarboxyphenyl)phosphonic acid, and bis(2,4,6-tricarboxyphenyl)phosphonic acid.

From the viewpoint of the color of the produced resin, phenylphosphonic acid, 2,5-dicarboxylphenylphosphonic acid and diphenylphosphonic acid are especially preferred as the phosphorus compound represented by formula (4) above.

With respect to the method for addition of the above-mentioned titanium compound and phosphorus compound, there can be mentioned method (A-1) in which the titanium compound is reacted with the phosphorus compound, wherein the titanium compound and the phosphorus compound are used in their respective amounts such that the phosphorus/titanium atomic ratio is in the range of from 0.01 to 10, and the resultant product is used as a polycondensation catalyst in the production of a PTT resin; and method (A-2) in which the titanium compound is added to the raw material for producing a PTT resin before performing the polycondensation reaction, and the phosphorus compound is added to the reaction mixture during the polycondensation reaction in an amount such that the phosphorus/titanium atomic ratio is in the range of from 0.01 to 10.

The above-mentioned methods (A-1) and (A-2) are both effective. However, in method (A-1), when an excess amount of phosphorus compound is reacted with the titanium compound, the polycondensation reaction rate is likely to be lowered. Therefore, in method (A-1), it is preferred that the titanium compound and the phosphorus compound are used in their respective amounts such that the phosphorus/titanium atomic ratio is in the range of from 0.02 to 3, more advantageously from 0.03 to 1, still more advantageously from 0.04 to 0.5.

In the present invention, the reaction of the titanium compound with the phosphorus compound can be performed, for example, by a method in which a part of or all of the phosphorus compound is dissolved in a solvent to obtain a solution, followed by dropwise addition of the titanium compound, and the resultant mixture is subjected to a reaction at 0 to 200° C., preferably 20 to 100° C., for 10 minutes or more. In this method, the remainder of the phosphorus compound, if any, may be added at any time during the polycondensation reaction. With respect to the pressure during the reaction, there is no particular limitation, and the reaction can be performed under superatmospheric pressure, atmospheric pressure or reduced pressure. Further, with respect to the type of the solvent, there is no particular limitation so long as the phosphorus compound can be dissolved or finely dispersed in the solvent. Examples of solvents include methanol, ethanol, ethylene glycol, trimethylene glycol, tetramethylene glycol, benzene and xylene. Furthermore, prior to the reaction with the phosphorus compound, the titanium compound may be reacted with a polyvalent aromatic carboxylic acid (e.g., phthalic acid, trimellitic acid, hemimellitic acid or pyromellitic acid), or an anhydride thereof.

After the reaction, the resultant reaction product per se can be used as a catalyst. Alternatively, the reaction product may be purified by an appropriate method (e.g., recrystallization with acetone) before use as a catalyst. The thus obtained catalyst can also be used as a catalyst in the condensation reaction for producing bis(hydroxypropyl) terephthalate (BHPT) (which is an initial condensation product in the production of a PTT resin). Therefore, after the production of BHPT using the above-mentioned catalyst, the polycondensation reaction of BHPT to produce a PTT resin may be in situ performed using the same catalyst. Alternatively, the catalyst may be added at the time of initiating the polycondensation reaction of BHPT.

When the above-mentioned method (A-2) (in which the titanium compound is added to the raw material before performing the polycondensation reaction, and the phosphorus compound is added to the reaction mixture during the polycondensation reaction) is employed in the method of the present invention, it becomes possible to produce a PTT resin having a high polymerization degree without disadvantageously lowering the polycondensation reaction rate; however, in method (A-2), the amount of the phosphorus compound needed is slightly larger than that in method (A-1). Specifically, in method (A-2), it is preferred that the phosphorus/titanium atomic ratio is in the range of from 0.02 to 8, more advantageously from 0.03 to 6, still more advantageously from 0.04 to 4. The titanium compound can also be used as a catalyst in the condensation reaction for producing BHPT. Therefore, after the production of BHPT using the titanium compound as a catalyst, the polycondensation reaction of BHPT to produce a PTT resin may be in situ performed using the titanium compound. Alternatively, the titanium compound may be added at the time of initiating the polycondensation reaction of BHPT. In addition to the above-mentioned titanium compound, in the method of the present invention, it is necessary that the phosphorus compound be added to the reaction mixture of the polycondensation reaction initiated by the titanium compound so long as the phosphorus compound is added prior to the feeding of the produced crude PTT resin into the finisher used in the method of the present invention (i.e., the guide-wetting fall polymerizer or the thin film evaporator). It is preferred that the phosphorus compound is added at any time during the period of from the time when the terminal hydroxyl group content of the crude PTT resin has been reduced to 0.19 mol % or less to the time just before the feeding of the produced crude resin into the finisher used in the present invention.

With respect to the manner of feeding the phosphorus compound to the polymerizer, there is no particular limitation. For example, the phosphorus compound may be directly fed to a polymerizer in any of the following forms: a molten or solid form, a solution or dispersion in an appropriate solvent, and the so-called "master polymer" (or "master batch") containing the phosphorus compound in high content. Alternatively, the phosphorus compound may be fed to the polymerizer, for example, in a manner in which the phosphorus compound in any of a molten or solid form, or in the form of a solution or dispersion thereof in a solvent, is incorporated (e.g., by injection, impregnation or the like) into a PTT resin in a molten form, solid form, or in the form of a solution or dispersion, and the resultant mixture is melt-mixed. In the present invention, the phosphorus compound may be added at once to the reaction mixture, or may be portionwise added to the reaction mixture.

(B) The method using a catalyst comprising a tin compound having no carbon-tin bond:

As a result of the studies of the present inventors, it has been found that, when a PTT resin is produced by performing a polycondensation reaction in the presence of a catalyst comprising a tin compound having no carbon-tin bond, the catalyst not only catalyzes the desired polycondensation reaction but also greatly suppresses the side reaction to form the cyclic dimer, and thus, the cyclic dimer formation index (E) of the crude PTT resin can be suppressed to less than 0.066.

In the above-mentioned method (B), by using a tin catalyst having no carbon-tin bond, the color of the PTT resin can be improved without using a conventional pigment, such as Hostaperm pigment (trade name) or cobalt. Further, the tin catalyst having no carbon-tin bond is free from a problem accompanying the use of a conventional organotin catalyst having a carbon-tin bond, i.e., a problem in that, when the tin catalyst is used in an amount exceeding 525 ppm, based on the weight of DMT, the color of the PTT resin is deteriorated.

Specific examples of tin catalysts having no carbon-tin bond include metallic tin; divalent or tetravalent tin oxide; divalent or tetravalent tin sulfide; a divalent or tetravalent tin halide, such as tin chloride, tin bromide or tin iodide; a divalent or tetravalent tin carboxylate, such as tin acetate, tin propionate, tin butyrate, tin 2-ethylhexanoate, tin neododecanoate, tin oxalate and tin tartrate; tin(II) acetylacetonate; tin(II) hexafluoropentadionate; tin(II) trifluoromethane sulfonate; tin(II) phthalocyanine; tin(IV) phthalocyaninedichloride; and a divalent or tetravalent tin alkoxide, such as tin methoxide, tin ethoxide, tin propoxide and tin butoxide. Among these tin catalysts, from the viewpoint of catalytic activity and improvement in the color of the final PTT resin, a divalent or tetravalent tin halide and a divalent or tetravalent tin carboxylate are preferred, and tin butyrate, tin 2-ethylhexanoate and tin neododecanoate, are more preferred. It is most preferred to use tin 2-ethylhexanoate. These tin catalysts can be used individually or in combination.

In method (B), the amount of the tin catalyst used is preferably from 20 to 6000 ppm, based on the weight of dimethyl terephthalate (DMT) which is used as a raw material for producing a PTT resin. (When terephthalic acid is used as a raw material, and/or when another bifunctional aromatic compound is used as a comonomer, the above ppm value is based on the total weight of DMT, terephthalic acid, and another bifunctional aromatic compound, with the proviso that the weight of each of terephthalic acid and another bifunctional aromatic compound is calculated on the assumption that the compound used (terephthalic acid and/or another bifunctional aromatic compound) is an equimolar amount of DMT.) The amount of titanium compound is more preferably from 50 to 3000 ppm, still more preferably from 100 to 1000 ppm.

The tin catalyst having no carbon-tin bond is advantageous not only in that it exhibits satisfactory catalytic activity in the polycondensation reaction, but also in that it remains in the produced PTT resin in an appropriate amount so that the by-production of acrolein caused by heat decomposition of the PTT resin is suppressed, which heat decomposition is likely to occur when the PTT resin is maintained in a molten form at high temperatures for a long time. From the viewpoint of suppressing the by-production of acrolein, it is preferred that the amount of tin catalyst used is from 50 to 3000 ppm, more advantageously from 100 to 1000 ppm, based on the weight of DMT. Further, from the viewpoint of producing a PTT resin having a high polymerization degree, the amount of tin catalyst used is preferably 50 ppm or more, based on the weight of DMT.

In method (B), the tin catalyst may be directly fed through a nozzle to the polymerizer; however, it is preferred that the tin catalyst is reacted with a part of a raw material for producing a PTT resin (e.g., the above-mentioned terephthalic acid material or the above-mentioned trimethylene glycol material) in advance to obtain a uniform solution, and the obtained uniform solution is fed to the polymerizer. The reason for this is that the solubility and specific gravity of the tin catalyst are different from those of the raw material, so that, when the tin catalyst is fed separately from the raw materials, the tin catalyst is likely to precipitate in the polycondensation reaction mixture and, thus, the concentration of the tin catalyst in the polycondensation reaction mixture is likely to become nonuniform.

Further, when the tin catalyst is reacted with the raw material to obtain a uniform solution, it is advantageous in that a part of the catalyst and a part of the raw material react with each other to form a tin carboxylate or tin glycol oxide which can shorten the initial stage reaction. For example, the reaction between the tin catalyst and the raw material can be confirmed as follows. In the case of a reaction between tin 2-ethylhexanoate and trimethylene glycol, the reaction of tin 2-ethylhexanoate can be confirmed by determination of the free 2-ethylhexanoic acid by gas chromatography, and the formation of tin carboxylate and tin glycol oxide can be confirmed by infrared spectroscopy. With respect to the above-mentioned reaction, it is preferred that the reaction is performed in an atmosphere of nitrogen gas, and it is more preferred that the reaction is performed while bubbling nitrogen gas into the solution to thereby remove water and the like from the solution.

As a specific example of methods for preparing the above-mentioned uniform solution, there can be mentioned a method in which trimethylene glycol is heated at 50 to 200° C. while stirring, followed by dropwise addition of a tin carboxylate compound (e.g., tin 2-ethylhexanoate), and the resultant solution is further heated while stirring for 10 minutes or more to obtain a uniform solution of the tin catalyst.

In the present invention, the tin catalyst can also be used as a catalyst for producing bis(hydroxypropyl) terephthalate (BHPT) (which is an initial stage condensation product in the production of a PTT resin). Therefore, after the production of BHPT using the tin catalyst, the polycondensation reaction of BHPT to produce a PTT resin may be in situ performed using the same tin catalyst. Alternatively, the tin catalyst may be added at the time of initiating the polycondensation reaction of BHPT.

Some of the organotin compounds having a carbon-tin bond, such as butylstannoic acid and dibutyl stannous oxide, exhibit high catalytic activity in the polycondensation reaction for producing a PTT resin. However, when such an organotin compound is used as a catalyst without using a conventional pigment, such as Hostaperm pigment (trade name) or cobalt, or when such an organotin compound is used in an amount exceeding 525 ppm or more (based on the weight of dimethyl terephthalate) for the purpose of improving the polymerization degree of the final PTT resin, the color of the final PTT resin is deteriorated. Further, such an organotin compound is poisonous and, hence, is not a preferable catalyst.

In the present invention, the catalyst used in the above-mentioned method (A) can be used in combination with the catalyst used in above-mentioned method (B).

Hereinbelow, preferred examples of the methods for producing the crude PTT resin which are used in the present invention are described in detail.

The crude PTT resin used in the present invention can be produced by the melt polymerization process or a combination of the melt polymerization process and the solid-phase polymerization process.

In the melt polymerization process, a terephthalic acid material is reacted with a trimethylene glycol material to obtain a terephthalic ester and/or an oligomer thereof, and the resultant is subjected to a polycondensation reaction. Examples of terephthalic acid materials and trimethylene glycol materials include those which are commercially available, those which have been recovered from the production system for producing a PTT resin, and those which have been recovered from the final PTT resin obtained by the method of the present invention. It is preferred that each of the above-mentioned materials has a purity of 95% or more, more advantageously 98% or more.

In the present invention, it is preferred that the terephthalic acid material (e.g., terephthalic acid or a lower alcohol ester thereof) and the trimethylene glycol material (e.g., 1,3-propanediol) are used in their respective amounts such that the terephthalic acid material/trimethylene glycol material ratio is in the range of from 0.8 to 3. When the above-mentioned ratio is less than 0.8, it becomes difficult to advance the reaction between the terephthalic acid material and the trimethylene glycol material. On the other hand, when the ratio is more than 3, a lowering of the melting point of the polymer occurs, which causes the lowering of the whiteness of the PTT resin. The terephthalic acid material/trimethylene glycol material ratio is more preferably in the range of from 1.4 to 2.5, still more preferably from 1.5 to 2.3.

When a crude PTT resin is produced from terephthalic acid and 1,3-propandiol as raw materials, it is not always necessary to use a catalyst for advancing the esterification reaction therebetween, and it is possible to obtain a crude PTT resin having a greatly lowered cyclic dimer formation index (E); however, for advancing the esterification reaction smoothly, it is preferred to use the above-mentioned specific catalysts.

The esterification (or transesterification) reaction of the terephthalic acid material and trimethylene glycol material can be performed at 200 to 250° C., preferably 220 to 240° C., while distilling off by-produced water and a by-produced alcohol (e.g., methanol). In general, the esterification (or transesterification) reaction is performed for 2 to 10 hours, preferably 2 to 4 hours. The thus obtained reaction product is 1,3-propanediol ester of terephthalic acid (e.g., bis(hydroxypropyl) terephthalate) and/or an oligomer thereof.

If desired, the esterification reaction (in the case where terephthalic acid is used as a raw material) or the transesterification reaction (in the case where a terephthalic ester is used as a raw material) may be performed in a stepwise manner using two or more different reaction vessels, wherein each of the reaction vessels may be operated continuously.

The thus obtained 1,3-propanediol ester of terephthalic acid and/or an oligomer are/is subjected to a polycondensation reaction to thereby produce a crude PTT resin.

In the polycondensation reaction, the above-mentioned catalyst used in the esterification (or transesterification) reaction per se can be used as a polycondensation catalyst. On the other hand, if desired, a catalyst other than used in the esterification (or transesterification) reaction can be added to the reaction mixture as a polycondensation catalyst at the start of the polycondensation reaction. Examples of such other catalysts include titanium alkoxides, such as titanium tetrabutoxide and titanium tetraisopropoxide; metal oxides, such as a precipitate of amorphous titanium oxide, a coprecipitate of amorphous titanium oxide and silica, and a precipitate of amorphous zirconia; and metal carboxylates, such as tin 2-ethylhexanoate. Among these catalysts, titanium compounds and tin compounds are especially preferred in that they exhibit catalytic activity in both of the esterification (or transesterification) reaction and the polycondensation reaction. Specifically, each of these compounds is advantageous in that, when such a compound is used as a catalyst in the esterification (or transesterification) reaction, there is no need to add such a compound in the subsequent polycondensation reaction, or the polycondensation reaction can be efficiently performed by addition of only a small amount of the compound.

In the polycondensation reaction, for efficiently removing 1,3-propanediol and by-products (water and alcohol) formed during the esterification (or transesterification) reaction from the reaction system, it is preferred that the polycondensation reaction is performed under reduced pressure, namely under a pressure of from 0.013 to 6700 Pa, more advantageously from 1.3 to 2700 Pa, still more advantageously from 6.7 to 1400 Pa.

When it is desired to produce a crude PTT resin comprising a comonomer unit, a comonomer can be added to a raw material mixture or a reaction mixture at any time during the esterification (or transesterification reaction) and the polycondensation reaction, so as to perform a copolymerization reaction.

With respect to the polymerization device for producing the crude PTT resin used in the present invention, there is no particular limitation. Examples of polymerization devices include a polymerization vessel equipped with a stirrer, a disc ring reactor, a cage type reactor, and a polymerization device designed for performing, in combination, a melt polymerization process and a subsequent solid-phase polymerization process. When the crude PTT resin (having an intrinsic viscosity of 0.2 dl/g or more) is obtained in a molten form, the crude PTT resin may be formed into pellets and, then, fed into a guide-wetting fall polymerizer and/or a thin film evaporator to thereby perform the removal of the cyclic dimer. However, from the viewpoint of the production cost and the quality of the final resin, it is preferred that the polymerization device used for producing the crude PTT resin in a molten form is connected to the guide-wetting fall polymerizer and/or the thin film evaporator, so that the crude PTT resin (having an intrinsic viscosity of 0.2 dl/g or more) obtained in a molten form is continuously fed into the guide-wetting fall polymerizer and/or the thin film evaporator to thereby perform the removal of the cyclic dimer, and that the produced PTT resin having a reduced cyclic dimer content is continuously withdrawn from the guide-wetting fall polymerizer and/or the thin film evaporator.

With respect to the method for improving the cyclic dimer formation index (E) of a crude PTT resin, not only the above-mentioned method (i) (production of a high purity crude PTT resin) and method (ii) (use of a specific polymerization catalyst), but also the above-mentioned method (iii) (deactivation of a polymerization catalyst) is advantageous. Specifically, in method (iii), the residual catalyst contained in a crude PTT resin prior to the removal of the cyclic dimer is deactivated and, then, the crude PTT resin is fed into the guide-wetting fall polymerizer and/or the thin film evaporator.

With respect to the method for deactivating the residual catalyst contained in the crude PTT resin, there is no particular limitation. For example, there can be mentioned a method in which the residual catalyst is contacted with a polar compound. With respect to the specific method for contacting the residual catalyst with the polar compound, there is no particular limitation so long as the residual catalyst is partially or completely deactivated by the polar compound. Examples of methods for contacting the residual catalyst with the polar compound include a method in which the polar compound is charged into a polymerization device or a conduit attached thereto; a method in which the crude PTT resin (containing the residual catalyst) is placed in an atmosphere of the polar compound; a method in which the polar compound is introduced (by injection, impregnation or the like) into a crude PTT resin which is in a molten or solid form or in the form of a solution or dispersion thereof. For efficiently deactivating the residual catalyst, it is preferred that the crude resin is contacted with the polar compound at 50° C. or more, more advantageously 70° C. or more, still more advantageously 150° C. or more. The polar compound may be in the form of a solid, a liquid, a gas or a fluid which has reached its critical point. Further, with respect to the time for contacting the residual catalyst with the polar compound, there is no particular limitation; however, when the contacting is performed for a long time, there is a danger that the molecular weight of the crude resin is lowered, and that the crude resin suffers decomposition and discoloration. Therefore, it is preferred that the contacting time is as short as possible. The contacting time is generally not more than 60 minutes, preferably not more than 30 minutes.

As a polar compound, it is preferred to use a compound comprising a heteroatom (e.g., oxygen, nitrogen, phosphorus or sulfur), and it is more preferred to use a compound which is capable of forming a hydrogen bond. Specific examples of such polar compounds include water; alcohols, such as methanol, ethanol, propanol, 1,3-propanediol, 1,4-butanediol, ethylene glycol, glycerin and ethanol amine; phosphorus compounds, such as phosphoric acid, trimethyl phosphate, triethyl phosphate, tributyl phosphate, triphenyl phosphate, phosphorous acid, trimethyl phosphate, triethyl phosphite, tributyl phosphite, triphenyl phosphate and phenyl phosphonic acid; acids, such as formic acid, acetic acid, propionic acid, hydrochloric acid and sulfuric acid; and nitrogen-containing compounds, such as ammonia, methylamine, dimethylamine, ethylenediamine, triethylamine and ethyleneimine. From the viewpoint of handling property and non-toxicity, water and phosphorus compounds are preferred.

With respect to the amount of the polar compound which is contacted with the crude resin, there is no particular limitation. In general, the polar compound is used in an amount such that the polar compound/crude resin ratio is in the range of from 100,000/1 to 0.000001/1, preferably from 1000/1 to 0.001/1.

In the present invention, if desired, any of various conventional additives may be incorporated into the PTT resin by copolymerization or mixing. Examples of additives include a delustering agent, a thermal stabilizer, a flame retardant, an antistatic agent, an anti-foaming agent, an orthochromatic agent, an antioxidant, an ultraviolet absorber, a nucleating agent and a brightener. These additives may be added at any time during the production of the PTT resin. From the viewpoint of improving the whiteness and melt stability of the PTT resin, and suppressing the formation of acrolein and an aryl alcohol, it is preferred that a stabilizer is added at an appropriate stage in the production of the PTT resin, and it is more preferred that a stabilizer is added to bis(hydroxypropyl) terephthalate (BHPT) prior to the polycondensation thereof.

Preferred examples of such stabilizers include pentavalent or trivalent phosphorus compounds and hindered phenol compounds.

Examples of pentavalent or trivalent phosphorus compound include trimethyl phosphate, triethyl phosphate, tributyl phosphate, triphenyl phosphate, phenylphosphonic acid, trimethyl phosphite, triethyl phosphite, tributyl phosphite, triphenyl phosphite, phosphoric acid and phosphorous acid. Among the above-mentioned phosphorus compounds, trimethyl phosphate, phenylphosphonic acid and phosphoric cid are especially preferred. When the phosphorus compound is added at an appropriate stage in the production of the PTT resin, preferably prior to the polycondensation reaction of BHPT, the phosphorus compound not only serve as a stabilizer, but also prevents the polymerization catalyst from catalyzing a reaction to form the cyclic dimer. Further, by using the phosphorus compound in the method of the present invention (in which the removal of the cyclic dimer is performed by using a guide-wetting fall polymerizer and/or a thin film evaporator), it becomes possible to further improve the efficiency of the removal of the cyclic dimer. Furthermore, the phosphorus compound may be added to the final PTT resin produced by the method of the present invention.

It is preferred that the amount of phosphorus compound added is in the range of from 2 to 250 ppm by weight, more advantageously from 5 to 150 ppm by weight, still more advantageously from 10 to 100 ppm by weight, in terms of the weight of phosphorus atom contained in the PTT.

The hindered phenol compound is a phenol derivative which has a substituent exhibiting a steric hindrance at a position adjacent to the phenolic hydroxyl group, and has at least one ester bond in its molecule. Examples of hindered phenol compounds include pentaerythritol-tetrakis[3-(3,5-di-tert-butyl-4-hydroxyphenyl)propionate], 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, 3,9-bis{2-[3-(3-tert-butyl-4-hydroxy-5-methylphenyl)-propionyloxy]-1,1-dimethylethyl}-2,4,8,10-tetraoxaspiro[5,5]undecane, 1,3,5-tris(4-tert-butyl-3-hydroxy-2,6-dimethylbenzene)isophthalic acid, triethyl glycol-bis[3-(3-tert-butyl-5-methyl-4-hydroxyphenyl)-propionate], 1,6-hexanediol-bis[3-(3,5-di-tert-butyl-4-hydroxyphenyl) propionate], 2,2-thio-diethylene-bis[3-(3,5-di-tert-butyl-4-hydroxyphenyl)propionate] and octadecyl-3-(3,5-di-tert-butyl-4-hydroxyphenyl)-propionate].

Among the above-exemplified hindered phenol compounds, pentaerythritol-tetrakis[3-(3,5-di-tert-butyl-4-hydroxyphenyl)propionate] is preferred.

It is preferred that the amount of hindered phenol compound added is in the range of from 0.001 to 1% by weight, more advantageously from 0.005 to 0.5% by weight, still more advantageously from 0.01 to 0.1% by weight, based on the weight of the final PTT resin. Needless to say, the above-mentioned stabilizers can be used in combination.

By using the polytrimethylene terephthalate resin of the present invention, it becomes possible to produce an excellent shaped article stably on a commercial scale. Specifically, the shaped article produced using the PTT resin of the present invention has high strength and excellent color. Further, the shaped article is free from the bleeding of the cyclic dimer to the surface of the shaped article, so that the shaped article is suitable for coating with a coating composition or adhesive agent and exhibits excellent adhesion property. Further, by the method of the present invention, it becomes possible to stably produce the above-mentioned excellent PTT resin on a commercial scale, with high productivity and at low cost.

BEST MODE FOR CARRYING OUT THE INVENTION

Hereinbelow, the present invention will be described in more detail with reference to the following Production Examples, Examples and Comparative Examples, which should not be construed as limiting the scope of the present invention.

In the following Production Examples, Examples and Comparative Examples, various measurements and analyses were conducted by the following methods.

(1) Intrinsic Viscosity [$\eta$]

The intrinsic viscosity [$\eta$] of a polytrimethylene terephthalate resin was measured by means of an Oswald viscometer. Specifically, with respect to each of o-chlorophenol solutions of a polytrimethylene terephthalate resin, which have different concentrations [C] (g/100 ml) of the resin, the relative viscosity [$\eta sp$] was measured at 35° C. The obtained ($\eta sp/C$) values were plotted against the concentrations of the resin in the above-mentioned solutions, and the resultant gradient was extrapolated into the zero (0) concentration to thereby obtain an intrinsic viscosity [$\eta$] of the resin. That is, the intrinsic viscosity [$\eta$] of the resin was calculated by the following formula:

$$[\eta] = \lim_{C \to 0} (\eta sp/C).$$

(2) Crystalline Melting Point

The crystalline melting point of a crude polytrimethylene terephthalate resin was measured by means of a differential scanning calorimeter (trade name: Pyris 1; manufactured and sold by Perkin Elmer, Inc., U.S.A.) under the following conditions:

Measuring temperature: 0 to 280° C.

Rate of temperature elevation: 10° C./min

Specifically, a temperature at which an endothermic peak ascribed to the melting of a crystal is observed in the obtained differential scanning calorimetry (DSC) chart was defined as the crystalline melting point of the resin, wherein the determination of the peak was conducted using an analytic software attached to the calorimeter.

(3) Molecular Weight Distribution

The ratio of the weight average molecular weight (Mw) to the number average molecular weight (Mn) (Mw/Mn ratio) was used to evaluate the molecular weight distribution of a polytrimethylene terephthalate resin. The Mw and Mn of a polytrimethylene terephthalate resin were determined by gel permeation chromatography (GPC). Specifically, the GPC was conducted under the following conditions:

Apparatus: chromatograph model HLC-8120 (manufactured and sold by Tosoh Corporation, Japan);

Columns: HFIP804-803 (30 cm) (manufactured and sold by Showa Denko K.K., Japan) (x 2);

Carrier: hexafluoroisopropanol;

Measurement temperature: 40° C.; and

Flow rate: 0.5 ml/min.

A calibration curve used in the determination of the Mn and Mw was obtained by using standard polymethyl methacrylate (PMMA) samples (manufactured and sold by Polymer Laboratories Ltd., U.K.). The molecular weights of the PMMA samples used were 620, 1,680, 3,805, 7,611, 13,934, 24,280, 62,591 and 186,000, respectively.

(4) Cyclic Dimer Content (wt %)

The cyclic dimer content of a polytrimethylene terephthalate resin was determined by $^1$H (proton) NMR spectroscopy using a high-resolution Fourier-Transform Nuclear Magnetic Resonance (FT-NMR) instrument (trade name: JNM-A400; manufactured and sold by JEOL LTD., Japan).

Specifically, the cyclic dimer content was determined as follows. 10 mg of a polytrimethylene terephthalate resin was completely dissolved in 1 ml of a deuterated hexafluoroisopropanol solvent (manufactured and sold by Aldrich Ltd., U.S.A.), to thereby obtain a sample solution. Then, the proton NMR analysis of the sample solution was performed at 25° C., in which the number of integration was 256 times, thereby obtaining a proton NMR spectrum of the sample solution. From the obtained proton NMR spectrum, presuming that the specific gravities of the polytrimethylene terephthalate resin and the cyclic dimer (contained in the resin) are the same, the percentage of the integral value of the proton peak ($\delta=7.66$ ppm) ascribed to the benzene rings present in the cyclic dimer, based on the total of the integral value of the proton peak ($\delta=8.15$ ppm) ascribed to the benzene rings present in the polytrimethylene terephthalate resin and the integral value of the proton peak ascribed to the benzene rings present in the cyclic dimers, is calculated, and the obtained percentage value was defined as the cyclic dimer content of the polytrimethylene terephthalate resin.

(5) Terminal Hydroxyl Group Content (M)

The terminal hydroxyl group content (M) (in terms of mole % based on the total molar amount of the trimethylene terephthalate units) of a polytrimethylene terephthalate resin was determined by $^1$H (proton) NMR spectroscopy which was performed using a high-resolution FT-NMR instrument (trade name: JNM-A400; manufactured and sold by JEOL LTD., Japan).

Specifically, the terminal hydroxyl group content (M) was determined as follows. 10 mg of a polytrimethylene terephthalate resin was completely dissolved in 1 ml of a deuterated hexafluoroisopropanol solvent (manufactured and sold by Aldrich Ltd., U.S.A.), to thereby obtain a sample solution. Then, proton NMR analysis of the sample solution was performed at 25° C., in which the number of integration was 256 times, thereby obtaining a proton NMR spectrum of the sample solution. From the obtained proton NMR spectrum, the percentage of a value which is ½ of the integral value of the proton peak ($\delta=3.68$ ppm) ascribed to the methylene at the $\alpha$-position of the terminal hydroxyl group, based on a value which is ¼ of the integral value of the proton peak ascribed to the benzene rings present in the polytrimethylene terephthalate resin, was calculated, and the obtained percentage value was defined as the terminal hydroxyl group content of the polytrimethylene terephthalate resin.

(6) Cyclic dimer re-formation rate (W) (the cyclic dimer re-formation rate (W) is defined as the increase (as expressed by absolute percentage value) in the cyclic dimer content (% by weight), per minute, of the crude polytrimethylene terephthalate resin as measured at 260° C. in nitrogen gas atmosphere with respect to a sample of the crude polytrimethylene terephthalate resin in a molten form, wherein the molten sample is obtained by melting a cyclic dimer-reduced sample of the crude polytrimethylene terephthalate resin which cyclic dimer-reduced sample has a cyclic dimer content reduced to 0.1% by weight or less)

(Method for Reducing the Cyclic Dimer Content)

A crude polytrimethylene terephthalate resin was crushed into particles, each having a particle diameter of not more than 1 mm. Then, the obtained particles were subjected to extraction for 8 hours by means of a Soxhlet's extractor with chloroform as a solvent, to thereby remove cyclic dimer from the particles. After the extraction, the cyclic dimer content of the particles was measured to confirm that the cyclic dimer content was reduced to not more than 0.05% by weight. The thus obtained particles of a crude polytrimethylene terephthalate resin (having a cyclic dimer content of not more than 0.05% by weight) were used as a cyclic dimer-reduced sample.

(Method for Measuring the Cyclic Dimer Re-formation Rate (W))

0.5 g of the above-obtained particles of a crude polytrimethylene terephthalate resin (i.e., the above-obtained cyclic dimer-reduced sample) were placed in a 10 ml glass ampule, and the glass ampule was purged with nitrogen. Then, the glass ampule was heated in an oil bath having a temperature of 260° C. so as to maintain the crude resin in a molten form for a period of time such that the cyclic dimer content of the crude resin does not exceed 2% by weight. Subsequently, the glass ampule was quenched with a dry ice powder to solidify the crude resin in the glass ampule. Then, the cyclic dimer content (% by weight) of the solidified sample was measured, and the difference between the cyclic dimer content (% by weight) of the solidified sample and the cyclic dimer content (% by weight) of the cyclic dimer-reduced sample (prior to heating at 260° C.) was calculated, and the obtained difference (% by weight) was divided by the time (minute) for which the cyclic dimer-reduced sample was maintained in a molten form, to thereby obtain the cyclic dimer re-formation rate (W).

(7) Color (L-value and b*-value)

The color (in terms of L-value and b*-value thereof) of a polytrimethylene terephthalate was measured by means of a color measuring computer (manufactured and sold by SUGA TEST INSTRUMENTS Co., Ltd., Japan).

(8) Ink Adhesion Property

A polytrimethylene terephthalate resin was shaped into a plate-shaped article by means of a hot press heated to 260° C., using a mold having a size of 10 cm×10 cm×3 mm (melting time: 15 minutes, molding time: 5 minutes, and cooling time at 70° C.: 30 minutes). The obtained plate-shaped article was dried by means of a hot air dryer at 100° C. for 48 hours, and then maintained at 20° C. and at a relative humidity (RH) of 50% for 24 hours.

Using an ink for PET (trade name: PET9107 white; manufactured and sold by JUJO CHEMICAL CO., LTD., Japan) (which was diluted with a slow drying type Tetoron solvent) and T-270 printing plate, printing was effected on the above-obtained plate shaped article. Then, the printed plate-shaped article was dried at 100° C. for 80 seconds, and then maintained at 20° C. and at an RH of 50% for 24 hours. Subsequently, the resultant ink film formed on the plate-shaped article was cut with a razor to form a checkered cut pattern of 10×10 ink film grids (intervals between the mutually adjacent grids: 1 mm) on the plate-shaped article, and an adhesive tape test was conducted as follows. A cellophane adhesive tape was applied to the printed surface of the plate-shaped article so as to cover the above-mentioned checkered cut pattern completely. Then, the cellophane adhesive tape was ripped off quickly, and the number (A) of the ink film grids remaining on the plate-shaped article was counted.

Further, substantially the same procedure as mentioned above was repeated except that the printed plate-shaped article was dried at 100° C. for 100 hours using a hot air dryer, to obtain the number (B) of the ink film grids remaining on the plate-shaped article.

PRODUCTION EXAMPLE 1

40 kg of dimethyl terephthalate, 24 kg of 1,3-propanediol, and 40 g of titanium tetrabutoxide were charged into a 100-liter autoclave equipped with a stirrer having plate-shaped agitation blades, and a transesterification reaction was performed while removing methanol from the autoclave by distillation at 220° C. The removed methanol was weighed, and the weight thereof was converted into the molar amount. From the molar amount of the removed methanol, the transesterification ratio was calculated by the following formula, and was found to be 95%.

$$\text{transesterification ratio}(\%) = \frac{(\text{molar amount of methanol removed})}{\left(\begin{array}{c}\text{molar amount of}\\ \text{dimethyl terephthalate}\end{array}\right) \times 2} \times 100.$$

After completion of the transesterification reaction, 11.5 g of phosphoric acid was added to the autoclave, and the resultant mixture was stirred for 30 minutes. Then, the mixture was subjected to a polycondensation reaction at 260° C. under reduced pressure, namely, under a pressure of 40 Pa, for 4 hours, while removing 1,3-propanediol from the mixture by distillation, to thereby obtain a crude polytrimethylene terephthalate (PTT) resin.

Subsequently, the obtained crude PTT resin was extruded from the bottom of the autoclave in the form of a rope, and the obtained rope was cut into pellets. The crude resin had an intrinsic viscosity of 0.65 dl/g, a cyclic dimer content of 2.62% by weight, a terminal hydroxyl group content (M) of 2.38 (in terms of mole % based on the total molar amount of the trimethylene terephthalate units). Further, the cyclic dimer re-formation rate (W) was measured by the method described in item (6) above, wherein the cyclic dimer-reduced sample was maintained in a molten form at 260° C. for 30 minutes. As a result, it was found that the amount of the cyclic dimer re-formed during the 30-minute melting of the sample resin was 0.36% by weight, based on the weight of the sample resin, and that, hence, the cyclic dimer re-formation rate (W) was 0.012% by weight per minute. From the cyclic dimer re-formation rate (W) and the terminal hydroxyl group content (M), the cyclic dimer formation index (E=W/M) of the crude resin was calculated, and was found to be 0.005.

As apparent from the above, when phosphoric acid was added to a polycondensation reaction system for producing a crude PTT resin in the presence of a catalyst comprising a titanium compound, the cyclic dimer formation index (E) of the crude resin was suppressed to a value as small as 0.005. However, the cyclic dimer content of the PTT resin produced in this Production Example 1 (using a conventional polyester production process) was disadvantageously high, i.e., as high as 2.62% by weight. As a result of the studies of the present inventors, it has been confirmed that, at an initial stage of the polycondensation reaction where a trimethylene terephthalate oligomer composed of about ten trimethylene terephthalate monomer units is formed, the cyclic dimer content of the oligomer becomes as high as 2.5% by weight or more. The reason for this is presumed that the terminal hydroxyl group content of the oligomer at such an initial stage of the polycondensation reaction is high and, hence, the cyclic dimer is formed at an extremely high rate until the polycondensation reaction reaches the ring-linear chain equilibrium. Further, it was found that, even when a crude PTT resin has an improved (low) cyclic dimer formation index (E), the evaporation removal of the cyclic dimer using a conventional polyester polymerization vessel is extremely difficult due to the large depth of the liquid reaction mixture in the polymerization vessel.

PRODUCTION EXAMPLE 2

40 kg of dimethyl terephthalate, 24 kg of 1,3-propanediol, and 48 g of tin 2-ethylhexanoate were charged into a 100-liter autoclave equipped with a stirrer having plate-shaped agitation blades, and a transesterification reaction was performed while removing methanol from the autoclave by distillation at 220° C. The transesterification ratio was calculated in the same manner as in Production Example 1, and was found to be 99%. Then, the reaction mixture was subjected to a polycondensation reaction at 260° C. under reduced pressure, namely, under a pressure of 40 Pa, for 4 hours, while removing 1,3-propanediol from the reaction mixture by distillation, to thereby obtain a crude polytrimethylene terephthalate (PTT) resin.

Subsequently, the obtained crude PTT resin was extruded from the bottom of the autoclave in the form of a rope, and the obtained rope was cut into pellets. The crude resin had an intrinsic viscosity of 0.71 dl/g, a cyclic dimer content of 2.61% by weight, a terminal hydroxyl group content (M) of 2.08 (in terms of mole % based on the total molar amount of the trimethylene terephthalate units). Further, the cyclic dimer re-formation rate (W) was measured by the method described in item (6) above, wherein the cyclic dimer-reduced sample was maintained in a molten form at 260° C. for 30 minutes. As a result, it was found that the amount of the cyclic dimer re-formed during the 30-minute melting of the sample resin was 1.00% by weight, based on the weight of the crude resin, and that, hence, the cyclic dimer re-formation rate (W) was 0.033% by weight per minute. From the cyclic dimer re-formation rate (W) and the terminal hydroxyl group content (M), the cyclic dimer formation index (E=W/M) of the crude resin was calculated, and was found to be 0.016.

As apparent from the above, when the polycondensation reaction for producing a crude PTT resin is performed using a catalyst comprising a tin compound which does not have a C—Sn bond, the cyclic dimer formation index (E) of the crude resin can be suppressed to a value as small as 0.016. Further, it was confirmed that the catalyst used in this Production Example (i.e., tin 2-ethylhexanoate) had high catalytic activity as a polycondensation catalyst.

PRODUCTION EXAMPLE 3

40 kg of terephthalic acid and 24 kg of 1,3-propanediol were charged into a 100-liter autoclave equipped with a stirrer having plate-shaped agitation blades, and an esterification reaction was performed in the absence of a catalyst while removing water from the autoclave by distillation at 250° C. The removed water was weighed, and the weight thereof was converted into the molar amount. From the molar amount of the removed water, the esterification ratio was calculated by the following formula, and was found to be 96%.

$$\text{Esterification ratio (\%)} = \frac{\text{(molar amount of water removed)}}{\text{(molar amount of terephthalic acid)} \times 2} \times 100.$$

Then, the reaction mixture was subjected to a polycondensation reaction at 260° C. under reduced pressure, namely, under a pressure of 40 Pa, for 4 hours, while removing 1,3-propanediol from the reaction mixture by distillation, to thereby obtain a crude polytrimethylene terephthalate (PTT) resin.

Subsequently, the obtained crude PTT resin was extruded from the bottom of the autoclave in the form of a rope, and the obtained rope was crushed to obtain polymer chips. The crude resin had an intrinsic viscosity of 0.31 dl/g, a cyclic dimer content of 2.59% by weight, a terminal hydroxyl group content (M) of 6.88 (in terms of mole % based on the total molar amount of the trimethylene terephthalate units). Further, the cyclic dimer re-formation rate (W) was measured by the method described in item (6) above, wherein the cyclic dimer-reduced sample was maintained in a molten form at 260° C. for 30 minutes. As a result, it was found that the amount of the cyclic dimer re-formed during the 30-minute melting of the sample resin was 1.17% by weight, based on the weight of the crude resin, and that, hence, the cyclic dimer re-formation rate (W) was 0.039% by weight per minute. From the cyclic dimer re-formation rate (W) and the terminal hydroxyl group content (M), the cyclic dimer formation index (E=W/M) of the crude resin was calculated, and was found to be 0.006.

As apparent from the above, when the polycondensation reaction for producing a crude polytrimethylene terephthalate resin was performed in the absence of a metal catalyst, the cyclic dimer formation index (E) of the crude resin was suppressed to a value as small as 0.006.

PRODUCTION EXAMPLE 4

40 kg of dimethyl terephthalate, 24 kg of 1,3-propanediol and 80 g of titanium tetrabutoxide were charged into a 100-liter autoclave equipped with a stirrer having plate-shaped agitation blades, and a transesterification reaction was performed while removing methanol from the resultant reaction mixture by distillation at 220° C. The transesterification ratio was calculated in the same manner as in Production Example 1, and was found to be 98%. Then, the reaction mixture was subjected to a polycondensation reaction at 260° C. under reduced pressure, namely, under a pressure of 40 Pa, for 4 hours, while removing 1,3-propanediol from the reaction mixture by distillation, to thereby obtain a crude polytrimethylene terephthalate (PTT) resin.

Subsequently, the obtained crude PTT resin was extruded from the bottom of the autoclave in the form of a rope, and the obtained rope was cut into pellets. The crude resin had an intrinsic viscosity of 0.72 dl/g, a cyclic dimer content of 2.61% by weight, and a terminal hydroxyl group content (M) of 2.08 (in terms of mole % based on the total molar amount of the trimethylene terephthalate units).

Further, the cyclic dimer re-formation rate (W) was measured by the method described in item (6) above. When the cyclic dimer-reduced sample was maintained in a molten form at 260° C. for 30 minutes to evaluate the cyclic dimer re-formation rate (W), the cyclic dimer content of the sample resin exceeded 2% by weight. Therefore, the sample resin was maintained in a molten form at 260° C. for only 10 minutes to evaluate the cyclic dimer re-formation rate (W). As a result, it was found that the amount of cyclic dimer re-formed during the 10-minute melting of the sample resin was 1.48% by weight, based on the weight of the sample resin, and that, hence, the cyclic dimer re-formation rate (W) was 0.148% by weight per minute. From the cyclic dimer re-formation rate (W) and the terminal hydroxyl group content (M), the cyclic dimer formation index (E=W/M) of the crude resin was calculated, and was found to be 0.071.

As apparent from the above, when phosphoric acid was not added to the polycondensation reaction system for producing a crude polytrimethylene terephthalate resin in the presence of a catalyst comprising a titanium compound, the cyclic dimer formation index (E) of the crude resin became disadvantageously high, i.e., as high as 0.071.

PRODUCTION EXAMPLE 5

A crude polytrimethylene terephthalate resin was produced in substantially the same manner as in Production Example 1, except that the polycondensation reaction was performed for only 1.5 hours.

After the polycondensation reaction, the obtained crude polytrimethylene terephthalate resin was extruded from the bottom of the autoclave in the form of a rope, and the obtained rope was crushed into polymer chips. The crude resin had an intrinsic viscosity of 0.19 dl/g, a cyclic dimer content of 2.63% by weight, and a terminal hydroxyl group content (M) of 16.7 (in terms of mole % based on the total molar amount of the trimethylene terephthalate units).

Further, the cyclic dimer re-formation rate (W) was measured by the method described in item (6) above, wherein the cyclic dimer-reduced sample was maintained in a molten form at 260° C. for 30 minutes. When the crude resin was maintained in a molten form at 260° C. for 30 minutes to evaluate the cyclic dimer re-formation rate (W), the cyclic dimer content of the crude resin exceeded 2% by weight. Therefore, the crude resin was maintained in a molten form at 260° C. for only 10 minutes to evaluate the cyclic dimer re-formation rate (W). As a result, it was found that the amount of cyclic dimer re-formed during the 10-minute melting of the sample resin was 0.84% by weight, based on the weight of the crude resin, and that, hence, the cyclic dimer re-formation rate (W) was 0.084% by weight per minute. From the cyclic dimer re-formation rate (W) and the terminal hydroxyl group content (M), the cyclic dimer formation index (E=W/M) of the crude resin was calculated, and was found to be 0.005.

As apparent from the above, when phosphoric acid was added to a polycondensation reaction system for producing a crude PTT resin in the presence of a catalyst comprising a titanium compound, the cyclic dimer formation index (E) of the crude resin was suppressed to a value as small as 0.005 (which is the same value as in Production Example 1), in spite of the high terminal hydroxyl group content (M) (which was much higher than that in Production Example 1).

PRODUCTION EXAMPLE 6

Chips of a crude polytrimethylene terephthalate (PTT) resin were produced in substantially the same manner as in Production Example 5. The produced chips were finely crushed by means of a crusher, to thereby obtain a powder having a particle diameter of not more than 1 mm. The obtained powder was charged into a 300-liter tumbling solid-phase polymerizer, and a solid-phase polymerization was performed at 205° C. for 30 hours, while flowing nitrogen gas into the polymerizer at a rate of 100 liters/hr, thereby obtaining a crude polytrimethylene terephthalate resin.

The obtained crude resin had an intrinsic viscosity of 1.03 dl/g, a cyclic dimer content of 0.98% by weight, a terminal hydroxyl group content (M) of 1.13 (in terms of mole % based on the total molar amount of the trimethylene terephthalate units). Further, the cyclic dimer re-formation rate (W) was measured by the method described in item (6) above, wherein the cyclic dimer-reduced sample was maintained in a molten form at 260° C. for 30 minutes. As a result, it was found that the amount of the cyclic dimer re-formed during the 30-minute melting of the sample resin was 0.18% by weight, based on the weight of the crude resin, and that, hence, the cyclic dimer re-formation rate (W) was 0.006% by weight per minute. From the cyclic dimer re-formation rate (W) and the terminal hydroxyl group content (M), the cyclic dimer formation index (E=W/M) of the crude resin was calculated, and was found to be 0.005.

As apparent from the above, when phosphoric acid was added to a polycondensation reaction system for producing a crude PTT resin in the presence of a catalyst comprising a titanium compound, the cyclic dimer formation index (E) of the crude resin was suppressed to a value as small as 0.005 (which is the same value as in Production Examples 1 and 5), in spite of the low terminal hydroxyl group content (M) (which was much lower than those in Production Examples 1 and 5).

However, since the crude PTT resin was produced by the solid-phase polymerization, the crude resin had a molecular weight distribution as broad as 3.0, which was much broader than the molecular weight distribution of the crude resins produced in the Production Examples which employ the melt polymerization process.

PRODUCTION EXAMPLE 7

A crude polytrimethylene terephthalate (PTT) resin was produced in substantially the same manner as in Production Example 4, except that the polycondensation reaction was performed for only 1 hour.

After the polycondensation reaction, the obtained crude PTT resin was extruded from the bottom of the autoclave in the form of a rope, and the obtained rope was crushed into polymer chips. The crude resin had an intrinsic viscosity of 0.18 dl/g, a cyclic dimer content of 2.62% by weight, and a terminal hydroxyl group content (M) of 16.5 (in terms of mole % based on the total molar amount of the trimethylene terephthalate units).

Further, the cyclic dimer re-formation rate (W) was measured by the method described in item (6) above. When the crude resin was maintained in a molten form at 260° C. for 30 minutes to evaluate the cyclic dimer re-formation rate (W), the cyclic dimer content of the crude resin exceeded 2% by weight. Therefore, the crude resin was maintained in a molten form at 260° C. for only 5 minutes to evaluate the cyclic dimer re-formation rate (W). However, the cyclic dimer content of the crude resin exceeded 2% by weight again. Thus, in Production Example 7, the cyclic dimer re-formation rate (W) and cyclic dimer formation index (E) of the crude resin could not be evaluated.

PRODUCTION EXAMPLE 8

Chips of a crude polytrimethylene terephthalate (PTT) were produced in substantially the same manner as in Production Example 7. The produced chips were finely crushed by means of a crusher, to thereby obtain a powder having a particle diameter of not more than 1 mm. The obtained powder was charged into a 300-liter tumbling solid-phase polymerizer, and a solid-phase polymerization was performed at 205° C. for 25 hours, while flowing nitrogen gas into the polymerizer at a rate of 100 liters/hr, thereby obtaining a crude PTT resin.

The obtained crude resin had an intrinsic viscosity of 1.02 dl/g, a cyclic dimer content of 0.92% by weight, a terminal hydroxyl group content (M) of 1.13 (in terms of mole % based on the total molar amount of the trimethylene terephthalate units).

Further, the cyclic dimer re-formation rate (W) was measured by the method described in item (6) above. When the crude resin was maintained in a molten form at 260° C. for 30 minutes to evaluate the cyclic dimer re-formation rate (W), the cyclic dimer content of the crude resin exceeded 2% by weight. Therefore, the crude resin was maintained in a molten form at 260° C. for only 10 minutes to evaluate the cyclic dimer re-formation rate (W). As a result, it was found that the amount of cyclic dimer re-formed during the 10-minute melting of the sample resin was 0.80% by weight, based on the weight of the crude resin, and that, hence, the cyclic dimer re-formation rate (W) was 0.080% by weight per minute. From the cyclic dimer re-formation rate (W) and the terminal hydroxyl group content (M), the cyclic dimer formation index (E=W/M) of the crude resin was calculated, and was found to be 0.071.

As apparent from the above, when phosphoric acid was not added to a polycondensation reaction system for producing a crude PTT resin in the presence of a catalyst comprising a titanium compound, the cyclic dimer formation index (E) of the crude resin was disadvantageously large, i.e., as large as 0.071 which is the same value as in Production Example 4, in spite of the low terminal hydroxyl group content (M) (which was much lower than that in Production Example 4).

Further, since the crude PTT resin was produced by the solid-phase polymerization process, the crude resin had a molecular weight distribution as broad as 2.9, which was much broader than the molecular weight distribution of the crude resins produced in the Production Examples which employ the melt polymerization process.

PRODUCTION EXAMPLE 9

A crude polytrimethylene terephthalate (PTT) resin was produced in substantially the same manner as in Production Example 1, except that 40 g of phenylphosphonic acid was added instead of phosphoric acid after completion of the transesterification reaction.

After the polycondensation reaction, the obtained crude PTT resin was extruded from the bottom of the autoclave in the form of a rope, and the obtained rope was cut into pellets. The crude resin had an intrinsic viscosity of 0.67 dl/g, a cyclic dimer content of 2.64% by weight, and a terminal hydroxyl group content (M) of 2.26 (in terms of mole % based on the total molar amount of the trimethylene terephthalate units). Further, the cyclic dimer re-formation rate (W) was measured by the method described in item (6) above, wherein the cyclic dimer-reduced sample was maintained in a molten form at 260° C. for 30 minutes. As a result, it was found that the amount of the cyclic dimer reformed during the 30-minute melting of the sample resin was 1.83% by weight, based on the weight of the crude resin, and that, hence, the cyclic dimer re-formation rate (W) was 0.061% by weight per minute. From the cyclic dimer re-formation rate (W) and the terminal hydroxyl group content (M), the cyclic dimer formation index (E=W/M) of the crude resin was calculated, and was found to be 0.027.

As apparent from the above, when phenylphosphonic acid was added to a polycondensation reaction system for producing a crude PTT resin in the presence of a catalyst comprising a titanium compound, the cyclic dimer formation index (E) of the crude resin was suppressed to a value as small as 0.027.

PRODUCTION EXAMPLE 10

20 g of phenylphosphonic acid was dissolved in 1,3-propanediol to obtain a solution. The obtained solution was heated at 180° C., and 40 g of titanium tetrabutoxide was dropwise added thereto while stirring. Then, a reaction was performed at 180° C. for 30 minutes. The resultant reaction product was used as a catalyst in the production of a crude polytrimethylene terephthalate resin as explained below.

A crude polytrimethylene terephthalate (PTT) resin was produced in substantially the same manner as in Production Example 1 except that the above-obtained reaction product was used as a catalyst instead of titanium tetrabutoxide.

Subsequently, the produced crude PTT resin was extruded from the bottom of the autoclave in the form of a rope, and the obtained rope was cut into pellets. The crude resin had an intrinsic viscosity of 0.55 dl/g, a cyclic dimer content of 2.61% by weight, a terminal hydroxyl group content (M) of 3.10 (in terms of mole % based on the total molar amount of the trimethylene terephthalate units).

Further, the cyclic dimer re-formation rate (W) was measured by the method described in item (6) above. When the cyclic dimer-reduced sample was maintained in a molten form at 260° C. for 30 minutes to evaluate the cyclic dimer re-formation rate (W), the cyclic dimer content exceeded 2% by weight. Therefore, the sample resin was maintained in a molten form at 260° C. for only 10 minutes to evaluate the cyclic dimer re-formation rate. As a result, it was found that the amount of cyclic dimer re-formed during the 10-minute melting of the sample resin was 0.71% by weight, based on the weight of the crude resin, and that, hence, the cyclic dimer re-formation rate (W) was 0.071% by weight per minute. From the cyclic dimer re-formation rate (W) and the terminal hydroxyl group content (M), the cyclic dimer formation index (E=W/M) of the crude resin was calculated, and was found to be 0.023.

As apparent from the above, when the polycondensation reaction for producing a crude PTT resin was performed using a catalyst prepared by reacting the titanium compound with phenylphosphonic acid, the cyclic dimer formation index (E) of the crude resin was improved (lowered) as compared to that of the crude resin produced in Production Example 9. However, it was also found that the catalyst used in Production Example 10 had a slightly lower catalytic activity than that of the catalyst used in Production Example 9.

PRODUCTION EXAMPLE 11

A crude polytrimethylene terephthalate (PTT) resin was produced in substantially the same manner as in Production Example 1, except that 60 g of 2,5-dicarboxylphenylphosphonic acid was added instead of phosphoric acid after completion of the transesterification reaction.

After the polycondensation reaction, the obtained crude PTT resin was extruded from the bottom of the autoclave in the form of a rope, and the obtained rope was cut into pellets. The crude resin had an intrinsic viscosity of 0.69 dl/g, a cyclic dimer content of 2.65% by weight, and a terminal hydroxyl group content (M) of 2.15 (in terms of mole % based on the total molar amount of the trimethylene terephthalate units).

Further, the cyclic dimer re-formation rate (W) was measured by the method described in item (6) above. When the crude resin was maintained in a molten form at 260° C. for 30 minutes to evaluate the cyclic dimer re-formation rate (W), the cyclic dimer content of the crude resin became close to 2% by weight. Therefore, the crude resin was maintained in a molten form at 260° C. for only 10 minutes to evaluate the cyclic dimer re-formation rate (W). As a result, it was found that the amount of cyclic dimer re-formed during the 10-minute melting of the sample resin was 0.67% by weight, based on the weight of the crude resin, and that, hence, the cyclic dimer re-formation rate (W) was 0.067% by weight per minute. From the cyclic dimer re-formation rate (W) and the terminal hydroxyl group content (M), the cyclic dimer formation index (E=W/M) of the crude resin was calculated, and was found to be 0.031.

As apparent from the above, when 2,5-dicarboxylphenylphosphonic acid was added to a polycondensation reaction system for producing a crude PTT resin in the presence of a catalyst comprising a titanium compound, the cyclic dimer formation index (E) of the crude resin was suppressed to a value as small as 0.031.

PRODUCTION EXAMPLE 12

A crude polytrimethylene terephthalate (PTT) resin was produced in substantially the same manner as in Production Example 2, except that 60 g of butylstannoic acid was fed into the autoclave instead of tin 2-ethylhexanoate.

After the polycondensation reaction, the obtained crude polytrimethylene terephthalate resin was extruded from the bottom of the autoclave in the form of a rope, and the obtained rope was cut into pellets. The crude resin had an intrinsic viscosity of 0.72 dl/g, a cyclic dimer content of 2.66% by weight, and a terminal hydroxyl group content (M) of 2.08 (in terms of mole % based on the total molar amount of the trimethylene terephthalate units). Further, the cyclic dimer re-formation rate (W) was measured by the method described in item (6) above, wherein the cyclic dimer-reduced sample was maintained in a molten form at 260° C. for 30 minutes. As a result, it was found that the amount of the cyclic dimer re-formed during the 30-minute melting of the sample resin was 1.56% by weight, based on the weight of the crude resin, and that, hence, the cyclic dimer re-formation rate (W) was 0.052% by weight per minute. From the cyclic dimer re-formation rate (W) and the terminal hydroxyl group content (M), the cyclic dimer formation index (E=W/M) of the crude resin was calculated, and was found to be 0.025. However, the crude resin (pellets) produced in this Production Example (in the form of pellets) suffered severe discoloration as compared to the case of the crude resins obtained in other Production Examples.

As apparent from the above, when the polycondensation reaction for producing a crude PTT resin was performed using a catalyst comprising a tin compound which has a C—Sn bond, the cyclic dimer formation index (E) of the crude resin was suppressed to a value as small as 0.025. Further, it was confirmed that the catalyst exhibited a high catalytic activity during the polycondensation reaction. However, it was confirmed that the crude resin produced in this Production Example suffered severe discoloration.

PRODUCTION EXAMPLE 13

A crude polytrimethylene terephthalate (PTT) resin was produced in substantially the same manner as in Production Example 4, except that the amount of titanium tetrabutoxide (catalyst) was changed to 40 g.

After the polycondensation reaction, the obtained crude PTT resin was extruded from the bottom of the autoclave in the form of a rope, and the obtained rope was cut into pellets. The crude resin had an intrinsic viscosity of 0.68 dl/g, a cyclic dimer content of 2.62% by weight, and a terminal hydroxyl group content (M) of 2.22 (in terms of mole % based on the total molar amount of the trimethylene terephthalate units).

Further, the cyclic dimer re-formation rate (W) was measured by the method described in item (6) above. When the crude resin was maintained in a molten form at 260° C. for 30 minutes to evaluate the cyclic dimer re-formation rate (W), the cyclic dimer content of the crude resin exceeded 2% by weight. Therefore, the crude resin was maintained in a molten form at 260° C. for only 10 minutes to evaluate the cyclic dimer re-formation rate (W). As a result, it was found that the amount of cyclic dimer re-formed during the 10-minute melting of the sample resin was 1.33% by weight, based on the weight of the crude resin, and that, hence, the cyclic dimer re-formation rate (W) was 0.133% by weight per minute. From the cyclic dimer re-formation rate (W) and the terminal hydroxyl group content (M), the cyclic dimer formation index (E=W/M) of the crude resin was calculated, and was found to be 0.060.

As apparent from the above, when the amount of titanium tetrabutoxide was reduced, the catalytic activity of titanium tetrabutoxide was lowered; however, the cyclic dimer formation index (E) could be suppressed to 0.060.

PRODUCTION EXAMPLE 14

A crude polytrimethylene terephthalate (PTT) resin was produced in substantially the same manner as in Production Example 4, except that the amount of titanium tetrabutoxide (catalyst) was changed to 4 g.

After the polycondensation reaction, the obtained crude PTT resin was extruded from the bottom of the autoclave in the form of a rope, and the obtained rope was cut into pellets. The crude resin had an intrinsic viscosity of 0.44 dl/g, a cyclic dimer content of 2.61% by weight, and a terminal hydroxyl group content (M) of 4.44 (in terms of mole % based on the total molar amount of the trimethylene terephthalate units).

Further, the cyclic dimer re-formation rate (W) was measured by the method described in item (6) above. When the crude resin was maintained in a molten form at 260° C. for 30 minutes to evaluate the cyclic dimer re-formation rate (W), the cyclic dimer content of the crude resin exceeded 2% by weight. Therefore, the crude resin was maintained in a molten form at 260° C. for only 10 minutes to evaluate the cyclic dimer re-formation rate (W). As a result, it was found that the amount of cyclic dimer re-formed during the 10-minute melting of the sample resin was 1.20% by weight, based on the weight of the crude resin, and that, hence, the cyclic dimer re-formation rate (W) was 0.120% by weight per minute. From the cyclic dimer re-formation rate (W) and the terminal hydroxyl group content (M), the cyclic dimer formation index (E=W/M) of the crude resin was calculated, and was found to be 0.027.

As apparent from the above, when the amount of titanium tetrabutoxide was further reduced from that in Production Example 13, the catalytic activity of titanium tetrabutoxide was markedly lowered; however, the cyclic dimer formation index (E) could be suppressed to a value as small as 0.027.

EXAMPLE 1

Using the device as shown in FIG. 1, production of polytrimethylene terephthalate resin B was conducted as follows. Crude polytrimethylene terephthalate resin (PTT prepolymer) A produced in Production Example 1 was extruded by means of an extruder at 255° C., to thereby obtain crude resin A in a molten form. Crude resin A in a molten form was fed through inlet 3 into polymerizer 1 by means of transferring pump 2. In polymerizer 1, crude resin A in a molten form was caused to pass through the holes of perforated plate 4 at 255° C. (temperature of the molten prepolymer) and at a rate of 10 g/min per hole, and then, was allowed to fall along and in contact with guides 5 at an atmospheric temperature of 255° C., which is the same as the temperature of the molten prepolymer (i.e., crude resin A having passed through the holes of perforated plate 4), under reduced pressure, namely, under a pressure of 20 Pa, to thereby perform a polymerization to obtain PTT resin B. The obtained PTT resin B was withdrawn from outlet 10 by means of withdrawal pump 9. The perforated plate had a thickness of 50 mm and nine holes, each having a diameter of 1 mm, in which the holes of the perforated plate are arranged such that a checkered pattern is formed when lines connecting the holes are drawn on the surface of the perforated plate. The guide was a wire made of stainless steel, which wire had a circular cross-section, and had a diameter of 3 mm and a length of 5 m. Guides 5 were attached to perforated plate 4 so that each hole of perforated plate 4 had one guide 5 attached thereto. Withdrawal pump 9 was operated while observing the polymer inside the polymerizer through observing window 8, so that almost no polymer was accumulated at the bottom of the polymerizer. In the above-mentioned polymerization, the retention time was 60 minutes. The retention time herein means a value calculated by dividing the total amount of the prepolymer and polymer inside the polymerizer by the feeding rate of the prepolymer (crude resin A). The obtained PTT resin was solidified in cool water having a temperature of 5° C., and then, cut into pellets, each having a weight of 20 mg. The amount of polymer powder (which had adhered to the pellets) was as low as 0.01% by weight, and the pellets had a crystallinity as low as 5%. Therefore, the obtained pellets were tough and easy to handle.

With respect to the staining of the lower surface of the perforated plate, which was caused by the vigorous foaming of the prepolymer immediately below the holes of the perforated plate, the level of staining was low. On the other hand, appropriately mild foaming of the prepolymer was observed at a lower portion of the guides, which caused the prepolymer to roll along and in contact with the guides in the form of balls. The obtained PTT resin had a high molecular weight, a narrow molecular weight distribution, a low cyclic dimer content, and excellent color. The results are shown in Table 2.

EXAMPLES 2 TO 7

In each of Examples 2 to 7, production of a polytrimethylene terephthalate (PTT) resin was performed in substantially the same manner as in Example 1, except that the polymerization was performed under the conditions shown in Table 2. The results are also shown in Table 2.

In each of Examples 2 to 7, with respect to the staining of the lower surface of the perforated plate, which was caused by the vigorous foaming of the prepolymer immediately below the holes of the perforated plate, the level of staining was low. On the other hand, appropriately mild foaming of the prepolymer was observed at lower portions of the guides.

In Example 4 (in which a crude PTT resin produced by the solid phase polymerization process was used), when the internal pressure of the polymerizer was 20 Pa, the polymerization degree of the PTT resin became so high that it became difficult to withdraw the final PTT resin from polymerizer 1. Therefore, in Example 4, the internal pressure of polymerizer 1 was changed to 150 Pa, to thereby control the polymerization degree of the PTT resin during the polymerization. Further, in Example 4, by removing the cyclic dimer from the crude PTT resin produced by the solid-phase polymerization process, a PTT resin having an extremely low cyclic dimer content, which could not be produced even by the conventional solid-phase polymerization process, was obtained.

In each of Examples 2 to 7, the obtained PTT resin (in the form of pellets) had a high molecular weight, a narrow molecular weight distribution, a low cyclic dimer content and excellent color.

COMPARATIVE EXAMPLES 1 TO 8

In each of Comparative Examples 1 to 8, production of polytrimethylene terephthalate (PTT) resin was performed in substantially the same manner as in Example 1, except that the polymerization was performed under the conditions shown in Table 2. The results are also shown in Table 2.

In Comparative Example 1, the crude PTT resin used as a prepolymer had a cyclic dimer formation index (E) as high as 0.071, and, hence, a PTT resin having a low cyclic dimer content could not be obtained.

In each of Comparative Examples 2 and 3, the crude PTT resin (prepolymer) had an intrinsic viscosity as low as 0.18 to 0.19 dl/g, so that a vigorous foaming of the prepolymer occurred just below the holes of the perforated plate, thereby markedly staining the lower surface of the perforated plate, and the inner wall of the polymerizer. The obtained PTT resin contained a large amount of black impurities (heat deterioration products). Further, the obtained PTT had a low molecular weight, and thus, could not be pelletized.

In Comparative Example 4, the crude PTT resin produced n Production Example 8 was used as a prepolymer, which crude PTT resin had a cyclic dimer content as low as 0.92% by weight. However, the prepolymer had a cyclic dimer formation index (E) as high as 0.071, so that the cyclic dimer content of the final PTT resin could not be decreased and, on the contrary, was increased.

In Comparative Example 5, a PTT resin was produced by polymerizing the crude PTT resin (prepolymer) produced in Production Example 12, wherein the crude PTT resin was produced in the presence of butylstannoic acid as a catalyst. The obtained PTT resin was markedly discolored. Further, butylstannoic acid is poisonous and, hence, is not a preferable catalyst.

In Comparative Example 6, the temperature of the molten prepolymer introduced into the polymerization reaction zone was too high, so that a vigorous foaming of the prepolymer occurred just below the holes of the perforated plate, thereby markedly staining the lower surface of the perforated plate, and the inner wall of the polymerizer. The obtained PTT resin contained a large amount of black impurities (heat deterioration products). Further, the PTT resin suffered severe discoloration by heating.

In Comparative Example 7, the temperature of the molten prepolymer introduced into the reaction zone was too low, so that the prepolymer was solidified, and hence, the prepolymer could not pass through the holes of the perforated plate.

In Comparative Example 8, the polymerization in the polymerizer was performed under atmospheric pressure. As a result, it was found that both of the polymerization degree and cyclic dimer content of the obtained PTT were not improved.

EXAMPLE 8

Production of a polytrimethylene terephthalate (PTT) resin was performed in substantially the same manner as in Example 1, except that nitrogen gas was introduced through inlet 6 into polymerizer 1 in an amount indicated in Table 2. It was observed through observing window 8 that appropriately mild foaming of polymer 5' occurred at almost all portions of the guides (the foaming was more vigorous than in Example 1), thereby causing polymer 5' to roll along and in contact with the guides in the form of balls. In this Example, the obtained PTT resin (in the form of pellets) had a high molecular weight and a low cyclic dimer content as compared to those of the PTT resin obtained in Example 1. The results are shown in Table 2.

EXAMPLE 9

Production of a polytrimethylene terephthalate (PTT) resin was performed in substantially the same manner as in Example 1, except that a nozzle was attached through a static mixer to a conduit connecting transferring pump 2 with inlet 3 for crude PTT resin, and that nitrogen gas was fed through the nozzle and the static mixer into polymerizer 1 in an amount indicated in Table 2, wherein the static mixer was used to promote the absorption of nitrogen gas by polymer 5'.

In Example 9, the amount of nitrogen gas introduced into polymerizer 1 was extremely small as compared to that in Example 8; however, appropriate foaming of polymer 5' was observed as in the case of Example 8, and the obtained PTT resin had a high molecular weight and a low cyclic dimer content as in the case of Example 8. The results are shown in Table 2.

EXAMPLE 10

Figure 2:
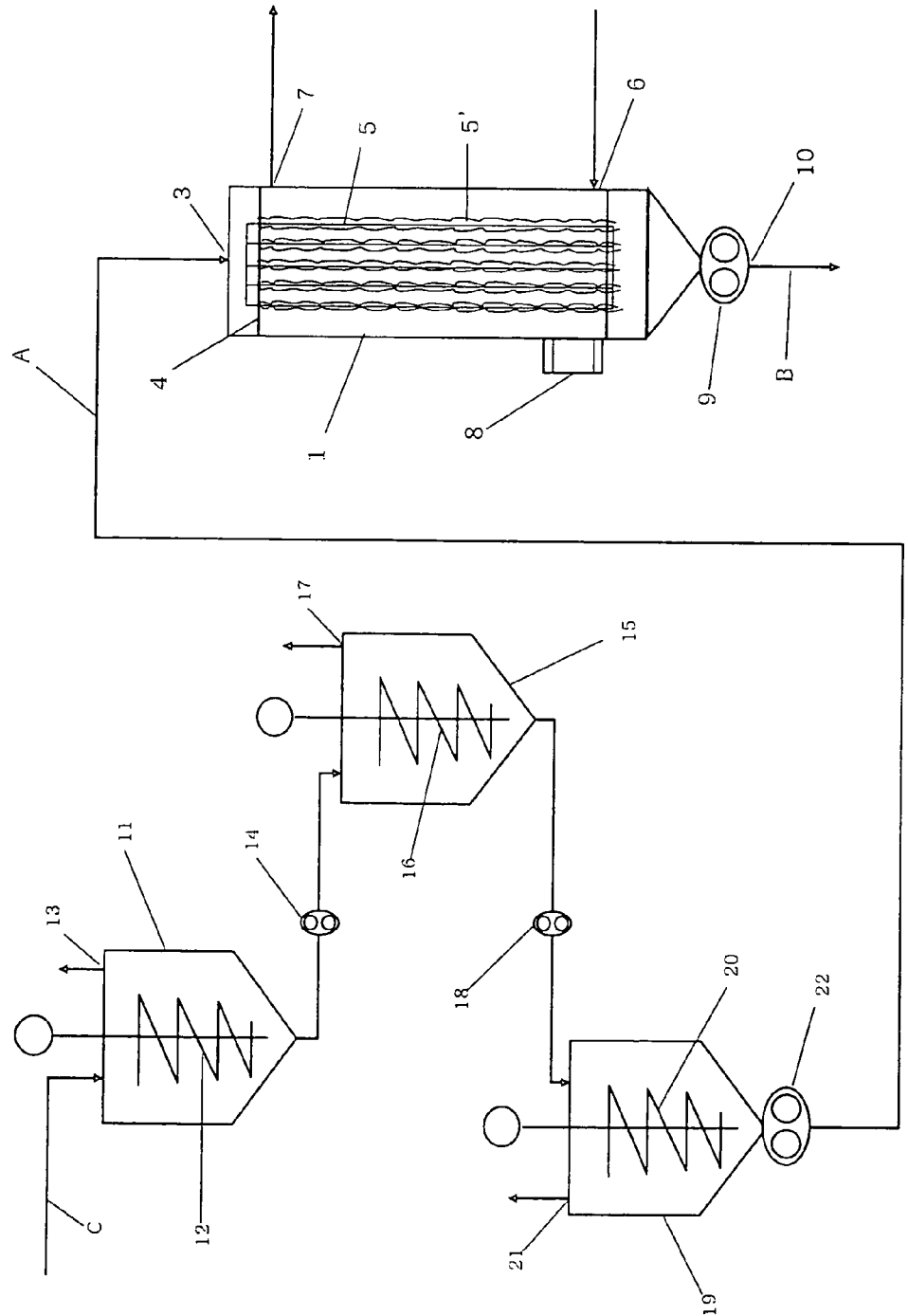
FIG. 2 shows an explanatory diagrammatic view of one form of a production system used for practicing the method of the present invention.

Using the production system as shown in FIG. 2, 130 kg of a polytrimethylene terephthalate (PTT) resin was continuously produced per day, in which dimethyl terephthalate and 1,3-propanediol were used as raw materials. With respect to the apparatuses used in the above-mentioned production system, each of transesterification reaction vessel 11, first agitation type polymerizer 15 and second agitation type polymerizer 19 was a vertical agitation type polymerizer equipped with a stirrer (12, 16 or 20) having paddle-shaped agitation blades, and the polymerizer positioned downstream of second agitation type polymerizer 19 was the same as polymerizer 1 used in Example 1, except that the guide was changed to a jungle gym-like body, in which wires (each having a diameter of 3 mm) were three-dimensionally connected with one another at intervals of 30 mm as viewed in the vertical direction and at intervals of 50 mm as viewed in the horizontal direction.

Specifically, production of the PTT resin was performed as follows. Dimethyl terephthalate and 1,3-propanediol were mixed together (dimethyl terephthalate/1,3-propanediol molar ratio=1/1.5), followed by addition of 0.1% by weight, based on the weight of dimethyl terephthalate, of titanium tetrabutoxide, thereby obtaining a mixture (mixture C). The obtained mixture C was continuously charged into transesterification reaction vessel 11, and a polymerization was performed under the conditions indicated in Tables 2 and 3, thereby obtaining a polytrimethylene terephthalate (PTT) resin. During the polymerization, phosphoric acid was continuously added to first agitation type polymerizer 15 in an amount as indicated in Table 3. Further, during the stable operation of the production system, crude polytrimethylene terephthalate resin (prepolymer) A (prior to feeding into polymerizer 1) was withdrawn from a sampling nozzle (not shown) which was provided close to inlet 3, and the properties of the withdrawn prepolymer A was evaluated. The results are shown in Table 2.

PTT resin B withdrawn from the outlet of polymerizer 1 was solidified in cool water having a temperature of 5° C., and then, cut into pellets, each having a weight of 20 mg. The amount of polymer powder (which had adhered to the pellets) was as low as 0.01% by weight, and the pellets had a crystallinity as low as 5%. Therefore, the obtained pellets were tough and easy to handle.

With respect to the staining of the lower surface of the perforated plate, which was caused by the vigorous foaming of the prepolymer immediately below the holes of the perforated plate, the level of staining was low. On the other hand, appropriately mild foaming of polymer 5' was observed at a lower portion of the guides, which caused polymer 5' to roll along and in contact with the guides in the form of balls.

The PTT resin was continuously produced under the above-mentioned conditions for two weeks, and it was found that the operation during the continuous production was stable. Then, the inside of the conduit connecting vent 7 with the vacuum pump was examined, and it was found that the amount of cyclic dimer deposited on the inner wall of the conduit was advantageously small such that the deposited cyclic dimer would not cause clogging of the conduit.

The properties of the produced PTT resin were evaluated at some points in time during the continuous production performed for two weeks, and it was found that a PTT resin having a high molecular weight, a narrow molecular weight distribution, a low cyclic dimer content and excellent color was stably obtained. The results are shown in Table 2.

EXAMPLE 11

Production of polytrimethylene terephthalate (PTT) resin was performed in substantially the same manner as in Example 10, except that phosphoric acid was continuously fed into first agitation type polymerizer 15 in an amount indicated in Table 3.

In Example 11, the PTT resin was continuously produced under the same conditions as in Example 10 for two weeks, and it was found that the operation during the continuous production was stable. Then, the inside of the conduit connecting vent 7 with the vacuum pump was examined, and it was found that the amount of cyclic dimer deposited on the inner wall of the conduit was advantageously small such that the deposited cyclic dimer would not cause clogging of the conduit.

The properties of the produced PTT resin were evaluated at some points in time during the continuous production performed for two weeks, and it was found that a PTT resin having a high molecular weight, a narrow molecular weight distribution, a low cyclic dimer content and excellent color was stably obtained. The results are shown in Table 2.

COMPARATIVE EXAMPLE 9

Pellets of the crude polytrimethylene terephthalate (PTT) resin obtained in Production Example 1 were charged into a 300-liter tumbling solid-phase polymerizer, and a solid-phase polymerization was performed at 205° C. for 72 hours, while flowing nitrogen gas into the polymerizer at a rate of 100 liters/hr, thereby obtaining a PTT resin.

The obtained pellets were analyzed, and as a result, it was found that the obtained PTT resin had a high molecular weight, a low cyclic dimer content and good color. However, the PTT resin had a broad molecular weight distribution. Further, the pellets obtained by the solid-phase polymerization process not only had attached thereto polymer powder in an amount as large as 1% by weight, but also had a crystallinity as high as 55%, so that the obtained pellets were brittle. If it is attempted to transfer the obtained pellets by means of a feeder or a pneumatic conveyer, the pellets would be broken, thereby forming a large amount of polymer powder.

COMPARATIVE EXAMPLES 10 AND 11

In each of Comparative Examples 10 and 11, production of a polytrimethylene terephthalate (PTT) resin was performed in substantially the same manner as in Example 10, except that phosphoric acid was fed into first agitation type polymerizer 15 in an amount indicated in Table 3.

In Comparative Example 10, the obtained PTT resin had a high molecular weight, a narrow molecular weight distribution and good color; however, the amount of phosphoric acid fed into first agitation type polymerizer 15 was too small, so that the crude PTT resin (prepolymer) had a cyclic dimer formation index (E) as high as 0.070, and, hence, a PTT resin having a low cyclic dimer content could not be obtained. Further, when the PTT resin was continuously produced under the above-mentioned conditions for two weeks, it was found that a conduit connecting vent 7 with a vacuum pump had a cyclic dimer deposited on the inner wall thereof, which would cause the clogging of the conduit. Therefore, it was necessary to remove the deposited cyclic dimer from the conduit every 5 days.

In Comparative Example 11, the amount of phosphoric acid fed into first agitation type polymerizer 15 was too large, so that the polymerization catalyst was deactivated. Therefore, the obtained crude PTT resin (prepolymer) had an intrinsic viscosity as low as 0.17 dl/g, so that a vigorous foaming of the prepolymer occurred just below the holes of the perforated plate, thereby markedly staining the lower surface of the perforated plate, and the inner wall of the polymerizer. The obtained PTT resin contained a large amount of black impurities (heat deterioration products). Further, the obtained PTT had a low molecular weight and, thus, could not be pelletized.

EXAMPLE 12

Figure 3:
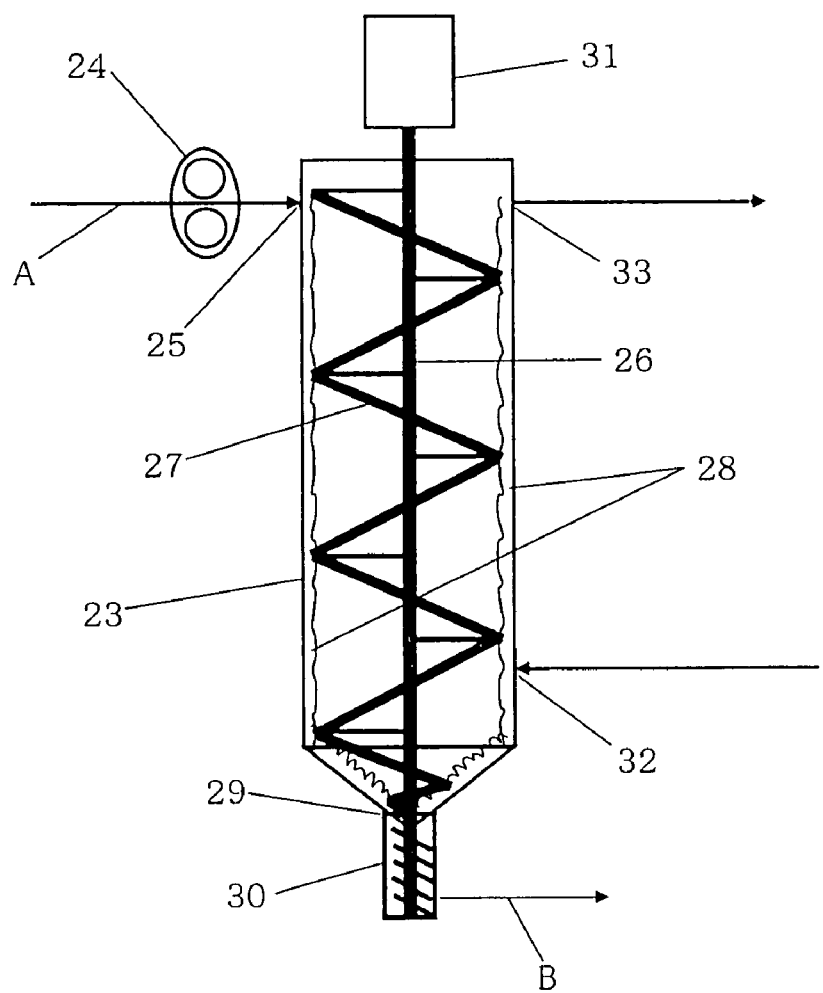
FIG. 3 shows an explanatory diagrammatic view of an example of a thin film evaporator which can be used in the present invention.

Using the device as shown in FIG. 3, production of polytrimethylene terephthalate (PTT) resin B was conducted as follows. Crude polytrimethylene terephthalate resin A produced in Production Example 1 was melt-extruded by means of an extruder at 240° C. to obtain a crude resin in a molten form. The obtained molten crude resin was fed through inlet 25 into thin film evaporator 23 by means of transferring pump 24 at a rate of 170 g/min. Then, revolution shaft 26 having blades 27 spirally attached thereto was revolved at 300 rpm to thereby form thin film 28 of the molten crude resin on the inner wall of thin film evaporator 23, while performing the surface renewal of thin film 28 and the removal of cyclic dimer from thin film 28 by volatilization under reduced pressure, namely, under a pressure of 70 Pa, to thereby obtain PTT resin B. The obtained PTT resin B was withdrawn from outlet 29 by means of withdrawal port 30 at a rate of 170 g/min (which is the same as the feeding rate of the crude resin).

Thin film evaporator 23 was a cylindrical device having an inner diameter of 15 cm and a height of 70 cm. Further, thin film evaporator 23 had bearings at the top and bottom thereof, and was equipped with revolution shaft 26 (which has three blades 27 attached thereto, such that the blades extends from revolution shaft 26 at 120° intervals as viewed from the top of shaft 26), wherein the clearance between each of blades 27 and the inner wall of thin film evaporator 23 was 2 mm.

In the production of PTT resin B, the retention time was 4.8 minutes, and the ratio of the volume of the crude PTT resin in thin film evaporator 23 to the internal volume of thin film evaporator 23 was 6.5%. Further, thin film 28 had a thickness of 2 mm, and the resin-gas contact area of thin film 28 was 4.1 $cm^2/g$ in terms of a value calculated by dividing the area of thin film 28 which is in contact with gaseous phase inside thin film evaporator 23 by the weight of the crude resin present in thin film evaporator 23, wherein the area of thin film 28 and the weight of the crude resin were calculated from the thickness of thin film 28.

PTT resin B withdrawn from outlet 29 was solidified in cool water having a temperature of 5° C., and then, cut into pellets, each having a weight of 20 mg. The amount of polymer powder (which had adhered to the pellets) was as low as 0.01% by weight, and the pellets had a crystallinity as low as 5%. Therefore, the obtained pellets were tough and easy to handle.

The obtained pellets were analyzed, and as a result, it was found that the obtained PTT resin had a high molecular weight, a narrow molecular weight distribution, a low cyclic dimer content and an excellent color. The results are shown in Table 4.

EXAMPLES 13 TO 17

In each of Examples 13 to 17, removal of the cyclic dimer was performed in substantially the same manner as in Example 12, except that the removal of the cyclic dimer was performed under the conditions shown in Table 4. The results are also shown in Table 4.

In each of Examples 13 to 17, the obtained pellets were analyzed, and as a result, it was found that the obtained PTT resin had a high molecular weight, a narrow molecular weight distribution, a low cyclic dimer content and excellent color. Further, in each of these Examples, substantially no cyclic dimer was deposited on the inner wall of the conduit connecting vent 33 with the vacuum pump during the removal of the cyclic dimer.

In Example 14, from a crude PTT resin produced by the solid-phase polymerization process, the cyclic dimer was removed by means of thin film evaporator 23. As a result, a PTT resin having an extremely low cyclic dimer content, which could not be obtained by the conventional solid-phase polymerization process, was obtained.

EXAMPLE 18

Removal of the cyclic dimer was performed in substantially the same manner as in Example 12, except that nitrogen gas was introduced through inlet 32 for inert gas into thin film evaporator 23 in an amount indicated in Table 4, thereby obtaining a PTT resin in the form of pellets. In this Example, the obtained PTT resin had a high molecular weight and a low cyclic dimer content as compared to those of the PTT resin obtained in Example 12. Further, it was confirmed that the obtained PTT resin had a narrow molecular weight distribution and an excellent color. The results are shown in Table 4.

EXAMPLE 19

The production of a polytrimethylene terephthalate (PTT) resin was performed using a combination of the production system shown in FIG. 2 and thin film evaporator 23 shown in FIG. 3, in which outlet 10 of polymerizer 1 of the production system of FIG. 2 was connected to transferring pump 24 of thin film evaporator 23 via a pipeline having a temperature of 255° C., so that thin film evaporator 23 was positioned downstream of polymerizer 1. Specifically, using the production system shown in FIG. 2, 130 kg of a polytrimethylene terephthalate (PTT) resin (in a molten form) was produced per day under the same conditions as in Example 1, and the produced molten PTT resin was fed through the pipeline into thin film evaporator 23 by means of transferring pump 24, and the removal of cyclic dimer from the PTT resin was performed in thin film evaporator 23.

Thus, in Example 19, the production of a PTT resin was performed by combining the techniques of the present invention (i.e., the production of the crude PTT resin by the guide-wetting fall process using a specific polymerization catalyst, and the removal of the cyclic dimer by using a thin film evaporator). Such combination of the techniques has enabled the production of a PTT resin having an extremely low cyclic dimer content (which cannot be achieved even by the conventional solid-phase polymerization process) by employing only the melt polymerization process.

The final PTT resin (i.e., the PTT resin withdrawn from thin film evaporator 23) was analyzed, and as a result, it was found that the final PTT resin had a high molecular weight, a narrow molecular weight distribution and excellent color. The results are shown in Table 4.

EXAMPLES 20 AND 21

In each of Examples 20 and 21, production of a PTT resin (pellets) and removal of the cyclic dimer therefrom were performed in substantially the same manner as in Example 19, except that the revolution rate of revolution shaft 26 (having blades 27 spirally attached thereto) provided in thin film evaporator 23 was changed as indicated in Table 4. By increasing the revolution rate, a PTT resin having a further improved (lower) cyclic dimer content was obtained.

More specifically, in each of Examples 20 and 21, the obtained pellets were analyzed, and as a result, it was found that the obtained PTT resin had a high molecular weight, a narrow molecular weight distribution, a low cyclic dimer content and excellent color. The results are shown in Table 4.

COMPARATIVE EXAMPLE 12

Removal of the cyclic dimer was performed in substantially the same manner as in Example 12, except that the crude PTT resin (prepolymer) obtained in Production Example 3 was used.

The crude PTT resin had an intrinsic viscosity as low as 0.31 dl/g, so that a vigorous foaming of the prepolymer occurred in thin film evaporator 23, thereby markedly staining the inner portions of thin film evaporator 23. The obtained PTT resin contained a large amount of black impurities (heat deterioration products). Further, the obtained PTT had a low molecular weight, and thus, could not be pelletized. The results are shown in Table 4.

COMPARATIVE EXAMPLES 13 TO 15

Removal of the cyclic dimer was performed in substantially the same manner as in Example 12, except that the conditions shown in Table 4 were employed. The results are shown in Table 4.

In Comparative Example 13, the temperature of the molten crude PTT resin introduced into thin film 23 was too low, so that the crude PTT resin was solidified. Therefore, it was impossible to form a thin film of the crude PTT resin and to withdraw the PTT resin from thin film evaporator 23.

In Comparative Example 14, the removal of the cyclic dimer was performed under a pressure as high as 3000 Pa, so that the cyclic dimer content of the PTT resin could not be reduced to a satisfactory level.

In Comparative Example 15, the crude PTT resin had a cyclic dimer formation index (E) as high as 0.071, so that the cyclic dimer content of the PTT resin could not be reduced to a satisfactory level. The reason for this is considered as follows. When a crude PTT resin has such a high cyclic dimer formation index (E), the cyclic dimer is generated at a high rate in thin film evaporator 23 and in a conduit through which the produced PTT resin is withdrawn, so that the PTT resin withdrawn from thin film evaporator 23 contains a large amount of cyclic dimer. Further, in Comparative Example 15, a large amount of cyclic dimer was deposited on the inner wall of the conduit provided between vent 33 and the vacuum pump. Therefore, it is considered that, if the operation of Comparative Example 15 is performed for a long time, the removal of the deposited cyclic dimer would become necessary.

EXAMPLE 22

A polytrimethylene terephthalate (PTT) resin was produced as follows. The crude polytrimethylene terephthalate (PTT) resin (in the form of pellets) produced in Production Example 1 was extruded by means of a twin-screw extruder (screw diameter: 30 mmφ, L/D=50.9) which had two vents so as to provide two reduced pressure zones therein. Specifically, the crude PTT resin (prepolymer) was fed into the twin-screw extruder at a rate of 3.5 kg/hr, and was melt-extruded at 250° C. (the temperature of the molten prepolymer) to thereby remove the cyclic dimer from the crude PTT resin. The pressure of each of the two reduced pressure zone was 1.3 kPa. The residence time of the molten prepolymer at each of the two reduced pressure zones was evaluated using color pellets, and was found to be 2 minutes. Further, it was found that the ratio of the volume of the molten prepolymer in the extruder to the inner volume of the extruder was 28%. Furthermore, from the volume of the space between the screws and the inner wall of the extruder, the resin-gas contact area (in terms of a value calculated by dividing the area of the molten polymer which is in contact with the gaseous phase inside the extruder by the weight of the molten polymer present in the extruder) was calculated, and was found to be 1.9 cm$^2$/g. With respect to the extruder used, the hopper and inlet for the crude resin (pellets) were sealed with a high purity nitrogen gas, and the vent portions were sealed by coating with a heat resistant liquid gasket.

The extruded PTT resin was solidified in cool water having a temperature of 5° C., and then, cut into pellets, each having a weight of 20 mg. The amount of polymer powder (which had adhered to the pellets) was as low as 0.01% by weight, and the pellets had a crystallinity as low as 5%. Therefore, the obtained pellets were tough and easy to handle.

The obtained pellets of the PTT resin were analyzed, and it was found that the PTT resin had a high molecular weight, a narrow molecular weight distribution, a low cyclic dimer content and excellent color. The results are shown in Table 4.

COMPARATIVE EXAMPLE 16

Removal of the cyclic dimer was performed in substantially the same manner as in Example 22, except that the crude PTT resin (prepolymer) was fed into the twin-screw extruder at a rate of 10.0 kg/hr, thereby obtaining a PTT resin in the form of pallets. The residence time of the prepolymer (in a molten form) at each of the two reduced pressure zones was 1.9 minutes. Further, the ratio of the volume of the molten prepolymer in the extruder to the inner volume of the extruder was 50%. Furthermore, from the volume of the space between the screws and the inner wall of the extruder, the resin-gas contact area (in terms of a value calculated by dividing the area of the molten polymer which is in contact with the gaseous phase inside the extruder by the weight of the molten polymer present in the extruder) was calculated, and was found to be 1.5 cm$^2$/g.

The obtained pellets were analyzed, and as a result, it was found that the cyclic dimer content of the obtained PTT resin was not reduced to a satisfactory level. The reason for this is not clear, but it is presumed that the molten prepolymer was foamed and expanded in the extruder, so that the prepolymer filled the reduced pressure zones, thereby lowering the efficiency of the removal of the cyclic dimer.

EXAMPLE 23

A polytrimethylene terephthalate (PTT) resin was produced as follows. 26 g of the crude PTT resin produced in Production Example 1 was charged into a cylindrical autoclave. The cylindrical autoclave had a diameter of 10 cm and a height of 10 cm, and was equipped with a revolution shaft having spatula-shaped agitation rods attached thereto, which revolution shaft was hung from the lid of the cylindrical autoclave. Further, the cylindrical autoclave had attached thereto pressure reduction conduits. Removal of the cyclic dimer from the crude PTT resin was performed at 250° C. under reduced pressure, namely under a pressure of 70 Pa, for 60 minutes, while revolving the revolution shaft at 100 rpm, to thereby obtain a PTT resin having a reduced cyclic dimer content. During the removal of the cyclic dimer, in order to prevent the leakage of oxygen into the autoclave, the inside of the autoclave was purged with a high purity nitrogen gas ten times. Further, using a heat resistant liquid gasket, the autoclave was sealed at a portion thereof to which the lid is attached.

After the removal of the cyclic dimer, the resultant polymer in the autoclave (i.e., the obtained PTT resin having a reduced cyclic dimer content) was quenched, and the polymer was analyzed. As a result, it was found that the obtained PTT resin had a high molecular weight, a narrow molecular weight distribution, a low cyclic dimer content and excellent color. The results are shown in Table 4.

COMPARATIVE EXAMPLE 17

Removal of the cyclic dimer was performed in substantially the same manner as in Example 23, except that 157 g of the crude PTT resin obtained in Production Example 1 was used.

The obtained PTT resin was analyzed, and as a result, it was found that the cyclic dimer content of the obtained PTT was not reduced to a satisfactory level. It is considered that the cyclic dimer content of the PTT resin could not be reduced to a satisfactory level because the resin-gas contact area was unsatisfactorily low.

EXAMPLE 24

The polytrimethylene terephthalate (PTT) resins produced in the above-mentioned Production Example 1, Examples 1 to 4, 11, 12, 15 and 21, and Comparative Examples 8, 9 and 15 were subjected to press molding to obtain plate-shaped molded products (first molded products), and the ink adhesion properties of the first molded products were evaluated (the molding and evaluation of the ink adhesion properties were conducted by the method mentioned in item (8) above). Then, the first molded products were crushed to obtain polymer chips for recycling. The obtained polymer chips were subjected to press molding to obtain another plate-shaped molded products (second molded products), and the ink adhesion properties of the second molded products were evaluated (the molding and evaluation of the ink adhesion property were conducted by the method mentioned in item (8) above).

Further, the cyclic dimer content of each of the above-mentioned molded products was measured. The results are shown in Table 5.

As apparent from Table 5, each of the molded products of the PTT resin of the present invention has an advantageously low cyclic dimer content, because the crude PTT resin of the present invention exhibits an advantageously low cyclic dimer re-formation rate during the molding thereof as compared to a PTT resin produced by the solid-phase polymerization process. Further, when the PTT resin is produced by the method of the present invention in which the cyclic dimer is removed from a crude PTT resin by volatilization (i.e., by using a guide-wetting fall polymerizer or a thin film evaporator), low molecular weight impurities other than the cyclic dimer are also removed from the crude PTT resin. It is considered that the greatly improved ink adhesion property of the PTT resin of the present invention is ascribed to the above-mentioned excellent features of the PTT resin of the present invention.

TABLE 1

| | Catalyst | Polymerization method | Intrinsic viscosity [η] | c.m.p. (° C.) | Cyclic dimer content (wt %) | E value | Molecular weight distribution (Mw/Mn) |
|---|---|---|---|---|---|---|---|
| Prod. Ex. 1 | Ti(OtBu)$_4$, H$_3$PO$_4$ | Melt polymerization | 0.65 | 230 | 2.62 | 0.005 | 2.2 |
| Prod. Ex. 2 | Tin 2-ethylhexanoate | Melt polymerization | 0.71 | 229 | 2.61 | 0.016 | 2.2 |
| Prod. Ex. 3 | No catalyst added | Melt polymerization | 0.31 | 230 | 2.59 | 0.006 | 2.3 |
| Prod. Ex. 4 | Ti(OtBu)$_4$ | Melt polymerization | 0.72 | 229 | 2.61 | 0.071 | 2.2 |
| Prod. Ex. 5 | Ti(OtBu)$_4$, H$_3$PO$_4$ | Melt polymerization | 0.19 | 230 | 2.63 | 0.005 | 2.4 |

TABLE 1-continued

| | Catalyst | Polymerization method | Intrinsic viscosity [η] | c.m.p. (°C.) | Cyclic dimer content (wt %) | E value | Molecular weight distribution (Mw/Mn) |
|---|---|---|---|---|---|---|---|
| Prod. Ex. 6 | Ti(OtBu)$_4$, H$_3$PO$_4$ | Melt polymerization (short period) | 1.03 | 230 | 0.98 | 0.005 | 3.0 |
| Prod. Ex. 7 | Ti(OtBu)$_4$ | Melt polymerization (short period) | 0.18 | 230 | 2.62 | Impossible to evaluate | 2.4 |
| Prod. Ex. 8 | Ti(OtBu)$_4$ | Solid-phase polymerization | 1.02 | 230 | 0.92 | 0.071 | 2.9 |
| Prod. Ex. 9 | Ti(OtBu)$_4$, phenylphosphonic acid | Melt polymerization | 0.67 | 229 | 2.64 | 0.027 | 2.2 |
| Prod. Ex. 10 | Ti(OtBu)$_4$, 1,3-propanediol solution of phenylphosphonic acid | Melt polymerization | 0.55 | 230 | 2.61 | 0.023 | 2.3 |
| Prod. Ex. 11 | Ti(OtBu)$_4$, 2,5-dicarboxylphenylphosphonic acid | Melt polymerization | 0.69 | 230 | 2.65 | 0.031 | 2.3 |
| Prod. Ex. 12 | Tin butyrate | Melt polymerization | 0.72 | 228 | 2.66 | 0.025 | 2.5 |
| Prod. Ex. 13 | Ti(OtBu)$_4$ (½ of the amount used in Prod. Ex. 4) | Melt polymerization | 0.68 | 229 | 2.62 | 0.060 | 2.2 |
| Prod. Ex. 14 | Ti(OtBu)$_4$ (1/20 of the amount used in Prod. Ex. 4) | Melt polymerization | 0.44 | 230 | 2.61 | 0.027 | 2.2 |

Note:
"c.m.p." means the crystalline melting point of the crude PTT resin.

TABLE 2

| | Production of crude PTT resin | Properties of crude PTT resin (prepolymer) | | Polymerization conditions | | | | State of crude PTT resin in polymerizer | |
|---|---|---|---|---|---|---|---|---|---|
| | | Intrinsic viscosity [η] | E value | Polymerizer (guide) | Temperature (°C.) | Pressure (Pa) | Nitrogen (mg/g) | Foaming | Staining |
| Ex. 1 | Prod. Ex. 1 | 0.65 | 0.005 | Wire | 255 | 20 | 0 | ○ | ○ |
| Ex. 2 | Prod. Ex. 2 | 0.71 | 0.016 | Wire | 255 | 20 | 0 | ○ | ○ |
| Ex. 3 | Prod. Ex. 3 | 0.31 | 0.006 | Wire | 255 | 20 | 0 | ○ | ○ |
| Ex. 4 | Prod. Ex. 6 | 1.03 | 0.005 | Wire | 250 | 150 | 0 | ○ | ○ |
| Ex. 5 | Prod. Ex. 9 | 0.67 | 0.027 | Wire | 255 | 20 | 0 | ○ | ○ |
| Ex. 6 | Prod. Ex. 10 | 0.55 | 0.023 | Wire | 255 | 20 | 0 | ○ | ○ |
| Ex. 7 | Prod. Ex. 11 | 0.69 | 0.031 | Wire | 255 | 20 | 0 | ○ | ○ |
| Ex. 8 | Ex. 1 | 0.65 | 0.005 | Wire | 255 | 30 | 6 | ○ | ○ |
| Ex. 9 | Ex. 1 | 0.65 | 0.005 | Wire | 255 | 30 | 0.5 | ○ | ○ |
| Ex. 10 | Continuous polymerization | 0.62 | 0.043 | Lattice | 255 | 30 | 6 | ○ | ○ |
| Ex. 11 | Continuous polymerization | 0.43 | 0.006 | Lattice | 255 | 30 | 6 | ○ | ○ |
| Comp. Ex. 1 | Prod. Ex. 4 | 0.72 | 0.071 | Wire | 255 | 20 | 0 | ○ | ○ |
| Comp. Ex. 2 | Prod. Ex. 5 | 0.19 | 0.005 | Wire | 255 | 20 | 0 | X | X |
| Comp. Ex. 3 | Prod. Ex. 7 | 0.18 | Impossible to evaluate | Wire | 255 | 20 | 0 | X | X |
| Comp. Ex. 4 | Prod. Ex. 8 | 1.02 | 0.071 | Wire | 250 | 150 | 0 | ○ | ○ |
| Comp. Ex. 5 | Prod. Ex. 12 | 0.72 | 0.025 | Wire | 255 | 20 | 0 | ○ | ○ |
| Comp. Ex. 6 | Prod. Ex. 1 | 0.65 | 0.005 | Wire | 295 | 20 | 0 | X | X |
| Comp. Ex. 7 | Prod. Ex. 1 | 0.65 | 0.005 | Wire | 230 | 20 | 0 | — | — |
| Comp. Ex. 8 | Prod. Ex. 1 | 0.65 | 0.005 | Wire | 255 | Atmospheric pressure | 0 | ○ | ○ |
| Comp. Ex. 9 | Prod. Ex. 1 | 0.65 | 0.005 | Solid-phase polymerization | 205 | 20 | 0 | — | — |
| Comp. Ex. 10 | Continuous polymerization | 0.66 | 0.070 | Lattice | 255 | 30 | 6 | ○ | ○ |
| Comp. Ex. 11 | Continuous polymerization | 0.17 | 0.005 | Lattice | 255 | 30 | 6 | X | X |

| | Properties of final PTT resin | | | | | |
|---|---|---|---|---|---|---|
| | Intrinsic viscosity [η] | Molecular weight distribution (Mw/Mn) | Cyclic dimer content (wt %) | Color b* | Color L* | Crystallinity (%) |
| Ex. 1 | 1.10 | 2.2 | 1.50 | 1 | 88 | 5 |
| Ex. 2 | 1.21 | 2.3 | 1.68 | 5 | 90 | 6 |
| Ex. 3 | 0.74 | 2.4 | 1.43 | 2 | 89 | 7 |
| Ex. 4 | 1.43 | 2.4 | 0.56 | 3 | 89 | 4 |
| Ex. 5 | 1.23 | 2.3 | 1.71 | 2 | 90 | 5 |
| Ex. 6 | 1.16 | 2.3 | 1.69 | 1 | 89 | 5 |

TABLE 2-continued

| | | | | | | |
|---|---|---|---|---|---|---|
| Ex. 7 | 1.18 | 2.3 | 1.74 | 2 | 87 | 5 |
| Ex. 8 | 1.27 | 2.2 | 1.32 | 2 | 88 | 5 |
| Ex. 9 | 1.25 | 2.2 | 1.36 | 1 | 87 | 5 |
| Ex. 10 | 1.32 | 2.3 | 1.86 | 2 | 88 | 5 |
| Ex. 11 | 1.27 | 2.2 | 1.37 | 1 | 90 | 5 |
| Comp. Ex. 1 | 1.18 | 2.3 | 2.45 | 7 | 88 | 5 |
| Comp. Ex. 2 | 0.35 | 3.1 | 1.36 | — | — | — |
| Comp. Ex. 3 | 0.31 | 3.2 | 2.48 | — | — | — |
| Comp. Ex. 4 | 1.45 | 2.4 | 2.34 | 10 | 86 | 4 |
| Comp. Ex. 5 | 1.22 | 2.5 | 1.76 | 32 | 85 | 3 |
| Comp. Ex. 6 | 0.68 | 2.7 | 2.05 | 31 | 85 | 3 |
| Comp. Ex. 7 | — | — | — | — | — | — |
| Comp. Ex. 8 | 0.63 | 2.3 | 2.48 | 1 | 90 | 5 |
| Comp. Ex. 9 | 0.78 | 3.0 | 1.01 | 2 | 88 | 55 |
| Comp. Ex. 10 | 1.37 | 2.4 | 2.38 | 6 | 87 | 5 |
| Comp. Ex. 11 | 0.32 | 3.3 | 1.40 | — | — | — |

TABLE 3

| | Esterification reaction vessel | | | First agitation type polymerizer | | | | Amount of phosphoric acid added | Second agitation type polymerizer | | |
|---|---|---|---|---|---|---|---|---|---|---|---|
| | Temperature (° C.) | Retention time (min) | Degree of vacuum (Pa) | Temperature (° C.) | Retention time (min) | Degree of vacuum (Pa) | Intrinsic viscosity (dl/g) | (P/Ti atomic ratio) | Temperature (° C.) | Retention time (min) | Degree of vacuum (Pa) |
| Ex. 10 | 230 | 200 | Atmospheric pressure | 250 | 60 | 4000 | 0.24 | 0.7 | 255 | 60 | 1000 |
| Ex. 11 | 230 | 200 | Atmospheric pressure | 250 | 60 | 4000 | 0.19 | 1 | 255 | 60 | 1000 |
| Comp. Ex. 10 | 230 | 200 | Atmospheric pressure | 250 | 60 | 4000 | 0.29 | 0.005 | 255 | 60 | 1000 |
| Comp. Ex. 11 | 230 | 200 | Atmospheric pressure | 250 | 60 | 4000 | 0.10 | 11 | 255 | 60 | 1000 |

TABLE 4

| | Production of crude PTT resin | Properties of crude PTT resin | | Conditions for employing thin film evaporator | | | | | | |
|---|---|---|---|---|---|---|---|---|---|---|
| | | Intrinsic viscosity [η] | E value | Evaporator | Inner space occupied (%) | Resin-gas contact area (cm²/g) | Revolution rate (rpm) | Feeding temperature (° C.) | Pressure (Pa) | Nitrogen (mg/g) |
| Ex. 12 | Prod. Ex. 1 | 0.65 | 0.005 | Thin film evaporator | 6.5 | 4.1 | 300 | 240 | 70 | 0 |
| Ex. 13 | Prod. Ex. 2 | 0.71 | 0.016 | Thin film evaporator | 6.5 | 4.1 | 300 | 240 | 70 | 0 |
| Ex. 14 | Prod. Ex. 6 | 1.03 | 0.005 | Thin film evaporator | 6.5 | 4.1 | 300 | 240 | 70 | 0 |
| Ex. 15 | Prod. Ex. 13 | 0.68 | 0.060 | Thin film evaporator | 6.5 | 4.1 | 300 | 240 | 70 | 0 |
| Ex. 16 | Prod. Ex. 9 | 0.67 | 0.027 | Thin film evaporator | 6.5 | 4.1 | 300 | 240 | 70 | 0 |
| Ex. 17 | Prod. Ex. 11 | 0.69 | 0.031 | Thin film evaporator | 6.5 | 4.1 | 300 | 240 | 70 | 0 |
| Ex. 18 | Prod. Ex. 1 | 0.65 | 0.005 | Thin film evaporator | 6.5 | 4.1 | 300 | 240 | 70 | 6 |
| Ex. 19 | Ex. 11 | 1.27 | 0.005 | Thin film evaporator | 6.5 | 4.1 | 300 | 255 | 70 | 0 |
| Ex. 20 | Ex. 11 | 1.27 | 0.005 | Thin film evaporator | 6.5 | 4.1 | 50 | 255 | 70 | 0 |
| Ex. 21 | Ex. 11 | 1.27 | 0.005 | Thin film evaporator | 6.5 | 4.1 | 500 | 255 | 70 | 0 |
| Ex. 22 | Prod. Ex. 1 | 0.65 | 0.005 | Extruder equipped with vents | 28 | 1.9 | 300 | 250 | 1300 | 0 |
| Ex. 23 | Prod. Ex. 1 | 0.65 | 0.005 | Cylindrical autoclave | 3.8 | 3.0 | 100 | 250 | 70 | 0 |
| Comp. Ex. 12 | Prod. Ex. 3 | 0.31 | 0.006 | Thin film evaporator | 6.5 | 4.1 | 300 | 240 | 70 | 0 |

TABLE 4-continued

| | | | | | | | | | | |
|---|---|---|---|---|---|---|---|---|---|---|
| Comp. Ex. 13 | Prod. Ex. 1 | 0.65 | 0.005 | Thin film evaporator | 6.5 | 4.1 | 300 | 220 | — | — |
| Comp. Ex. 14 | Prod. Ex. 1 | 0.65 | 0.005 | Thin film evaporator | 6.5 | 4.1 | 300 | 240 | 3000 | 0 |
| Comp. Ex. 15 | Prod. Ex. 4 | 0.72 | 0.071 | Thin film evaporator | 6.5 | 4.1 | 300 | 240 | 70 | 0 |
| Comp. Ex. 16 | Prod. Ex. 1 | 0.65 | 0.005 | Extruder equipped with vents | 50.0 | 1.5 | 300 | 250 | 1300 | 0 |
| Comp. Ex. 17 | Prod. Ex. 1 | 0.65 | 0.005 | Cylindrical autoclave | 23.0 | 0.5 | 100 | 250 | 70 | 0 |

| | Properties of polymer | | | | | |
|---|---|---|---|---|---|---|
| | Intrinsic viscosity | Molecular weight distribution | Cyclic dimer content | Color | | Crystallinity |
| | [η] | (Mw/Mn) | (wt %) | b* | L* | (%) |
| Ex. 12 | 0.70 | 2.2 | 1.34 | 1 | 88 | 5 |
| Ex. 13 | 0.73 | 2.2 | 1.43 | 4 | 90 | 6 |
| Ex. 14 | 1.03 | 2.3 | 0.42 | 2 | 89 | 4 |
| Ex. 15 | 0.072 | 2.3 | 1.69 | 9 | 86 | 4 |
| Ex. 16 | 0.70 | 2.3 | 1.51 | 1 | 90 | 5 |
| Ex. 17 | 0.71 | 2.3 | 1.54 | 2 | 87 | 5 |
| Ex. 18 | 0.75 | 2.2 | 0.78 | 1 | 88 | 5 |
| Ex. 19 | 1.12 | 2.2 | 0.68 | 1 | 90 | 5 |
| Ex. 20 | 1.18 | 2.2 | 0.88 | 1 | 90 | 5 |
| Ex. 21 | 0.98 | 2.3 | 0.63 | 1 | 90 | 5 |
| Ex. 22 | 0.65 | 2.3 | 1.88 | 3 | 88 | 5 |
| Ex. 23 | 0.71 | 2.3 | 1.65 | 4 | 87 | 5 |
| Comp. Ex. 12 | 0.30 | 2.4 | 1.32 | — | — | — |
| Comp. Ex. 13 | — | — | — | — | — | — |
| Comp. Ex. 14 | 0.64 | 2.2 | 2.21 | 1 | 88 | 5 |
| Comp. Ex. 15 | 0.66 | 2.3 | 2.05 | 7 | 88 | 5 |
| Comp. Ex. 16 | 0.66 | 2.3 | 2.43 | 3 | 88 | 5 |
| Comp. Ex. 17 | 0.65 | 2.5 | 2.15 | 8 | 88 | 5 |

TABLE 5

| | Examples | | | | | | | | | Comparative Examples | | |
|---|---|---|---|---|---|---|---|---|---|---|---|---|
| | Prod. Ex. 1 | Ex. 1 | Ex. 2 | Ex. 3 | Ex. 4 | Ex. 11 | Ex. 12 | Ex. 15 | Ex. 21 | Prod. Ex. 8 | Comp. Ex. 9 | Comp. Ex. 15 |
| <Properties of first press-molded products> | | | | | | | | | | | | |
| Cyclic dimer content (wt %) | 2.62 | 1.51 | 1.70 | 1.43 | 0.56 | 1.38 | 1.35 | 1.72 | 0.64 | 1.60 | 1.63 | 2.63 |
| Ink adhesion property (A) | 92 | 98 | 97 | 98 | 100 | 99 | 100 | 97 | 100 | 95 | 94 | 91 |
| Ink adhesion property (B) | 71 | 98 | 97 | 98 | 100 | 98 | 99 | 95 | 100 | 88 | 85 | 70 |
| <Properties of second press-molded products> | | | | | | | | | | | | |
| Cyclic dimer content (wt %) | 2.62 | 1.54 | 1.74 | 1.46 | 0.59 | 1.42 | 1.39 | 1.79 | 0.68 | 1.82 | 1.94 | 2.62 |
| Ink adhesion property (A) | 83 | 98 | 97 | 98 | 100 | 98 | 100 | 96 | 100 | 88 | 85 | 83 |
| Ink adhesion property (B) | 66 | 97 | 95 | 97 | 99 | 97 | 99 | 93 | 100 | 72 | 68 | 65 |

INDUSTRIAL APPLICABILITY

By using the polytrimethylene terephthalate resin of the present invention, it becomes possible to produce an excellent shaped article stably on a commercial scale. Specifically, the shaped article produced using the polytrimethylene terephthalate resin of the present invention has high strength and excellent color. Further, the shaped article is free from the bleeding of the cyclic dimer to the surface of the shaped article, so that the shaped article is suitable for coating with a coating composition or adhesive agent and exhibits excellent adhesion property. Further, by the method of the present invention, it becomes possible to produce an excellent polytrimethylene terephthalate resin stably with high productivity on a commercial scale.

The invention claimed is:

1. A method for producing the polytrimethylene terephthalate resin, which comprises:

(1) providing a crude trimethylene terephthalate resin in a molten form, said crude trimethylene terephthalate resin comprising:

60 to 100 mole % of (a) trimethylene terephthalate recurring units, and 0 to 40 mole % of (b) at least one monomer unit selected from the group consisting of monomer units obtained from comonomers which are other than the monomers used for forming said trimethylene terephthalate recurring units and which are copolymerizable with at least one of the monomers used for forming said trimethylene terephthalate recurring units, the total molar amount of (a) monomer units and (b) monomer units being 100 mole %, said crude trimethylene terephthalate resin further comprising a cyclic dimer represented by the following formula (1):

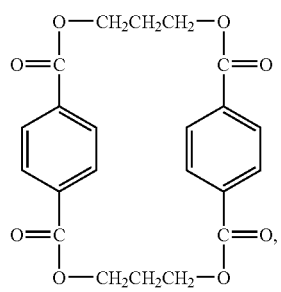

(1)

said crude trimethylene terephthalate resin having an intrinsic viscosity [η] of from 0.4 to 1.5 dl/g and a cyclic dimer formation index (E) of less than 0.066, said cyclic dimer formation index (E) being defined by the following formula (3):

$$E = W/M \qquad (3)$$

wherein M represents the terminal hydroxyl group content of said crude trimethylene terephthalate resin in terms of mole % based on the total molar amount of the trimethylene terephthalate unit, and W represents the re-formation rate of the cyclic dimer in terms of an increase (as expressed by absolute percentage value) in the cyclic dimer content (% by weight), per minute, of the crude trimethylene terephthalate resin as measured at 260° C. in nitrogen gas atmosphere with respect to a sample of the crude polytrimethylene terephthalate resin in a molten form, wherein the molten sample is obtained by melting a cyclic dimer-reduced sample of the crude polytrimethylene terephthalate resin which cyclic dimer-reduced sample has a cyclic dimer content reduced to 0.1% by weight or less; and (2) removing, from said crude polytrimethylene terephthalate resin in a molten form, 0.5% by weight or more, based on the weight of said crude polytrimethylene terephthalate resin, of said cyclic dimer, by volatilization under reduced pressure, wherein said crude trimethylene terephthalate resin is produced by a polycondensation reaction performed in the presence of a catalyst selected from the group consisting of:

tin butyrate and tin 2-ethylhexanoate, and wherein the removal of said cyclic dimer is performed by at least one method selected from the group consisting of a method using a guide-wetting fall polymerizer and a method using a thin film evaporator.

2. The method according to claim 1, wherein said crude polytrimethylene terephthalate resin has a cyclic dimer formation index (E) of less than 0.033.

3. A method for producing the polytrimethylene terephthalate resin, which comprises:

(1) providing a crude trimethylene terephthalate resin in a molten form, said crude trimethylene terephthalate resin comprising:

60 to 100 mole % of (a) trimethylene terephthalate recurring units, and 0 to 40 mole % of (b) at least one monomer unit selected from the group consisting of monomer units obtained from comonomers which are other than the monomers used for forming said trimethylene terephthalate recurring units and which are copolymerizable with at least one of the monomers used for forming said trimethylene terephthalate recurring units, the total molar amount of (a) monomer units and (b) monomer units being 100 mole %, said crude trimethylene terephthalate resin further comprising a cyclic dimer represented by the following formula (1):

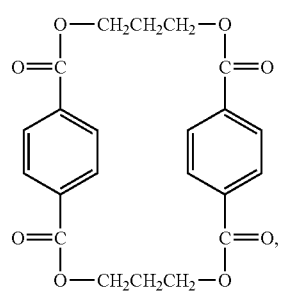

(1)

said crude trimethylene terephthalate resin having an intrinsic viscosity [η] of from 0.4 to 1.5 dl/g and a cyclic dimer formation index (E) of less than 0.066, said cyclic dimer formation index (E) being defined by the following formula (3):

$$E = W/M \qquad (3)$$

wherein M represents the terminal hydroxyl group content of said crude trimethylene terephthalate resin in terms of mole % based on the total molar amount of the trimethylene terephthalate unit, and W represents the re-formation rate of the cyclic dimer in terms of an increase (as expressed by absolute percentage value) in the cyclic dimer content (% by weight), per minute, of the crude trimethylene terephthalate resin as measured at 260° C. in nitrogen gas atmosphere with respect to a sample of the crude polytrimethylene terephthalate resin in a molten form, wherein the molten sample is obtained by melting a cyclic dimer-reduced sample of the crude polytrimethylene terephthalate resin which cyclic dimer-reduced sample has a cyclic dimer content reduced to 0.1% by weight or less; and (2) removing, from said crude polytrimethylene terephthalate resin in a molten form, 0.5% by weight or more, based on the weight of said crude polytrimethylene terephthalate resin, of said cyclic dimer, by volatilization under reduced pressure to produce a cyclic dimer content of not greater than 2% by weight, wherein said crude trimethylene terephthalate resin is produced by a polycondensation reaction performed in the presence of a catalyst selected from the group consisting of:

tin butyrate and tin 2-ethylhexanoate, wherein the removal of said cyclic dimer is performed by a method comprising continuously feeding said crude trimethylene terephthalate resin in a molten form to a guide-wetting fall polymerizer having a perforated plate and at least one guide provided in association with the perforated plate, wherein said crude trimethylene terephthalate resin is allowed to fall along and in contact with the surface of said at least one guide provided in the polymerizer at a temperature which is equal to or higher than the crystalline melting point of said crude trimethylene terephthalate resin and is not higher than 290° C. under reduced pressure, so that polymerization of said crude trimethylene terephthalate resin and volatilization of said cyclic dimer are effected during the fall of said crude trimethylene terephthalate resin, while continuously withdrawing the resultant trimethylene terephthalate resin from said polymerizer, and wherein said polytrimethylene terephthalate resin has the following characteristics (A) to (D):

(A) an intrinsic viscosity [η] of from 0.74 to 4 dl/g;
(B) a molecular weight distribution of from 2 to 2.7 in terms of the Mw/Mn ratio, wherein Mw represents the weight average molecular weight of said polytrimethylene terephthalate resin and Mn represents the number average molecular weight of said polytrimethylene terephthalate resin;
(C) a cyclic dimer content of not greater than 2% by weight; and
(D) a psychometric lightness L-value of from 70 to 100 and a psychometric chroma b*-value of from −5 to 25.

4. A method for producing the polytrimethylene terephthalate resin, which comprises:

(1) providing a crude trimethylene terephthalate resin in a molten form, said crude trimethylene terephthalate resin comprising:

60 to 100 mole % of (a) trimethylene terephthalate recurring units, and 0 to 40 mole % of (b) at least one monomer unit selected from the group consisting of monomer units obtained from comonomers which are other than the monomers used for forming said trimethylene terephthalate recurring units and which are copolymerizable with at least one of the monomers used for forming said trimethylene terephthalate recurring units, the total molar amount of (a) monomer units and (b) monomer units being 100 mole %, said crude trimethylene terephthalate resin further comprising a cyclic dimer represented by the following formula (1):

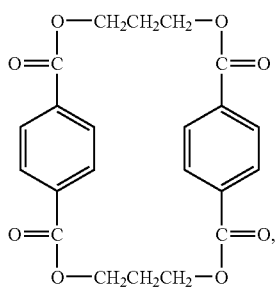

said crude trimethylene terephthalate resin having an intrinsic viscosity [η] of from 0.4 to 1.5 dl/g and a cyclic dimer formation index (E) of less than 0.066, said cyclic dimer formation index (E) being defined by the following formula (3):

$$E = W/M \quad (3)$$

wherein M represents the terminal hydroxyl group content of said crude trimethylene terephthalate resin in terms of mole % based on the total molar amount of the trimethylene terephthalate unit, and W represents the re-formation rate of the cyclic dimer in terms of an increase (as expressed by absolute percentage value) in the cyclic dimer content (% by weight), per minute, of the crude trimethylene terephthalate resin as measured at 260° C. in nitrogen gas atmosphere with respect to a sample of the crude polytrimethylene terephthalate resin in a molten form, wherein the molten sample is obtained by melting a cyclic dimer-reduced sample of the crude polytrimethylene terephthalate resin which cyclic dimer-reduced sample has a cyclic dimer content reduced to 0.1% by weight or less; and (2) removing, from said crude polytrimethylene terephthalate resin in a molten form, 0.5% by weight or more, based on the weight of said crude polytrimethylene terephthalate resin, of said cyclic dimer, by volatilization under reduced pressure to produce a cyclic dimer content of not greater than 2% by weight, wherein said crude trimethylene terephthalate resin is produced by a polycondensation reaction performed in the presence of a catalyst selected from the group consisting of:

tin butyrate and tin 2-ethylhexanoate, wherein the removal of said cyclic dimer is performed by means of a thin film evaporator under conditions wherein:

(a) the pressure in said thin film evaporator is a reduced pressure of 2.6 kPa or less,
(b) a thin film of the crude polytrimethylene terephthalate resin in a molten form is formed on the inner wall of said thin film evaporator, while performing the surface renewal of said crude polytrimethylene terephthalate resin,
(c) said thin film of the crude polytrimethylene terephthalate resin in a molten form has a resin-gas contact area of 1 cm²/g or more, in terms of a value calculated by dividing the area of said crude polytrimethylene terephthalate resin which is in contact with the gaseous phase inside the thin film evaporator by the weight of the crude polytrimethylene terephthalate resin present in said thin film evaporator, and
(d) said crude polytrimethylene terephthalate resin occupies not more than 40% of the inner space of said thin film evaporator, and wherein said polytrimethylene terephthalate resin has the following characteristics (A) to (D):

(A) an intrinsic viscosity [η] of from 0.74 to 4 dl/g;
(B) a molecular weight distribution of from 2 to 2.7 in terms of the Mw/Mn ratio, wherein Mw represents the weight average molecular weight of said polytrimethylene terephthalate resin and Mn represents the number average molecular weight of said polytrimethylene terephthalate resin;
(C) a cyclic dimer content of not greater than 2% by weight; and
(D) a psychometric lightness L-value of from 70 to 100 and a psychometric chroma b*-value of from −5 to 25.

5. The method according to claim 3 or 4, wherein said crude polytrimethylene terephthalate resin has a cyclic dimer formation index (E) of less than 0.033.

6. The method according to claim 3 or 4, wherein said polytrimethylene terephthalate resin has a cyclic dimer content of not greater than 1.5% by weight.

* * * * *